(12) United States Patent
Ingalls, Jr. et al.

(10) Patent No.: US 7,140,874 B2
(45) Date of Patent: Nov. 28, 2006

(54) METHOD AND APPARATUS FOR TESTING CATALYTIC CONVERTER DURABILITY

(75) Inventors: Melvin N. Ingalls, Jr., San Antonio, TX (US); Gordon J. Bartley, San Antonio, TX (US); Cynthia C. Webb, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 363 days.

(21) Appl. No.: 10/213,890

(22) Filed: Aug. 6, 2002

(65) Prior Publication Data

US 2003/0079520 A1   May 1, 2003

Related U.S. Application Data

(60) Provisional application No. 60/310,345, filed on Aug. 6, 2001.

(51) Int. Cl.
   *F23M 9/00*   (2006.01)
(52) U.S. Cl. ............... 431/185; 431/181; 431/350; 73/118.1
(58) Field of Classification Search ............ 431/1, 431/9, 7, 170, 181, 187, 350, 185; 60/276, 60/280, 298, 303, 299; 73/118.1
   See application file for complete search history.

(56) References Cited

U.S. PATENT DOCUMENTS

| 1,102,510 | A |   | 7/1914  | Irish |
|-----------|---|---|---------|-------|
| 2,560,830 | A |   | 7/1951  | Turner |
| 2,581,038 | A |   | 1/1952  | Middendorf |
| 2,648,609 | A |   | 8/1953  | Wurster |
| 2,799,241 | A |   | 7/1957  | Wurster |
| 2,970,911 | A |   | 2/1961  | Lorz |
| 3,015,128 | A |   | 1/1962  | Somerville, Jr. |
| 3,030,773 | A |   | 4/1962  | Johnson |
| 3,110,626 | A |   | 11/1963 | Larson |
| 3,131,749 | A |   | 5/1964  | Davis |
| 3,159,874 | A |   | 12/1964 | Langer, et al. |
| 3,163,579 | A |   | 12/1964 | Derivan |
| 3,176,751 | A |   | 4/1965  | Gerlitz |
| 3,279,994 | A |   | 10/1966 | Koff |
| 3,341,466 | A |   | 9/1967  | Brynko et al. |
| 3,356,569 | A |   | 12/1967 | Nicodemus et al. |
| 3,430,443 | A | * | 3/1969  | Harding et al. ............... 60/738 |
| 3,436,223 | A |   | 4/1969  | Wehrmeister |
| 3,471,304 | A |   | 10/1969 | Hamdy et al. |
| 3,475,177 | A |   | 10/1969 | Jones |
| 3,503,715 | A |   | 3/1970  | Haensel |
| 3,630,024 | A |   | 12/1971 | Hopkins |

(Continued)

FOREIGN PATENT DOCUMENTS

DE   918699   7/1949

(Continued)

OTHER PUBLICATIONS

Proceedings of the Eight CRC On-Road Vehicle Emissions Workshop, vol. 2, Apr. 20-22, 1998 ("CRC Proceedings").

(Continued)

*Primary Examiner*—Carl D. Price
(74) *Attorney, Agent, or Firm*—Baker Botts L.L.P.

(57) ABSTRACT

The present application relates in general to an apparatus and to methods for testing the performance of an automotive catalytic converter under conditions simulating those which occur in motor vehicles over extended driving conditions. The application provides a novel swirl plate and a novel fuel injector which enable the burner to run stoichiometric for extended periods of time.

49 Claims, 28 Drawing Sheets

U.S. PATENT DOCUMENTS

| | | | |
|---|---|---|---|
| 3,685,740 A | | 8/1972 | Sheperd |
| 3,694,135 A | | 9/1972 | Dancy et al. |
| 3,819,838 A | | 6/1974 | Smith et al. |
| 3,890,088 A | | 6/1975 | Ferri |
| 3,906,718 A | * | 9/1975 | Wood .......................... 60/738 |
| 3,916,619 A | * | 11/1975 | Masai et al. .................... 60/756 |
| 3,959,493 A | | 5/1976 | Baalsrud et al. |
| 4,035,137 A | | 7/1977 | Arand |
| 4,054,418 A | | 10/1977 | Miller et al. |
| 4,086,365 A | | 4/1978 | Snetsinger et al. |
| 4,118,171 A | | 10/1978 | Flanagan et al. |
| 4,196,187 A | | 4/1980 | Dannelly et al. |
| 4,270,896 A | | 6/1981 | Polinski |
| 4,383,411 A | | 5/1983 | Riddel |
| 4,409,392 A | | 10/1983 | Hodge |
| 4,497,845 A | | 2/1985 | Percel et al. |
| 4,511,584 A | | 4/1985 | Percel et al. |
| 4,537,784 A | | 8/1985 | Percel et al. |
| 4,542,031 A | | 9/1985 | Nakajima et al. |
| 4,595,584 A | | 6/1986 | Wu et al. |
| 4,651,524 A | | 3/1987 | Brighton |
| 4,687,676 A | | 8/1987 | Wu et al. |
| 4,713,245 A | | 12/1987 | Ando et al. |
| 4,717,567 A | | 1/1988 | Wu et al. |
| 4,772,477 A | | 9/1988 | Weiss et al. |
| 4,775,540 A | | 10/1988 | Hertel et al. |
| 4,797,288 A | | 1/1989 | Sharma et al. |
| 4,837,004 A | | 6/1989 | Wu et al. |
| 4,842,863 A | | 6/1989 | Nishimura et al. |
| 4,845,940 A | * | 7/1989 | Beer .......................... 60/732 |
| 4,960,600 A | | 10/1990 | Kester et al. |
| 5,068,378 A | | 11/1991 | Halloran et al. |
| 5,085,577 A | | 2/1992 | Muller |
| 5,085,858 A | | 2/1992 | Halloran et al. |
| 5,140,814 A | | 8/1992 | Kreutmair et al. |
| 5,149,261 A | | 9/1992 | Suwa et al. |
| 5,267,851 A | | 12/1993 | Washam et al. |
| 5,288,021 A | | 2/1994 | Sood et al. |
| 5,320,523 A | | 6/1994 | Stark |
| 5,339,630 A | * | 8/1994 | Pettit .......................... 60/303 |
| 5,396,794 A | * | 3/1995 | Nichols ...................... 73/118.1 |
| RE35,162 E | | 2/1996 | Draguesku et al. |
| 5,493,171 A | | 2/1996 | Wood, III et al. |
| 5,496,571 A | | 3/1996 | Blagdon et al. |
| 5,518,730 A | | 5/1996 | Fuisz |
| 5,529,048 A | | 6/1996 | Kurihara et al. |
| 5,553,450 A | | 9/1996 | Schnaibel et al. |
| 5,584,178 A | | 12/1996 | Naegeli et al. |
| 5,626,014 A | | 5/1997 | Hepburn et al. |
| 5,660,692 A | | 8/1997 | Nesburn et al. |
| 5,662,917 A | | 9/1997 | Kim et al. |
| 5,679,819 A | | 10/1997 | Jones et al. |
| 5,693,874 A | | 12/1997 | De La Cruz et al. |
| 5,826,428 A | * | 10/1998 | Blaschke ...................... 60/303 |
| 5,860,277 A | | 1/1999 | Schnaibel et al. |
| 5,899,062 A | | 5/1999 | Jerger et al. |
| 5,974,787 A | | 11/1999 | Lemire et al. |
| 5,974,788 A | | 11/1999 | Hepburn et al. |
| 5,998,210 A | | 12/1999 | Hepburn et al. |
| 6,071,113 A | | 6/2000 | Tsubouchi et al. |
| 6,301,875 B1 | | 10/2001 | Backlund et al. |
| 6,316,598 B1 | | 11/2001 | Van Dyke et al. |
| 6,361,767 B1 | | 3/2002 | Malle et al. |
| 6,371,984 B1 | | 4/2002 | Van Dyke et al. |
| 6,378,359 B1 | | 4/2002 | Dobson et al. |
| 6,379,690 B1 | | 4/2002 | Blanchard et al. |
| 6,399,051 B1 | | 6/2002 | Dannecker et al. |
| 6,432,435 B1 | | 8/2002 | Timmons et al. |
| 6,435,193 B1 | | 8/2002 | Cannell et al. |
| 6,490,858 B1 | * | 12/2002 | Barrett et al. ................. 60/280 |
| 6,586,254 B1 | * | 7/2003 | Kumar et al. ................... 436/7 |
| 2001/0054281 A1 | | 12/2001 | Adams et al. |
| 2003/0012700 A1 | | 1/2003 | Carnahan |
| 2004/0007056 A1 | | 1/2004 | Webb et al. |
| 2004/0025580 A1 | | 2/2004 | Webb et al. |
| 2004/0028588 A1 | | 2/2004 | Webb et al. |

FOREIGN PATENT DOCUMENTS

| | | |
|---|---|---|
| DE | 3020030 | 12/1981 |
| EP | 000895024 A2 | 2/1999 |
| EP | 000961013 A2 | 12/1999 |
| FR | 2674333 | 9/1992 |
| GB | 2329853 | 7/1999 |
| GB | 2356826 | 6/2001 |
| JP | 51-111927 | 10/1976 |
| JP | 56-49820 | 5/1981 |
| JP | 04-72410 | 3/1992 |
| JP | 06-264740 | 9/1994 |
| JP | 07-198127 | 8/1995 |
| JP | 11-159386 | 6/1999 |
| JP | 11-270808 | 10/1999 |

OTHER PUBLICATIONS

SAE Presents Automotive Systems Testing Toptec Oct. 14-15, 1998. Novi, Michigan ("SAE Presentation").

Feb. 1999 marketing brochure of Southwest Research Institute entitled "Fuel/Oil Catalyst Aging System" (FOCAS).

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivation of Monolithic Three-Way Catalysts and Oxygen Sensors, SAE Technical Paper 940746, 1994, SAE International.

Williamson, Catalyst Deactivation Due to Glaze Formation From Oil-Derived Phosphorus and Zinc, SAE Technical Paper 841406, 1984, SAE International.

Joy et al., Influence of Phosphorus on Three-Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Passenger Car Motor Oil Phosphorus Levels on Automotive Emissions Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst Volume on FTP Emissions, SAE Technical Paper 972846, 1997, SAE International.

Beck et al., Impact of Sulfur on the Performance of Vehicle-Aged Palladium Monoliths, Applied Catalysis B: Environmental 6, 1995, vol. 185-200.

Jobson et al, Spatially Resolved Effects of Deactivation on Field-Aged Automotive Catalysts, SAE Technical Paper 910173, 1991, SAE International.

Minutes—Oil Protection of Emission System Test II Task Force Held on Aug. 19, 1999, ASTM, Sep. 27, 1999. (Redacted).

Minutes—Oil Protection of Emission System Test II Task Force Held on May 23, 2000, ASTM, Jun. 8, 2000. (Redacted).

Minutes—Oil Protection of Emission System Test (OPEST) II Task Force Held on Apr. 4, 2001, ASTM, May 2, 2001, San Antonio, TX. (Redacted).

* cited by examiner

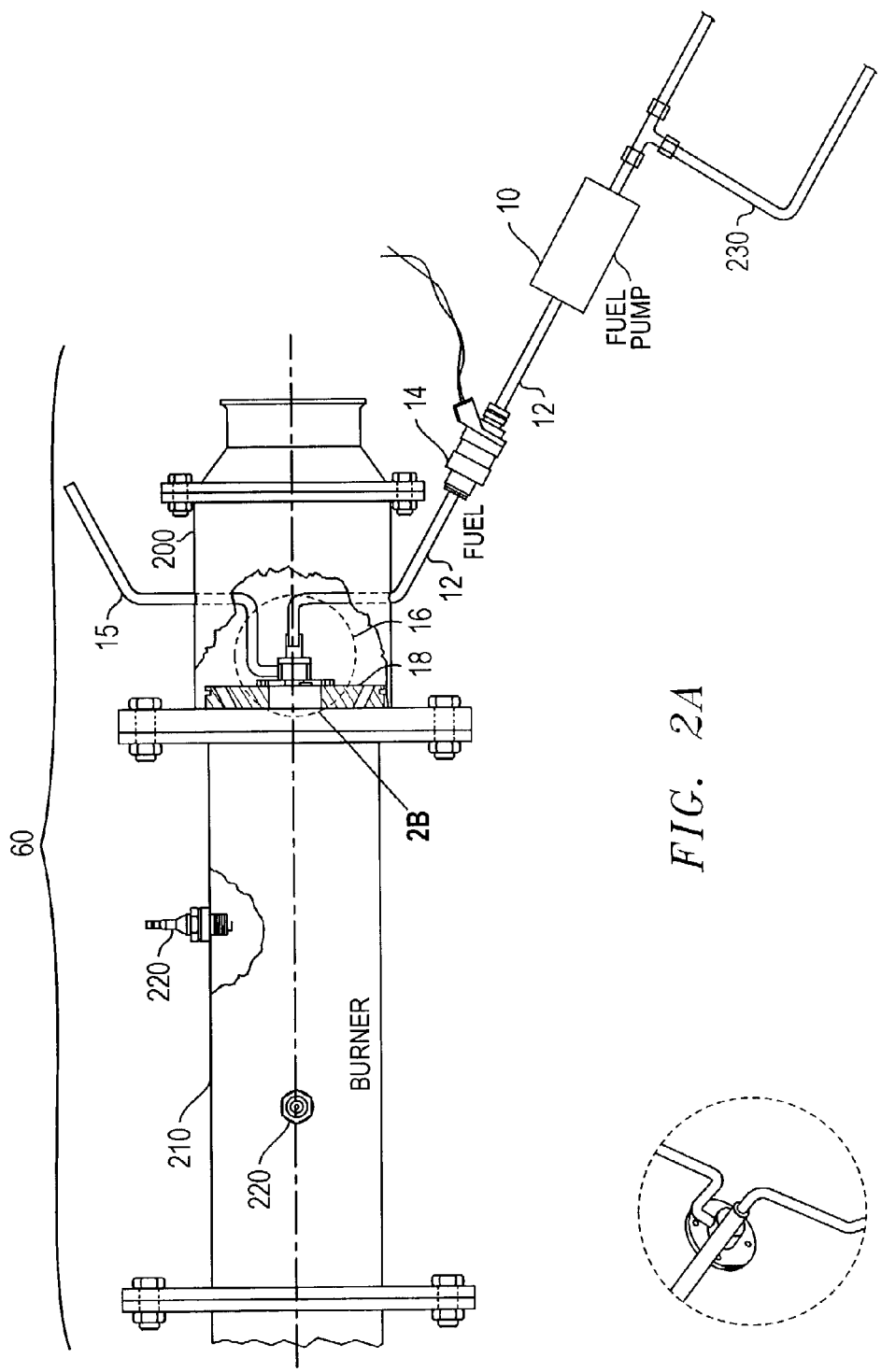

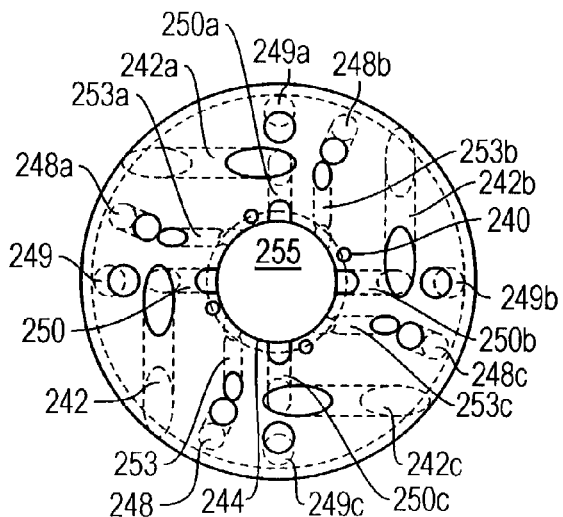
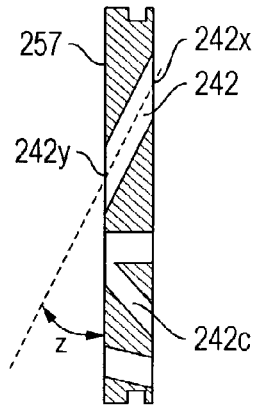
FIG. 3A
FIG. 3B
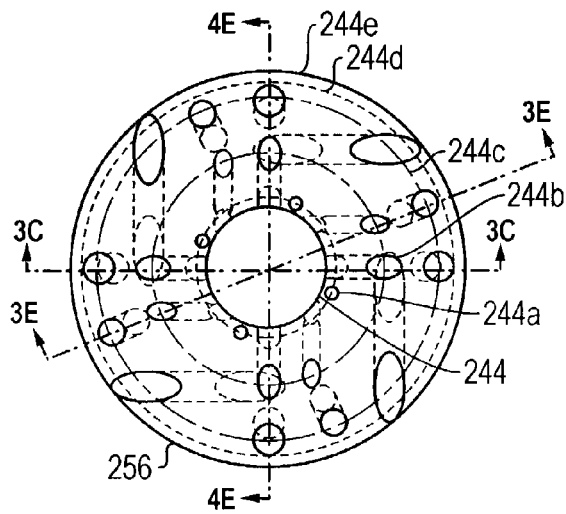
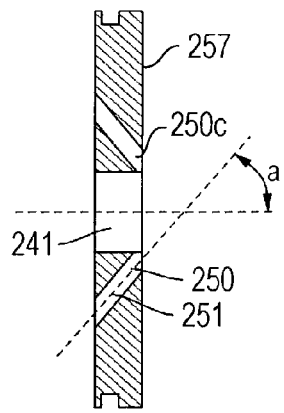
FIG. 3C
FIG. 3D
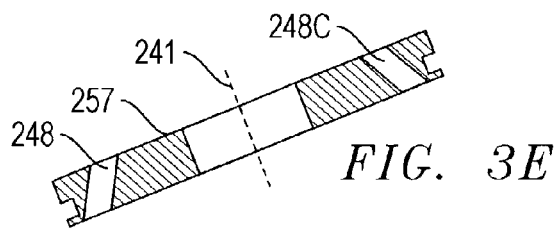
FIG. 3E

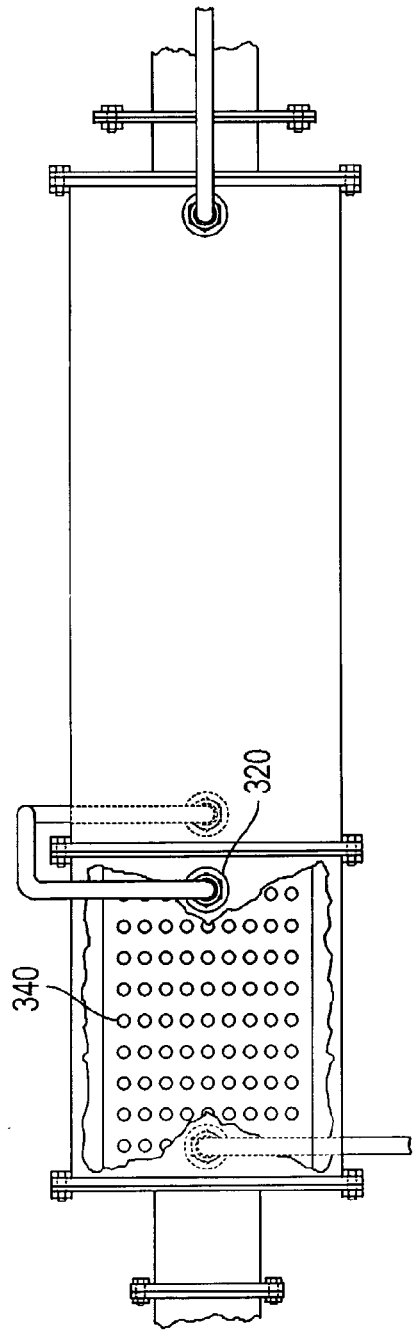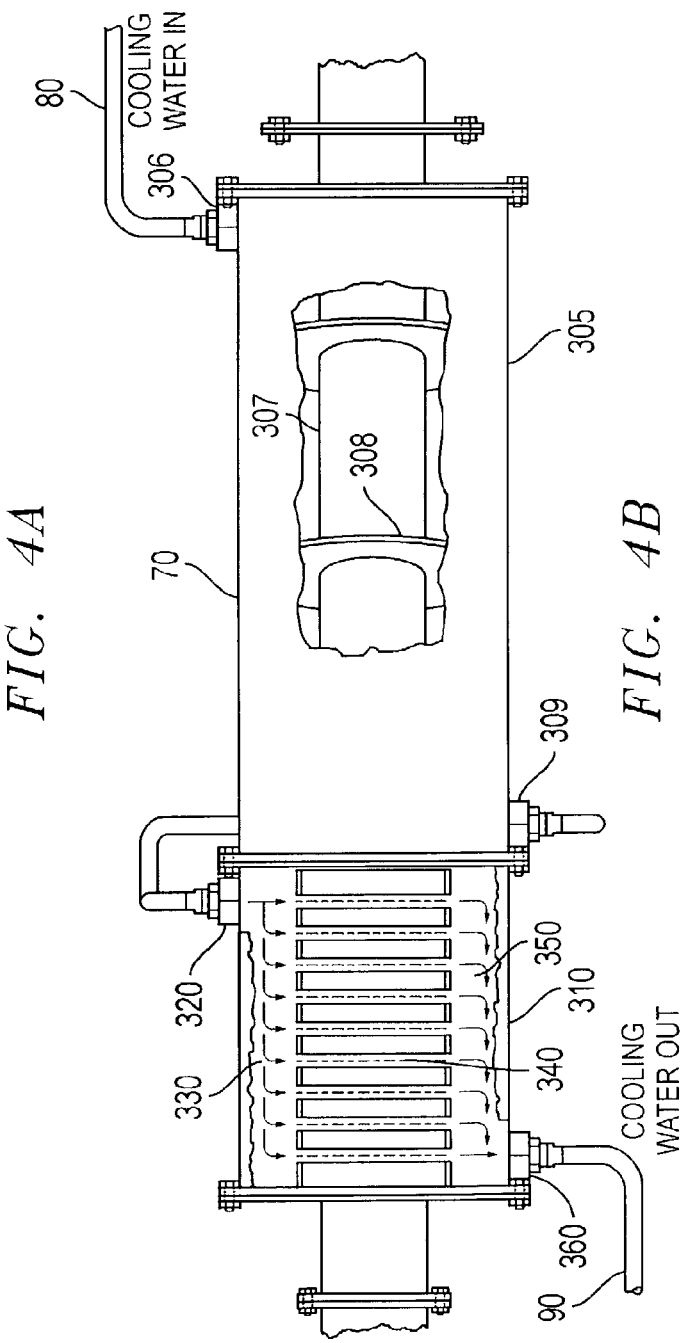
FIG. 4A
FIG. 4B

METHOD AND APPARATUS FOR TESTING CATALYTIC CONVERTER DURABILITY

PRIORITY DATA

The present application claims the benefit of provisional application Ser. No. 60/310,345, filed Aug. 6, 2001, which is incorporated herein by reference.

FIELD OF THE INVENTION

The present application relates in general to an apparatus and to methods for testing the performance of an automotive catalytic converter under conditions simulating those which occur in motor vehicles over extended driving conditions.

BACKGROUND

An automotive catalytic converter is an emissions control device which may be incorporated into the exhaust system of a motor vehicle between the exhaust manifold and the muffler. The catalytic converter contains one or more catalysts, such as those based on platinum, palladium, or rhodium, which reduce the levels of hydrocarbons (HC), carbon monoxide (CO) and nitrogen oxides ($NO_x$) in the exhaust gas, thereby reducing the amount of these pollutants which would otherwise be emitted into the atmosphere from the vehicle. In a typical commercial catalytic converter, HC and CO in the exhaust are oxidized to form carbon dioxide (CO2) and water, and $NO_x$ is reduced to nitrogen, carbon dioxide, and water.

As a result of recent regulatory initiatives, motor vehicle emissions control devices, including catalytic converters, are now required to have longer useful lives. For example the US Environmental Protection Agency (EPA) in 1996 in 40 C.F.R. 86.094-2 increased the mileage for which automotive emission control elements must function from 50,000 to 100,000 vehicle miles. This requirement places severe demands on a catalytic converter, since a number of components introduced into the typical automotive internal combustion engine exhaust can act as a poison to the catalyst present in the converter.

In order to understand the effects of potential catalytic converter catalyst poisons, it is necessary to have a testing apparatus and procedure that will permit the evaluation of the long term effects of the individual variables which may affect the performance of the catalyst. Historically, an internal combustion engine has been used for such an evaluation, however, such an apparatus can be inconsistent, maintenance intensive, and expensive to operate. In addition, such an apparatus does not conveniently permit the separate evaluation of individual variables, such as the effects of constituents of the fuel and of constituents of the oil. Also, the engine oil consumption varies with engine age, operating temperature, speed and other variables, which are difficult to control.

A test apparatus and testing method are needed which overcome the foregoing deficiencies.

SUMMARY OF THE INVENTION

In one aspect, the application provides an apparatus for aging a catalytic converter comprising: catalytic converter means; combustion means in fluid communication with said catalytic converter means; fuel injection means in fluid communication with said combustion means; and lubricant injection means in fluid communication with said catalytic converter means. The apparatus also preferably comprises: data acquisition means; air supply means in fluid communication with said combustion means; and, heat exchanger means in fluid communication with said combustion means.

In another aspect, the application provides an apparatus for aging a catalytic converter comprising: a burner adapted to provide substantially continuous stoichiometric combustion of a feedstream and to produce an exhaust product; a fuel injector system in fluid communication with said burner; a catalytic converter in fluid communication with said exhaust product; and, a lubricant injection system in fluid communication with said catalytic converter. In a preferred embodiment, the apparatus also comprises a data acquisition system adapted to provide substantially continuous fuel metering control, and preferably substantially continuous catalyst safety monitoring.

Preferably, the burner comprises a swirl plate means. In a preferred embodiment, the swirl plate means is a swirl stabilized burner. The swirl stabilized burner preferably comprises: a plenum chamber; a combustion tube; and, a swirl plate separating said plenum chamber and said combustion tube comprising an air assisted fuel spray nozzle assembly means.

In another aspect, the swirl stabilized burner comprises: a plenum chamber; a combustion tube defining a bore; and, a swirl plate separating said plenum chamber and said combustion tube, said swirl plate being adapted to produce a pattern of collapsed conical and swirl flow in said combustion tube that defines at least one flow path along said bore, preferably at least three flowpaths. In this embodiment, the swirl plate preferably comprises an air assisted fuel spray nozzle assembly in fluid communication with an air supply and a fuel supply. The air supply and fuel supply preferably are adapted to provide atomized fuel to said combustion means. The pattern produced by the swirl plate preferably collapses and expands at intervals that are substantially equal to the inner diameter of the burner. In the embodiment described herein, the inner diameter of the burner is about 4 inches, and the pattern produced by the swirl plate preferably collapses and expands at intervals of about 4 inches. The apparatus preferably comprises at least one igniter in fluid communication with said at least one flowpath, preferably at least one igniter in fluid communication with each of three flowpaths. The lubricant injection system preferably is adapted to provide an atomized spray of lubricant comprising droplets having a sufficiently small diameter to vaporize upon exposure to said burner. In a preferred embodiment, the diameter of the droplets is about 80 microns or less, preferably about 20 microns or less.

In another aspect, the application provides a burner for producing continuous stoichiometric combustion of automotive fuel. The burner comprises: a plenum is chamber; a combustion tube; a swirl plate separating said plenum chamber and said combustion tube comprising an air assisted fuel spray nozzle assembly means. A preferred burner is the swirl stablized burner, described above.

BRIEF DESCRIPTION OF THE FIGURES

FIG. 2A is a drawing of a preferred embodiment of a burner suitable for use with the present application.

FIG. 2B is a close up view of the circled portion of the burner.

FIG. 3A is a frontal view of a swirl plate which imparts the desired swirling motion to the air entering the combustion section of the burner.

FIG. 3C is a rear view of the swirl plate of FIG. 3A.

FIGS. 3B, 3D, and 3E are cross sections through the swirl plate of FIGS. 3A and 3C.

FIG. 4A is a cutaway view depicting a preferred embodiment of a heat exchanger suitable for use with the present application.

FIG. 4B is a cutaway view of another section of the heat exchanger at approximately a 90° angle to the view in FIG. 4A.

BRIEF DESCRIPTION

Figure 1:
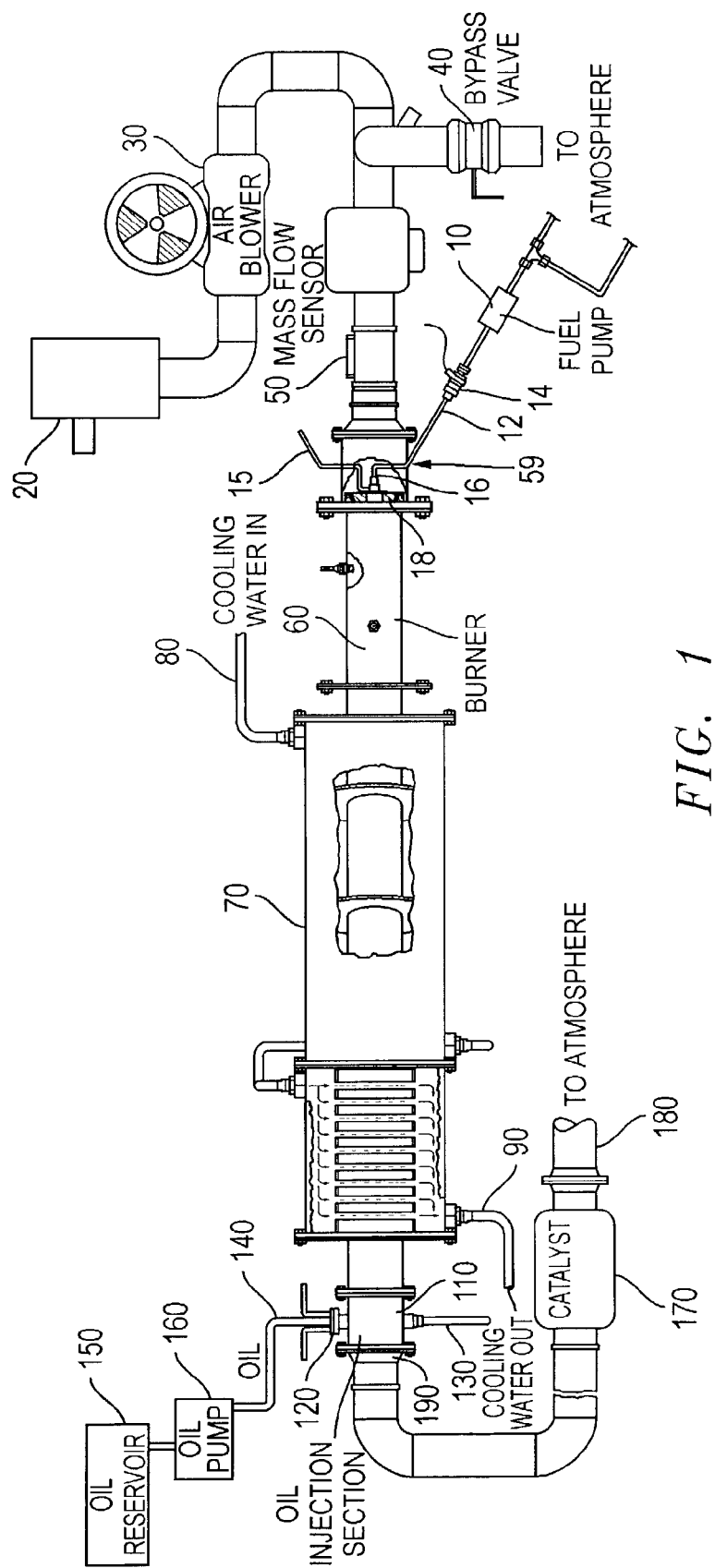
FIG. 1 shows a schematic diagram of one embodiment of the system.

The application provides a test apparatus which produces a simulated exhaust gas with a composition and temperature corresponding to that produced by the internal combustion engine of a motor vehicle. The apparatus can be used with or without using lubricating oil in its operation. Precise amounts of lubricating oil can be added to the exhaust gas if required. The apparatus and method are suitable for aging of an automotive catalytic converter or, if desired, a small scale core catalytic converter over simulated extended driving conditions. The apparatus quickly and accurately produces the effects of additives and contaminants from the engine fuel and/or lubricant oil on the durability of a full scale catalytic converter over simulated periods of extended operation. The apparatus is capable of producing an aged converter catalyst which can be performance tested on an actual vehicle.

As used herein the term "automotive catalytic converter" or "catalytic converter" means a full scale emissions control device suitable for incorporation into the exhaust system of a motor vehicle between the exhaust manifold and the muffler. As used herein the term "extended driving conditions" means at least 50,000 vehicle miles, and more preferably at least 100,000 vehicle miles.

As will be demonstrated herein, the present application allows for simultaneously or separately determining the effects of additives and contaminants in automotive fuel and in lubricant oil on the durability of a catalytic converter over simulated periods of extended driving conditions. In addition, the application is capable of producing an aged catalytic converter catalyst suitable for performance testing on an actual vehicle.

Various components of automotive fuel and lubricant oil may contribute to deterioration, or poisoning, of the catalyst in a catalytic converter. For example, it is well known that leaded gasoline can cause catalyst poisoning, since the tetraethyl lead which has been added to the gasoline as an antiknock compound is a known catalyst poison. In addition, other components of the fuel and lubricant system of an internal combustion engine may act as catalyst poisons if they pass through the engine and become a constituent of the exhaust. For example, if sulfur is present in the fuel, it will likely be present as a catalyst poison in the exhaust. In addition, phosphorus and zinc, if present in the engine lubricant oil, may be present in the exhaust and act as catalyst poisons.

The application provides a unique apparatus, and method of using same, which is capable of separating the effects of fuel and oil, allowing precise control of each variable. The application provides an oil free exhaust from combustion of gasoline or other fuel, such as gasoline; synthetic gasoline; diesel; liquefied fuel produced from coal, peat or similar materials; methanol; compressed natural gas; or liquefied petroleum gas. The exhaust is provided with precise air to fuel ratio control, and a separate oil atomization system for definitive isolation of the effects of fuel and of lubricant at various consumption rates and states of oxidation. The apparatus is capable of operating over a variety of conditions, allowing various modes of engine operation to be simulated, for example cold start, steady state stoichiometric, lean, rich, cyclic perturbation, etc.

The apparatus comprises: (1) an air supply system to provide air for combustion to the burner, (2) a fuel system to provide fuel to the burner, (3) a burner system to combust the air and fuel mixture and provide the proper exhaust gas constituents, (4) a heat exchanger to control the exhaust gas temperature, (5) an oil injection system, and (6) a computerized control system.

The Air Supply System

Referring now to the drawings and initially to FIG. 1, a schematic diagram of the system is shown. An air blower 30 draws ambient air through an inlet air filter 20 and exhausts a pressurized stream of air. The air blower 30 and the mass air flow sensor 50 may be of any conventional design which will be well known to a person of ordinary skill in the art. In a preferred embodiment the air blower 30 is an electric centrifugal blower, such as a Fuji Electric Model VFC404A Ring Blower, and the mass air flow sensor 50 is an automotive inlet air flow sensor such as a Bosh Model Number 0280214001 available from most retail automotive parts stores. The volume of air supplied is set by adjusting a bypass valve 40 to produce a desired flow rate of air, which is measured by a mass flow sensor 50.

The Fuel Supply System

A standard automotive fuel pump 10 pumps automotive fuel through a fuel line 12 to an electronically actuated fuel control valve 14 then to the burner 60 (described in more detail below). As used herein, the term "automotive fuel" means any substance which may be used as a fuel for the internal combustion engine of a motor vehicle, including, but not necessarily limited to, gasoline; synthetic gasoline; diesel; liquefied fuel produced from coal, peat or similar materials; methanol; compressed natural gas; or liquefied petroleum gas.

Although other types of control valves may be used, a preferred fuel control valve 14 is a solenoid valve that receives a pulse width modulated signal from the computer control system and regulates the flow of fuel to the burner in proportion to the pulse width. The electronically actuated solenoid valve 14 may be of a design which will operate with a pulse modulated signal which will be well known to a person of ordinary skill in the art. In a preferred embodiment the electronically actuated fuel control valve 14 is a Bosch frequency valve model number 0280 150 306-850 available from most retail automotive parts suppliers. From the fuel control valve 14 the fuel is piped to the air assisted fuel spray nozzle 16 in the burner assembly (described below).

The Burner

The burner is specially fabricated, as described below to produce stoichiometric combustion of the fuel and air. In a preferred embodiment, the burner 60 is a swirl stabilized burner capable of producing continuous stoichiometric combustion of automotive fuel.

Referring now to FIG. 2, in a preferred embodiment the burner comprises a plenum chamber 200 and a combustion tube 210. A swirl plate 18 separates the plenum chamber 200 from the combustion tube 210. The combustion tube 210 is constructed of material capable of withstanding extremely high temperatures. Preferred materials include, but are not necessarily limited to INCONEL or stainless steel, and optionally can be equipped with a quartz tube in place of the INCONEL tube for visual observation of the resulting flame pattern.

The air and fuel are separately introduced into the burner 60. Air from the mass flow sensor 50 is ducted to the plenum chamber 200 (FIG. 2) then through the swirl plate 18 into the burner tube. The swirl plate 18 is equipped with a fuel injector 16.

Fuel Injector

In a first embodiment, an air assisted fuel spray nozzle 16 is engaged using conventional means at the center of the swirl plate 18 inside of the plenum chamber 200 (FIG. 2). Fuel from the fuel supply line 14 is fed to the air assist fuel spray nozzle 16, where it is mixed with compressed air from air line 15 and sprayed into the combustion tube 210 (FIG. 2). The compressed air line 15 provides high pressure air to assist in fuel atomization.

Figure 5A:
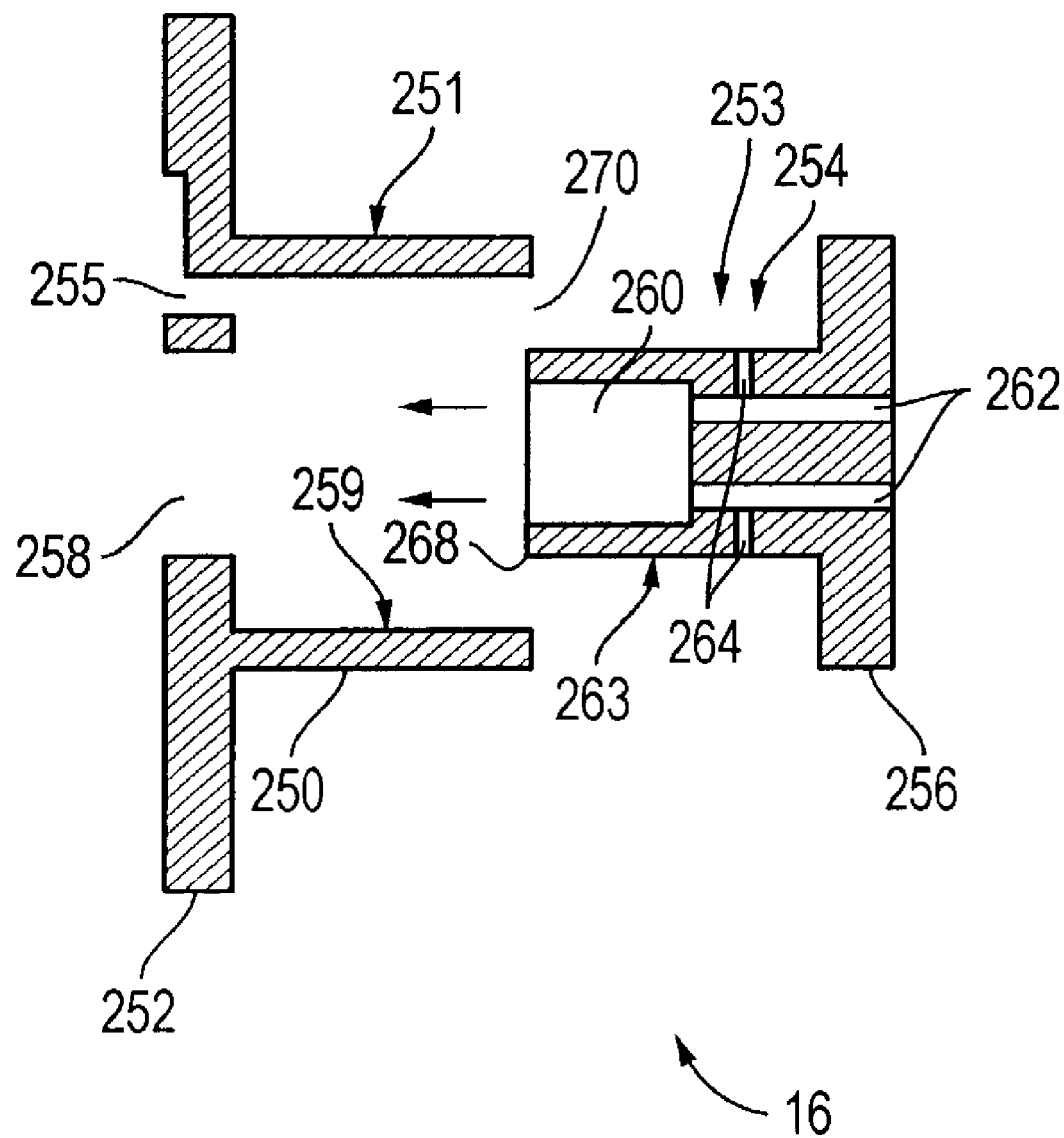
FIG. 5A is an exploded view of one embodiment of an air assisted fuel spray nozzle suitable for use in the apparatus.

FIG. 5A is one embodiment of the air assisted fuel spray nozzle 16. As seen from FIG. 5A, the air assisted fuel spray nozzle 16 comprises male and female flanged fittings which are engaged with the swirl plate 18. A variety of suitable methods of engagement are known to persons of ordinary skill in the art. The female fitting 250 has a flanged end 252 and a substantially tubular extension 251. A male fitting 254 comprises a flanged end 256 and a substantially cylindrical extension 253 having an opposed end 268. The cylindrical extension fits within the tubular extension of the female fitting along its length. In a preferred embodiment, the clearance 270 between the inner wall 259 of the tubular extension 251 and the outer wall 263 of the tubular extension 253 is preferably about ⅛". The clearance creates a circumferential groove 257 for injection of fuel, which communicates with the fuel injection hole 264.

Air injection bores 262 (preferably about ¹⁄₁₆") extend through the flanged end 256 and substantially parallel to the axis of the tubular extension 253 of the male fitting to a bore 260, which interfaces with the swirl plate 18. Fuel injection bores 264 extend from the outer wall 263 adjacent to the air injection bores 262 and radially inward. The air injection bores 262 are engaged with the air line 15 in any suitable manner. The fuel injection bores 264 are engaged with the fuel line 12 in any suitable manner.

Figure 5B:
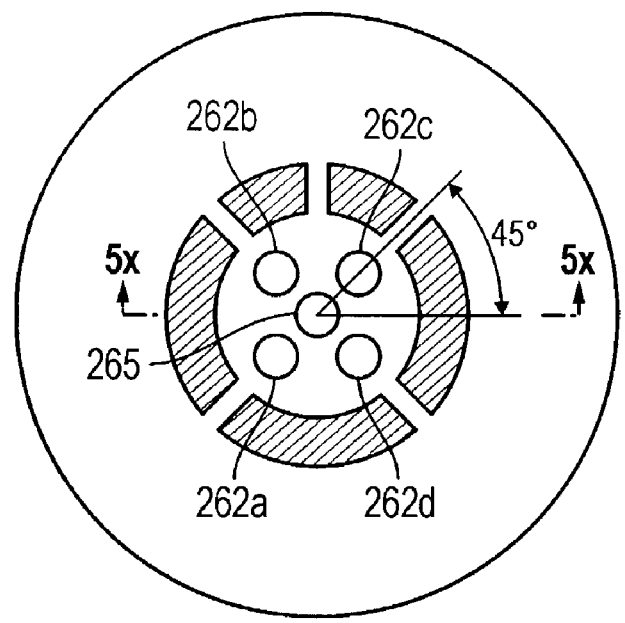
FIG. 5B is a frontal view of the flanged end of the male fitting of the air assisted fuel spray nozzle of FIG. 5A illustrating an arrangement of air injection openings.

FIG. 5B is a frontal view of the flanged end 254 of the male fitting illustrating an arrangement of air injection bores 262. As seen in FIG. 5B, five air injection bores 262a–d and 265 are arranged similar to the numeral "5" on a game die. Specifically, a line drawn through the center of the central air hole 265 and through the center of any one of the corner air holes 262 a–d will have 45° angle when compared to a line drawn along 5x—5x in FIG. 5B. In other words, the center of the corner air holes 262a–d are found at the four corners of a square drawn around the central air hole 265.

Figure 5C:
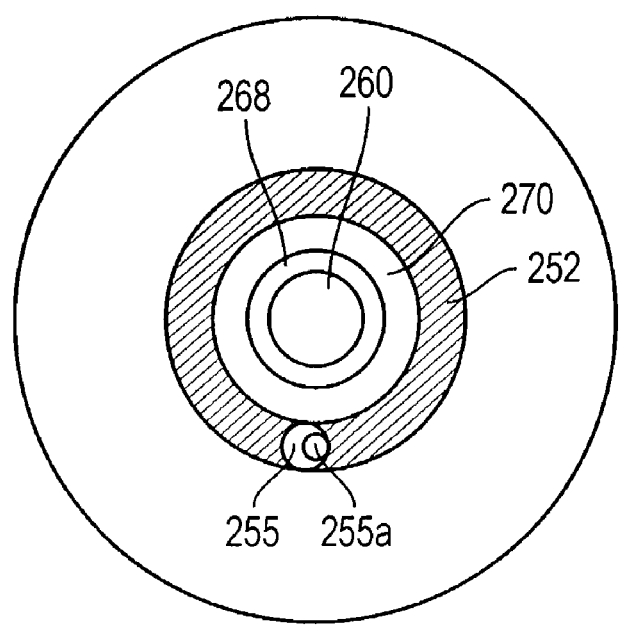
FIG. 5C is a frontal view of the opposed end of the air assisted fuel spray nozzle of FIG. 5B.

A frontal view of the opposed end of all parts of the air assist nozzle 16 when engaged is shown in FIG. 5C. In this "bulls-eye" view: the inner circle is the bore 260 of the female fitting; the next concentric ring is the opposed end 268 of the tubular extension 253 of the male fitting; the next concentric ring is the annular groove 270 formed by the clearance between the tubular extension 251 of the female fitting and the extension 253 of the male fitting; and, the outermost ring is the flange 252 defining a port 255.

Figure 5D:
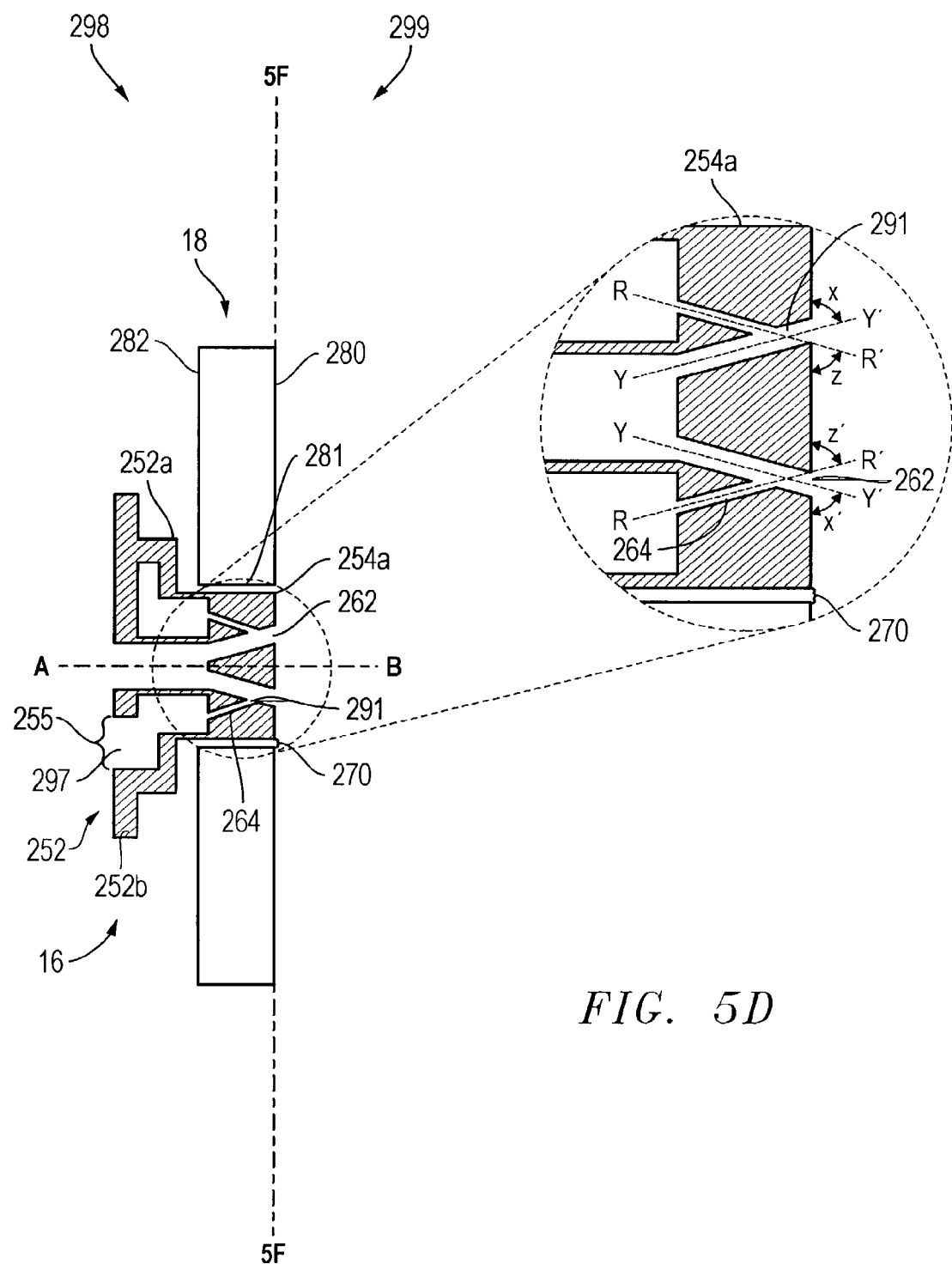
FIG. 5D is an illustration of a preferred air assisted fuel spray nozzle.

In a preferred embodiment of the fuel injector 16 (FIGS. 5D–F), like parts are given like numbering as in FIGS. 5A–5C. Referring to FIG. 5D, the air injection bores 262 are angled to direct the fuel into the air shroud for mixing and protection, while shearing the fuel fed through fuel injection bores 264 with injected air that passes directly through the fuel jet. The fuel injection bores 264 preferably are pointed directly into the air shroud for mixing and protection. The injection angles maximize fuel atomization within the space requirements and work with the swirl plate 18.

The air assisted fuel spray nozzle 16 is engaged using conventional means at the center of the swirl plate 18. The air assisted fuel spray nozzle 16 comprises a flanged male fitting 252 adapted to mate with the a central bore 244 (FIG. 3C) in the swirl plate 18. In a preferred embodiment, the concentric clearance 270 between the outer wall 254a of the air assisted spray nozzle and the wall 281 of the central bore of the swirl plate 18 is preferably from about 0.2" to about 0.75", most preferably about 0.25". The air assisted fuel spray nozzle 16 defines air injection bores 262 having a longitudinal axis represented by line Y–Y'. Line Y–Y' forms angles x, x' relative to line 5F—5F, drawn along the inner wall 280 of the swirl plate. The angles x, x' preferably are from about 65° to about 80°, preferably about 76°. The air injection bores 262 may have substantially any configuration. In a preferred configuration, the air injection bores 262 are cylindrical bores.

The air injection bores 262 extend from a supply end 298 to an injection end 299, and have an inner diameter effective to permit a suitable flow of fuel. In a preferred embodiment, the air injection bores 262 have an inner diameter of from about 0.060" to about 0.080", preferably about 0.070". The air injection bores 262 extend from supply end 298 to the combustion tube 210 (FIG. 2) on the injection end 299.

The air assisted fuel spray nozzle 16 comprises a first flanged end 252a adapted to mate with the outer wall 282 of the swirl plate 18. The alignment of the first flanged end 252a and the outer wall 282 may take a number of configurations, such as complimentary grooves, complimentary angles, or other types of mated machine fittings. In a preferred embodiment, the first flanged end 252a and the outer wall 282 are substantially flat and parallel to one another, abutting one another along a line substantially perpendicular to longitudinal axis A-B. In a preferred embodiment, the first flanged end 252a extends radially outward from the longitudinal axis, illustrated by line A-B, to a distance of from about 0.38" to about 0.65", preferably to a distance of about 0.38" therefrom.

A second flanged end is not entirely necessary; however, in a preferred embodiment, the air assisted spray nozzle 16 further comprises a second flanged end 252b extending radially outward from the longitudinal axis defined by line A-B to a distance of from about 0.3" to about 0.45", preferably about 0.38" therefrom.

As shown in FIG. 5D, the first flanged end 252a and the second flanged end 252b define a flow chamber 297 comprising a port 255 at the supply end 298. The configuration and size of this port 255 is not critical provided that the port 255 permits the flow of an adequate amount of fuel through the flow chamber 297 to the fuel injection bores 264 defined by the air assisted spray nozzle 16. The injection end 299 of the air assisted spray nozzle 16 defines the fuel injection bores 264, which extend from the flow chamber 297 to an opening 291 in the air injection bores 262. The fuel injection bores 264 may have substantially any configuration as long as they deliver an adequate flow of fuel. The fuel injection bores 264 have a longitudinal axis represented by the line R–R', which forms angles z, z' relative to the line 5F—5F. In a preferred embodiment, the fuel injection bores 264 are cylindrical and have a diameter of from about 0.020" to about 0.040", preferably about 0.031". Preferably, angles z,z' are from about 60° to about 80°, preferably about 73°.

In operation, fuel flows through the port 255, through the flow chamber 297, and through the fuel injection bores 264 and opening 291, and is injected into the air injection bores 262, which results in a concurrent injection of air and fuel at the injection end 299 of the air assisted fuel spray nozzle 16. Fuel collides with air at opening 291, resulting in flow jets effective to collide with the air shroud. Materials of construction and dimensions for all components of spray nozzle 16 will vary based on the process operating conditions.

Figure 5E:
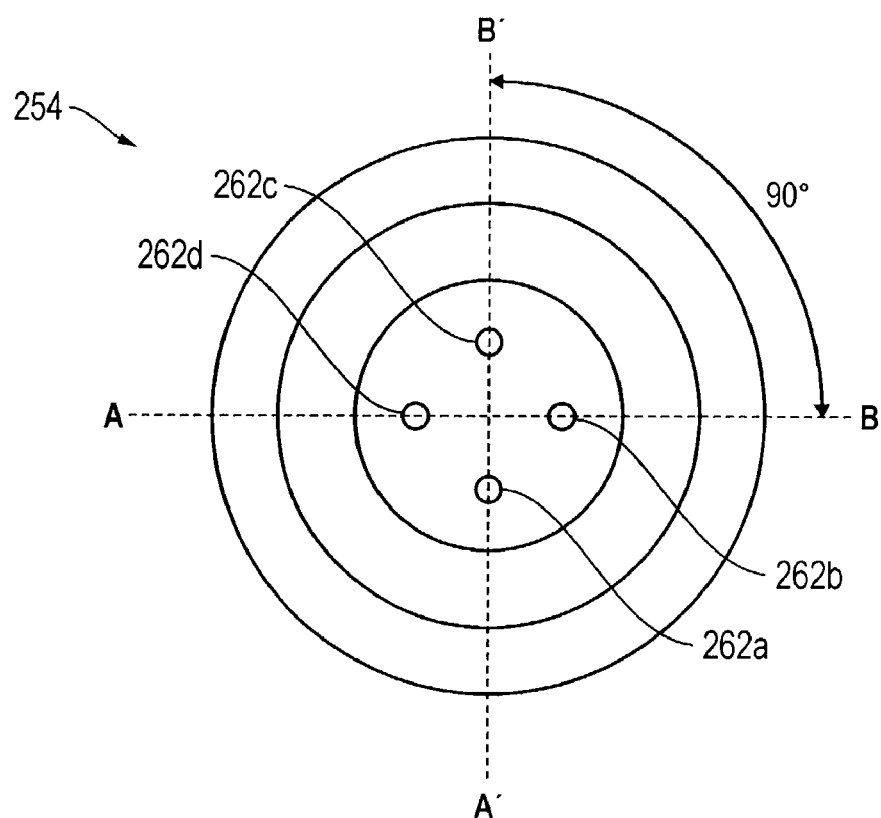
FIG. 5E is a frontal view of the flanged end of the male fitting of the air assisted fuel spray nozzle of FIG. 5D.

As shown in FIG. 5E, the air injection bores 262 comprise openings 262a–d at the injection end 299 which are arranged like the numeral "4" on a game die. The openings 262 a–d preferably are spaced at approximately 90° angles relative to one another, as illustrated by AB and A'B'.

Figure 5F:
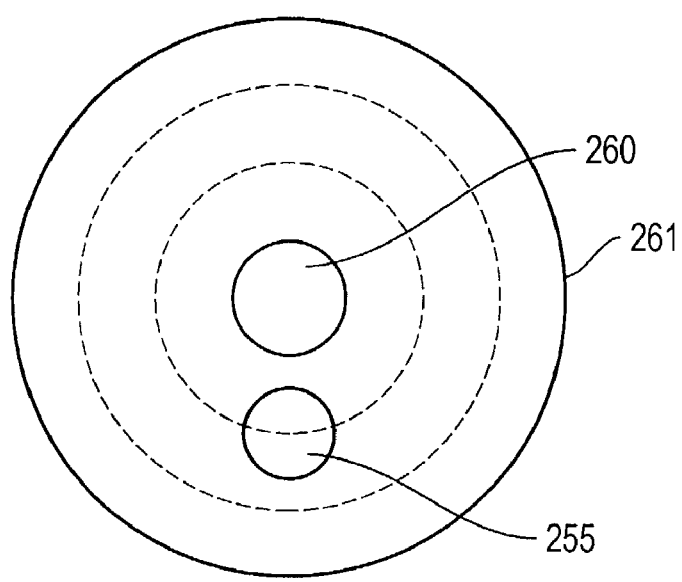
FIG. 5F is a frontal view of the opposed end of the air assisted fuel spray nozzle of FIG. 5D.

FIG. 5F is a frontal view of the supply end 298 of the air assisted fuel spray nozzle 16. In this "bulls-eye" view: the inner circle is the bore 260 and the remaining concentric rings comprise the outer face 261 of the second flanged end 252b. Fuel flows from the fuel line 12 to the spray nozzle 16 through the port 255, into the fuel flow chamber 297 and through the fuel injection bores 264 to the air injection bores 262.

Swirl Plate

In a preferred embodiment the swirl plate 18 is capable of producing highly turbulent swirling combustion, as shown in FIGS. 3A–E so as to provide a complex pattern of collapsed conical and swirl flow in the combustion area. The flow pattern created by the swirl plate 18 involves the interaction of a number of swirl jets 242 and 242a–c, 253 and 253a–c and turbulent jets 248 and 248a–c, 249 and 249a–c, and 250 and 250a–c. The interaction of these jets creates a swirling flow that collapses and expands, preferably at intervals that are substantially equivalent in length to the inner diameter of the combustion tube 210. In a preferred embodiment, the inner diameter of the combustion tube 210 is 4 inches, and the intervals at which the swirling flow collapses and expands is every 4 inches. The pattern clearly defines flow paths along the wall of the combustion tube 210, which define the location of the igniters 220 along the combustion tube 210. In the embodiment described herein, the igniters are located at the first and second full expansions along the path of inner swirl jets (253a,b,c).

In a preferred embodiment, shown in FIGS. 3A–3E, the swirl plate 18 is a substantially circular disc having a thickness sufficient to fix the air flow pattern and to create an "air shroud" that is effective to protect the fuel injector. The thickness generally is about ½ inch or more. The swirl plate 18 has a central bore 255. The air assisted spray nozzle 16 is fitted to the swirl plate 18 at this central bore 255 using suitable means. In the described embodiment, the swirl plate 18 has bores 240 therethrough for attachment of the air assisted spray nozzle 16. The swirl plate 18 is made of substantially any material capable of withstanding high temperature, a preferred material being stainless steel.

The central bore 255 is defined by a wall 244. Generally speaking, each type of jet located at a given radial distance from the longitudinal axis of the swirl plate has four members (sometimes called a "set" of jets) spaced apart at approximately 90° along a concentric circle at a given distance from the central bore 255. Three sets of turbulent jets 248, 249, and 250 direct the air toward the central bore 255. The inner and outer sets of swirl jets 242, 253, respectively, direct the air from the outer circumference 256 of the swirl plate 18 and substantially parallel to a line 3C—3C or 4E—4E (FIG. 3C) through the diameter the swirl plate in the respective quadrant in the direction of the burner.

The precise dimensions and angular orientation of the jets will vary depending upon the inner diameter of the burner, which in the embodiment described herein is about 4 inches. Given the description herein, persons of ordinary skill in the art will be able to adapt a swirl plate for use with a burner having different dimensions.

The orientation of the jets is described with respect to the front face of the swirl plate 257, with respect to the longitudinal axis 241 of the swirl plate 18, and with respect to the lines 3C—3C and 4E—4E in FIG. 3C, which divide the swirl plate 18 into four quadrants. Six concentric circles 244 and 244a–e (FIG. 3C) are depicted, beginning at the interior with the wall 244 defining the central bore 255 and extending concentrically to the outer circumference 244e of the swirl plate 18. In the embodiment described herein, the central bore has an inner diameter of 1.25 inches, or an inner radius of 0.625 inches. A first concentric circle 244a is 0.0795 inches from the wall 244; a second concentric circle 244b is 0.5625 inches from the wall 244; a third concentric circle 244c is 1.125 inches from the wall 244; a fourth concentric circle 244d is 1.3125 inches from the wall 244; and, a fifth concentric circle 244e is 1.4375 inches from the wall 244.

A set of outer swirl jets are labeled 242, and 242a,b,c. A set of inner swirl jets are labeled 253 and 253a,b,c. The outer swirl jets 242 and 242a–c and the inner swirl jets 253 and 253 a–c have the same angle z (FIG. 3B) relative to the surface 257 of the swirl plate 18, preferably an angle of 25°. In a preferred embodiment, both the outer swirl jets 242 and 242a–c and the inner swirl jets 253 and 253a–c have an inner diameter of 5/16." The outer swirl jets 242 direct air from an entry point 242x along the outer circumference 256 of the swirl plate 18 on the fuel injection side 59 to an exit point 242y along circle 244b on the burner side 60. The longitudinal axis of the outer swirl jets 242 is parallel to and spaced 0.44 inches from lines 3C—3C and 4E—4E in their respective quadrants. The inner swirl jets 253 extend from an entry point along the circle 244b on the fuel injection side 59 to an exit point on the burner side 60 along the central bore 244. The longitudinal axis of the inner swirl jets 253 also is parallel to lines 3C—3C and 4E—4E in the respective quadrants.

The air shroud jets 250 direct air from a point along the circle 244b directly inward toward the center of the central bore 255. The longitudinal axis of the air shroud jets 250 runs along the lines (3C—3C and 4E—4E). The angle a (FIG. 3D) of the longitudinal axis 251 of the air shroud jets 250 with respect to the longitudinal axis 241 of the swirl plate 18 is 43.5°. The air shroud jets 250 preferably have an inner diameter of about ¼ inch. The exit points 242y of the outer swirl jets 242 on the burner side 60 of the swirl plate 18 preferably are aligned longitudinally, or in a direction parallel to the longitudinal axis 241 of the swirl plate, with the entry points of the air shroud jets 250 on the fuel injection side 59 of the swirl plate 18.

The air shroud jets 250 are primarily responsible for preventing the flame from contacting the air assisted spray nozzle 16. The air flowing from the air shroud jets 250 converges at a location in front of the fuel injector 16 (FIGS. 1 and 2) and creates a conical shroud of air which results in a low pressure area on the fuel injection side 59 (FIG. 1) of the swirl plate 18 and a high pressure area on the burner side 60 of the swirl plate 18. The low pressure area on the fuel injection side 59 helps to draw the fuel into the combustion tube 210 while the high pressure area on the burner side 60 prevents the burner flame from attaching to the face of the air assisted spray nozzle 16, and prevents coking and overheating of the nozzle 16. In a preferred embodiment, the air shroud jets 250 converge from about 0.5 cm to about 1 cm in front of the nozzle 16.

The combustion tube 210 is equipped with several spark igniters 220 (see FIG. 2). In a preferred embodiment, three substantially equally spaced igniters 220 are located around the circumference of the combustion tube in the gas "swirl path" created by the swirl plate 18. In a preferred embodiment these igniters 220 are marine spark plugs.

In an alternate embodiment, suitable for combustion of low volatility fuels, the combustion tube 210 is further equipped with ceramic foam located about one foot downstream from the spray nozzle 16. Substantially any suitable foam may be used, preferably 10 pore/inch SiC ceramic foam commercially available, for example, from Ultra-Met Corporation, Pacoima, Calif. 91331.

Interaction of Fuel Injector and Swirl Plate

The burner 60 and the fuel injector 16 work together to provide substantially continuous and "effective stoichiometric combustion." As used herein, the term "effective stoichiometric combustion" refers to stoichiometric combustion which maintains the integrity of the wall of the combustion tube without substantial coking of the fuel injector. As a result, the burner may run substantially continuously at stoichiometric for at least 200 hours without the need for maintainence. In a preferred embodiment, the burner may run substantially continuously at stoichiometric for at least 1500 hours with minimal maintenance. By minimal maintenance is meant spark plug changes only.

The design of the fuel injector 16 (above) takes into account the primary features of the swirl plate 18, namely:

1) The outer turbulent jets 248 and 249 (shown in Section 3C—3C) keep the flame from remaining in constant contact with the interior wall of the combuster tube 210. Because the burner 60 operates continuously, and for extended times at stoichiometric (the hottest air/fuel ratio operating point), it is necessary to maintain the integrity of the wall of the combustion tube 210. Currently, the INCONEL combustion tube 210 has been exposed to over 1500 hours of operation, without showing evidence of deterioration. This feature does not substantially affect fuel injection.

(2) The inner swirl jets 242 set-up the overall swirl pattern in the burner. Air exiting the inner swirl jets 242 impacts the interior wall of the combuster tube 210 about 3 inches downstream of the swirl plate 18, and directly interacts with the spray of fuel from the fuel injector 16.

(3) The inner turbulent jets 250, are sometimes referred to as the 'air shroud' jets. Air exiting the inner turbulent jets 250 converges 0.75 inches in front of the fuel injector 16. This feature provides two very important functions. The point of convergence creates a high pressure point in the burner 60, which prevents the burner flame from attaching to the fuel injector 16 (preventing coking). The second function, which interacts directly with fuel injection and impacts flame quality, is that it shears the remaining large fuel droplets as they enter the burner flame.

The Heat Exchanger

The exhaust from the burner 60 is routed to a heat exchanger 70. The heat exchanger 70 may be of any conventional design which will be well known to a person of ordinary skill in the art. In a preferred embodiment the heat exchanger 70 consists of two sections. The upstream section consists of a water jacketed tube. The downstream section is a vertical cross flow shell and tube heat exchanger. The vertical cross flow design minimizes steam formation and steam trapping within the cooling tubes. The heat exchanger 70 is provided with an inlet water line 80 and an outlet water line 90 which supply and drain cooling water to cool the exhaust gas to a temperature simulating that which is present at the inlet to the catalytic converter of a typical motor vehicle.

Referring now to FIG. 4 which shows details of the heat exchanger of the preferred embodiment, for the upstream section, a shell 305 is fitted with a water inlet connection 306. The shell 305 functions as a water jacket for an inner tube which contains the exhaust gases from the burner. Water flows through the water jacket which is fitted with several baffles 308 to direct the water around all parts of inner tube. At the downstream end, the shell 305 is fitted with an outlet water connection 309.

For the downstream section of the heat exchanger, a shell 310 is fitted with a water inlet connection 320 which is in turn connected to an inlet header 330. The inlet header 330 is in fluid communication with a plurality of one half inch tubes 340 which extend from the bottom to the top of the shell 310 whereupon the plurality of one half inch tubes 340 are in placed in fluid communication with an outlet header 350 which is fitted with an outlet water outlet connection 360. In operation hot exhaust gas is directed through the shell 310 where the gas comes in contact with the plurality of one half inch tubes 340. Cooling water is circulated into the inlet water inlet connection 320 whereupon it is directed by the inlet header 330 to flow through the plurality of one half inch tubes 340. Heat which is present in the exhaust gas is conducted into the cooling water, producing an exhaust gas of a reduced temperature at the outlet of the heat exchanger 70 of FIG. 1.

The Oil Injection System

The exhaust gas is next routed to an oil injection section 110 (FIG. 1). The oil injection section provides an atomized oil spray comprising oil droplets with a sufficiently small diameter to vaporize and oxidize the oil before it reaches the catalyst. The oil injection system may be located anywhere downstream from the burner.

A series of test runs were conducted using a Malvern laser particle sizing instrument to determine the preferred oil droplet size as a function of nitrogen pressure in the gas assist line. Suitable oil droplet sizes have a Sauter mean diameter of less than 80 microns, most preferably a Sauter mean diameter of about 20 microns or less.

In operation, a sample of motor oil is withdrawn from an oil reservoir 150 (FIG. 1) by means of an oil pump 160. Substantially any type of pump may be used, preferably a peristaltic pump which feeds the oil from the reservoir through an oil injection line 140 and into a water cooled probe 120 from which the oil is injected into the exhaust gas which is present in the oil injection section 110.

Figure 6B:
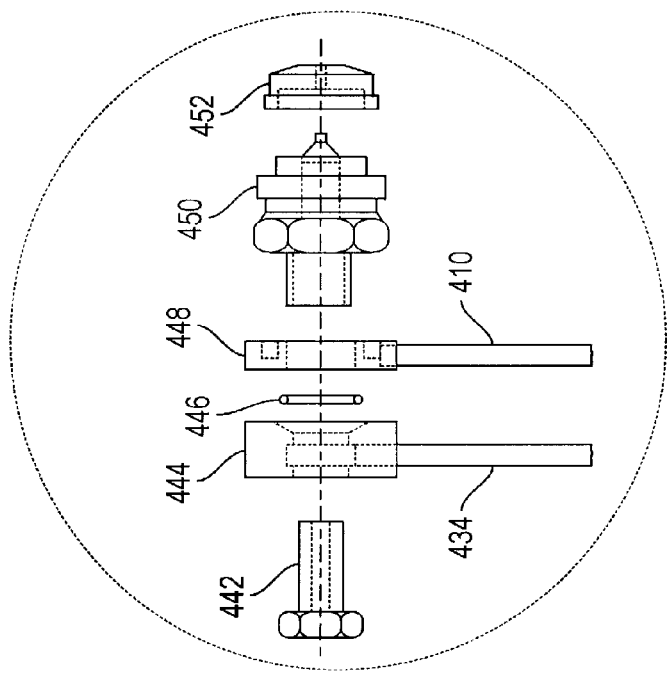
FIG. 6B is an exploded view of the oil injection nozzle from FIG. 6A.
Figure 6A:
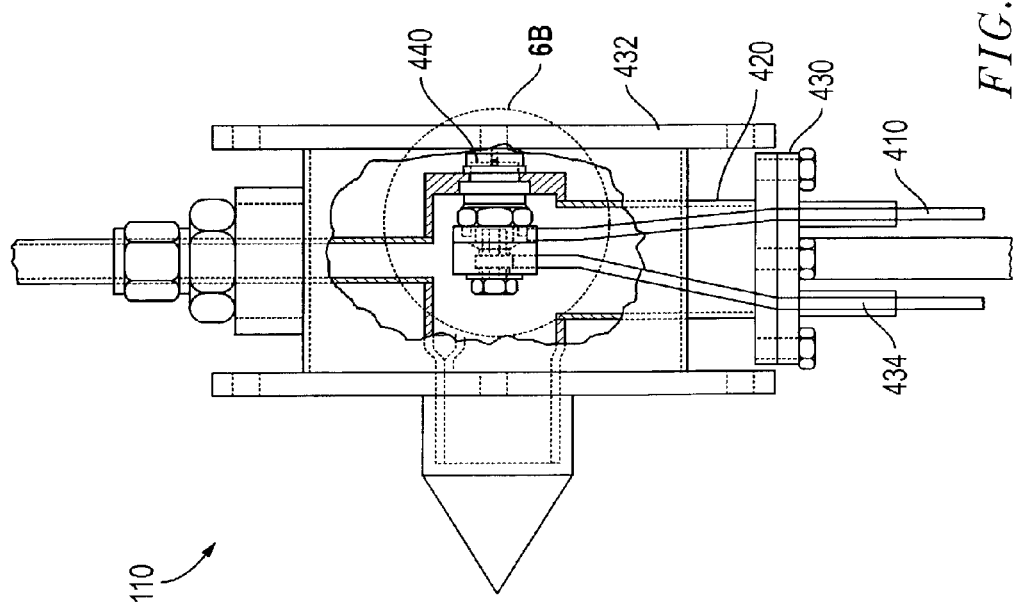
FIG. 6A is a drawing depicting a preferred embodiment of an oil injection system suitable for use with the present application.

The oil injection system is installed in a four inch diameter pipe, and placed in a location where the exhaust gas temperature is approximately 600° C. In a preferred embodiment, the oil injection section 110 is constructed as depicted on FIGS. 6A and 6B. In this embodiment, a separate oil injection line 434 and nitrogen injection line 410 pass through a coupling 430 which is threaded into the injection section housing 432 and into a water cooled sleeve 420 in the injection section housing 432. The oil injection line 434 communicates with the machined oil ring 444 (FIG. 6A) of the oil injection nozzle 440. The nitrogen injection line 410 communicate with the machined air ring 448 (FIG. 6A) of the oil injection nozzle 440. In addition to the machined oil ring 44 and the machined air ring 448, the oil injection nozzle comprises a modified bolt 442, an o-ring seal 446, a stock jet 450, and a stock nozzle 452.

In operation, a coolant solution, preferably water, is continuously circulated through the sleeve 420, which jackets the oil injection line 434 and nitrogen injection line 410, causing the oil and nitrogen injector system to remain at the desired temperature. Lubricating oil is pumped via the oil injection line 434 into the nozzle 440, where the oil is mixed with the nitrogen. The resulting nitrogen/oil mixture is injected into the exhaust gas through the nozzle 440. The exhaust gas having been mixed with the injected oil is finally passed through an automotive catalytic converter 170 following which the exhaust gas is vented to the atmosphere via an exhaust line 180.

The Computerized Control System

Figure 7:
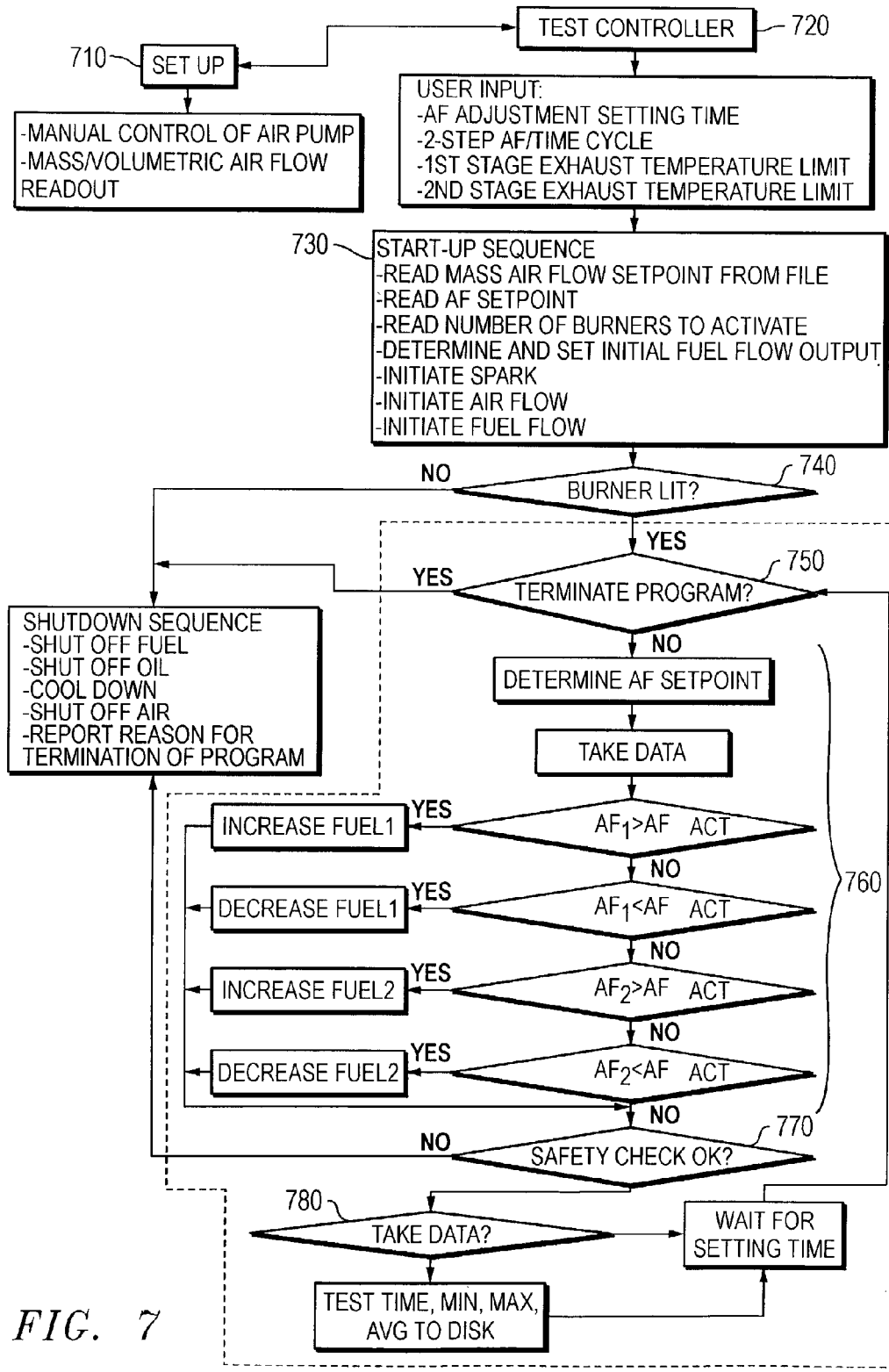
FIG. 7 is a block diagram of a data acqusition and control system suitable for use in the system.

Referring now to FIG. 7, there is provided a data acquisition and control system suitable for use with the present application. The system preferably provides a means to control ignition, air assist to the fuel injector, auxiliary air, fuel feed, blower air feed, oil injection, etc. (discussed more fully below). An example of a suitable control system would be a proportional integral derivative (PID) control loop, for example, for controlling fuel metering.

The data acquisition system comprises a series of test probes 610, 620, 630 which collect data regarding a number of parameters. Suitable parameters are selected from the group consisting of: the mass air flow in the system; the air/fuel ratio (linear and EGO); the exhaust gas temperature at the outlet from the heat exchanger; the exhaust gas temperature at the inlet to the catalyst; the exhaust gas temperature at the outlet from the catalyst; and, a combinations thereof. In a preferred embodiment, data is collected for all of the foregoing parameters. The information measured by the test probes is transmitted by electronic signals to an electronic data recording system 650. In a preferred embodiment the electronic data recording system comprises a computer system with a program which causes the computer to measure all of the monitored parameters on a periodic basis, to record all of the data obtained on a hard drive.

Preferably, the data acquisition and control system monitors the test stand for safety (for example by verifying that the burner is lighted and that the exhaust is within specified limits for both temperature and air to fuel ratio). The control system contains an auto start and auto shutdown option. After the burner fuel is activated, a set of safety checks automatically initialize and monitor the burner for malfunction. While a test is in progress the program collects data at 4 Hz, stores data at 0.5 Hz and displays the catalyst inlet, bed, and outlet temperatures and measured air to fuel ratio at 1 Hz, allowing the operator to review the overall stability of the system. Operating a gasoline fuel burner unattended for long periods of time is potentially dangerous. The system uses three built-in safety limits to check for system malfunction. The heat exchanger outlet must reach a temperature greater than 100° C. within four seconds after activation of fuel injection and maintain a minimum safety setpoint level during operation, indicating that the burner is properly ignited and remains lit. The third setpoint checks the catalyst bed temperature to verify that the catalyst is not at a temperature that could be detrimental to the experiment. If any of the safety setpoints are compromised, the computer is programmed to turn off all test systems, divert the blower flow, activate a two minute nitrogen purge into the burner head to extinguish the burner flame and suspend any unburned fuel in nitrogen, thereby preventing a large exothermic reaction in the test apparatus. A bright red screen is displayed describing the condition at which the system was shut down, along with the date and time. Data are continuously recorded at 4 Hz for ten minutes after a safety compromise. In addition, the nitrogen purge system is also activated and a safety shutdown is followed when an electrical power loss is detected.

In a preferred embodiment the data acquisition and control system is also capable of controlling a number of parameters, including controlling the lube oil injection and burner systems. The computer is equipped with a touch screen monitor and a multi-function DAQ card, connected to an digital relay module to monitor and record system information, and to control system electronics. Using the computer interface, the operator can switch power to the blowers and fuel pump, as well as control the air assisted fuel injectors, burner spark, oil injection, and auxiliary air, all with the touch of the screen. System temperatures, mass air flow for the burner air, and the burner air to fuel ratio are measured and converted to engineering units. The software program uses measured data to calculate total exhaust flow and burner air to fuel ratio, and to check conditions indicative of a system malfunction. The burner air to fuel ratio may be controlled as either open or closed loop, maintaining either specified fuel flow or specified air to fuel ratio. Air to fuel ratio control is achieved by varying the rate of fuel delivered to the burner (modifying the pulse duty cycle of a fixed frequency control waveform). Whenever necessary, open loop control can be activated allowing the operator to enter a fixed fuel injector pulse duty cycle. Closed loop control can be activated in which the actual burner air to fuel ratio is measured and compared to the measured value of the air to fuel setpoint and then adjusting the fuel injector duty cycle to correct for the measured error. The front panel of the program is used to allow the user to input an aging cycle, and to run the test using a single screen.

Figure 10:
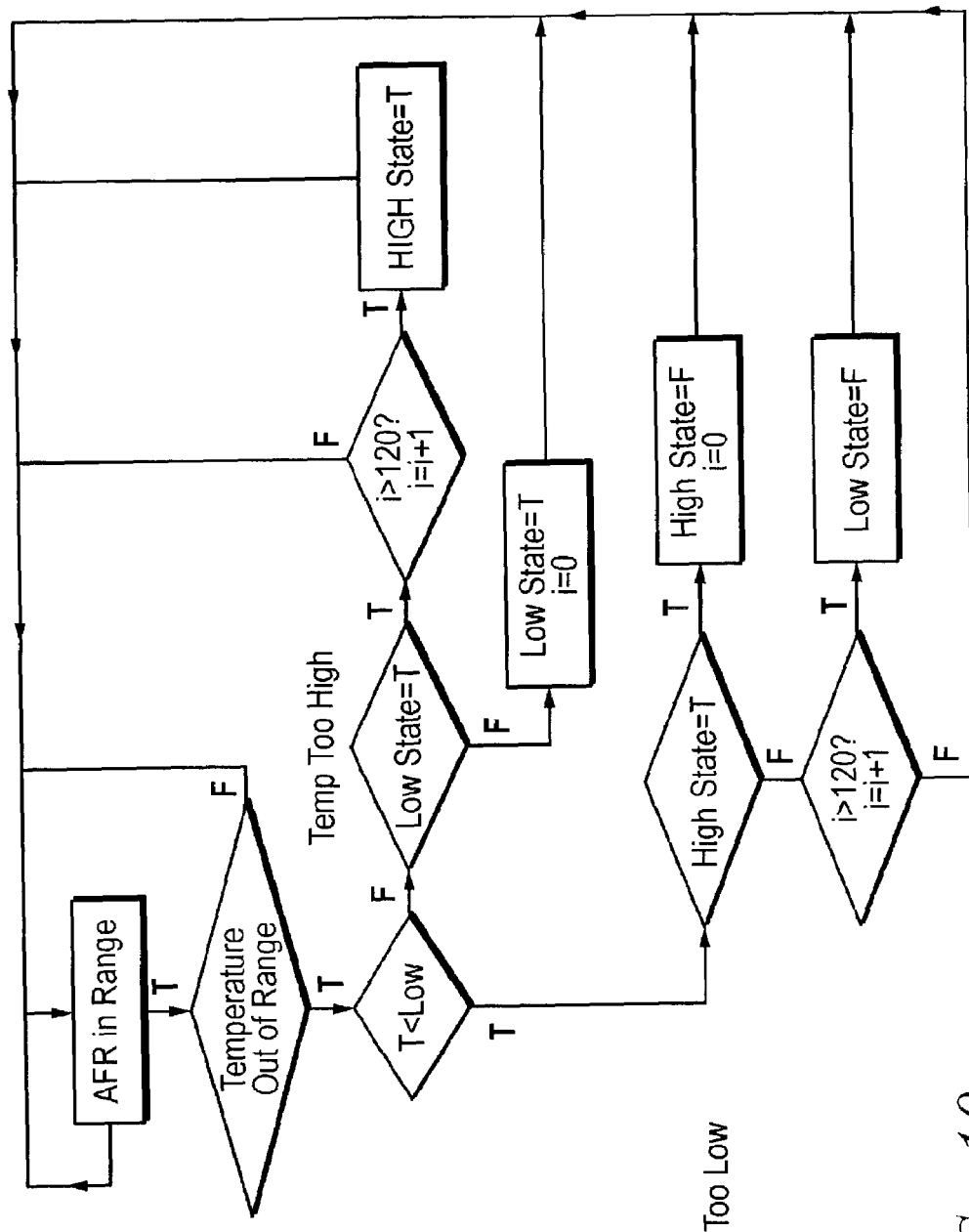
FIG. 10 is a schematic of a closed-loop fan control logic for maintaining the catalyst inlet temperature.

In a preferred embodiment, the data acquisition and control system is provided with a computer program to control the system and to acquire and process the signals from the measured parameters. The computer program can be written in a variety of different ways, which will be well known to persons versed in the art. The controller preferably is provided with a closed-loop fan control to maintain catalyst inlet temperature, preferably at from about −50° C. to about +50° C. about a setpoint temperature, preferably from about −5° C. to about +5° C. about a setpoint temperature. The setpoint temperature is dictated by the cycle being simulated. FIG. 10 shows a schematic of a suitable closed-loop fan control in which the controller output varies the speed of the cooling fans from off, to low, to high.

The application will be better understood with reference to the following working examples, which are illustrative only.

EXAMPLE 1

Figure 8:
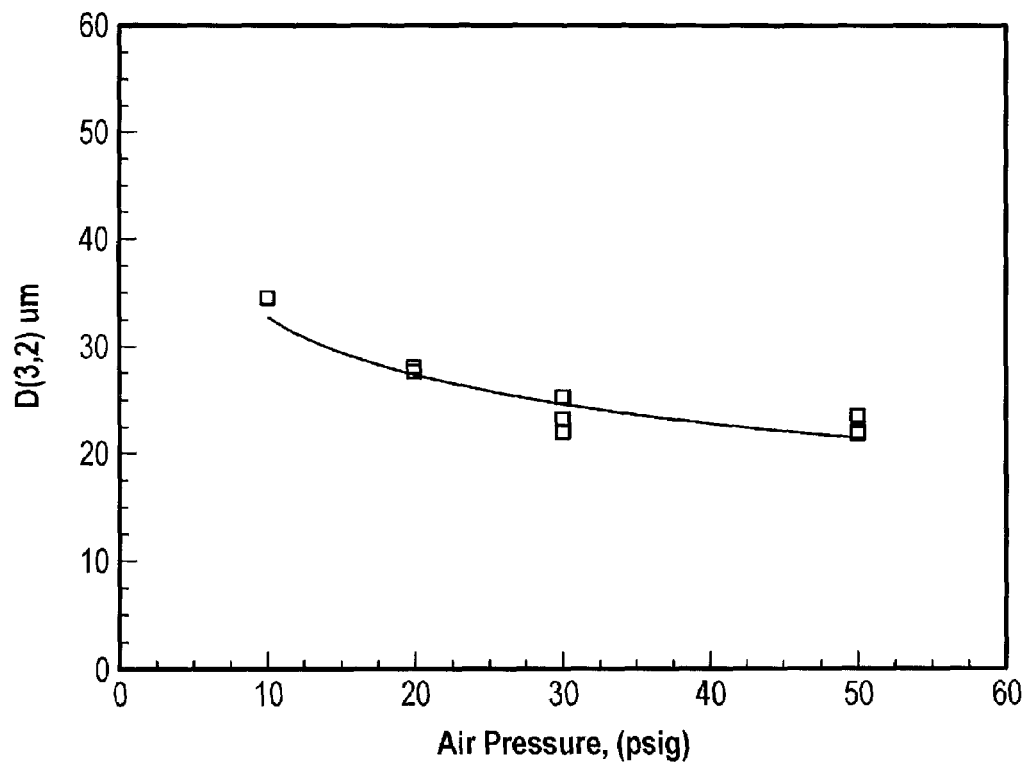
FIG. 8 is a chart of droplet trajectories for various size droplets in a droplet distribution with an SMD of 20 microns (Example 1).

A series of tests was performed to determine the droplet sizes for lubricant injected into the system. Results of droplet sizing tests are shown in FIG. 8. The figure shows the "Sauter mean diameter" of the droplets in microns (labeled "D(3,2)") as a function of air pressure for the planned oil flow of 0.8 mL/min. The Sauter mean diameter (or SMD or $D_{32}$) is the drop diameter of an idealized monodisperse spray that has the same surface area-to-volume ratio as the actual polydisperse spray. The surface area-to-volume ratio correlates with the evaporation rate of the spray, so the SMD is a common measure of spray characteristics for evaporating or combusting sprays. The SMD is defined mathematically as:

$$SMD = D_{32} = \frac{\sum n_i D_i^3}{\sum n_i D_i^2}$$

where $n_i$ is the number of drops in size class $D_i$. From the figure, it can be seen that the droplet size decreases with increasing air pressure. If there were no other considerations, the highest pressure would be used to give the smallest droplet, since it is desirable to have as much of the oil evaporate as possible. For this apparatus, however, nitrogen, not air, was used for the "air assist" gas. The nitrogen consumption preferably is kept at a minimum, both from an operating cost standpoint, and to keep the percentage of nitrogen in the exhaust stream as low as possible. As a result, there is a trade-off between the droplet size and pressure. Acceptable pressures were determined during the optimization testing of the apparatus.

To assist in determining the pressure-droplet size tradeoff, a computer simulation was run using a computer program (TESS, Southwest Research Institute) that calculates the amount of the liquid which will evaporate at various locations downstream of the liquid droplet injection. The computer simulation assumed a 2.5 inch diameter pipe and exhaust gas flow of 50 scfm at 400° C. The oil spray had an SMD of 20 microns. The spray half-angle with respect to the center line was 9 degrees.

FIG. 8 shows the droplet trajectories for various size droplets in a droplet distribution with an SMD of 20 microns. The larger droplets hit the wall of the 2.5 inch diameter pipe (31.75 mm radius) at approximately 250 mm downstream from the nozzle. With a 20 micron SMD, about 75 percent of the oil evaporates, and 25 percent impinges on the wall. With a 30 micron SMD, only 50 percent of the oil evaporates before impinging on the wall. Based on this data, it is important to have the SMD as small as possible.

EXAMPLE 2

A series of tests were performed in order to demonstrate that the apparatus could provide useful information on full scale catalytic converter durability with oil injection. The tests were performed with catalyst bricks identified in the following Table:

| | |
|---|---|
| Catalyst Manufacturer | Englehard |
| Designation | FEX-010-M2 |
| Size | 3.268" Dia. by 3.0" Long |
| Cell Density | 400 cells/sq. in. |
| Catalytic Metals | Palladium/rhodium @ 9:1 |
| Metal Loading | 60 g/cu. ft. |

Fully formulated lubricant oils were used for the tests, by which is meant that the lubricant oils had detergents and other additives as well as base lube stock. The lubricant oils are described in the following table:

|  | Oil No. 1 | Oil No. 2 |
|---|---|---|
| SwRI identification | EM-2209-EO | EM-2210-EO |
| SAE viscosity | 5W30 | 5W30 |
| density, g/cu. Cm | 0.867 | 0.865 |
| Weight Percent Phosphorus | 0.11 | 0.06 |

Modern computer controlled vehicle engines provide two modes of fuel control, an open-loop control (engine crank, warm up, hard acceleration), and stoichiometric closed-loop control (part throttle and idle conditions) after the catalyst has reached operating temperature. During the closed-loop mode the engine air-fuel ratio is constantly perturbating between slightly rich and slightly lean (due to the on-off switch type operation of the exhaust oxygen sensor used for feedback). Performance evaluation tests were therefore conducted using simulations of the rich open-loop (steady state) mode and the perturbated stoichiometric closed-loop mode. The temperature at which the HC, CO and $NO_x$ conversion efficiency reached 50 percent was evaluated during the rich steady-state air-fuel ratio tests, and the catalyst HC, CO, and $NO_x$ efficiency at 425° C. was evaluated during perturbated stoichiometric tests.

The results of the light-off and steady state efficiency evaluations are presented in the table below. The data are presented in ascending order of amount of oil injected, rather than in chronological order in which the catalyst was aged or evaluated.

catalyst to light-off. This temperature increase was small, however. As was seen with the efficiency measurements, there did not appear to be a measurable difference in light-off temperature between 0.11 and 0.06 percent phosphorus oil.

It is generally assumed by those skilled in the art that it is the phosphorus in the oil which poisons the catalytic converter catalyst. Thus, for equal volumes of oil injected, one would expect that oil with a higher phosphorus level would poison the catalyst to a greater extent. This trend was not clearly evident from the validation test results presented above. The question thus arises as to whether there is really no difference in catalyst performance with varying phosphorus levels, at least over the range tested, or whether the present application was unable to replicate a difference that might be seen in actual engine operation. In order to explore the catalyst performance differences more fully, the amount of phosphorus injected during each test was calculated from the weight percent phosphorus, the oil density, and the volume of oil injected. The total amount of oil and phosphorus injected, and the oil and phosphorus injection rate for each test, are also presented in table of validation test results above.

The perturbated conversion efficiencies for HC, CO and $NO_x$, respectively, as a function of total phosphorus mass injected were determined. Comparing the conversion efficiencies for all emissions as a function of phosphorus mass and as a function of oil injected, it appears that the plots against phosphorus mass show slightly less data spread than was seen in the plots of oil consumed. This observation lends credence to the assumption that it is the phosphorus in the oil that poisons the catalyst. The 50 percent conversion tem- Validation Test Results

| Core | Location inches | Hours | Oil Used, mL | Oil, mL/hr | P, wt % | Total P, grams | P, mg/hr | Rich Steady-State Temp. ° C. at 50% Conversion | | | Perturbated Stoichiometric % Conversion @ 425° C. | | |
|---|---|---|---|---|---|---|---|---|---|---|---|---|---|
| | | | | | | | | HC | CO | $NO_X$ | HC | CO | $NO_X$ |
| REF | N. A. | 0 | 0 | 0 | 0 | 0 | 0 | | | | 71 | 96 | 50 |
| B4 | 30 | 25 | 500 | 20 | 0.11 | 0.476 | 19.05 | 374 | 310 | 314 | 88 | 98 | 52 |
| B5 | 30 | 25 | 500 | 20 | 0.06 | 0.260 | 10.39 | 377 | 312 | 335 | 88 | 99 | 47 |
| B4(avg, of 2) | 30 | 50 | 1000 | 20 | 0.11 | 0.953 | 19.05 | 372 | 313 | 329 | 84 | 95 | 44 |
| B5(avg. of 2) | 30 | 50 | 1000 | 20 | 0.06 | 0.520 | 10.39 | 374 | 319 | 341 | 86 | 93 | 53 |
| B1 | 56 | 37.5 | 3781 | 100.8 | 0.11 | 3.602 | 96.05 | 382 | 320 | 330 | 79 | 88 | 44 |

The catalyst conversion efficiencies for HC, CO, and $NO_x$ from the perturbated stoichiometric tests as a function of oil injected were determined. For HC and CO, there was about a 10 percentage point decrease in conversion efficiency between the smallest amount of oil injected and the largest amount. For $NO_x$, there was approximately a 5 percentage point decrease over the same oil injection range. Note that while there were sometimes differences in conversion efficiency between the 0.11 weight percent phosphorus oil and the 0.06 weight percent phosphorus oil, there was no clear correlation with the percent phosphorus.

The temperature at which 50 percent conversion efficiency was obtained during rich light-off as a function of oil injected was determined. As can be seen from the table of validation test results above there was a slight increase in the 50 percent conversion efficiency temperature for HC, CO, and $NO_x$, indicating a slight deterioration in the ability of the perature for the rich light-off tests as a function of total phosphorus mass were determined. Less data spread was seen than in previous examples.

EXAMPLE 3

Figure 9:
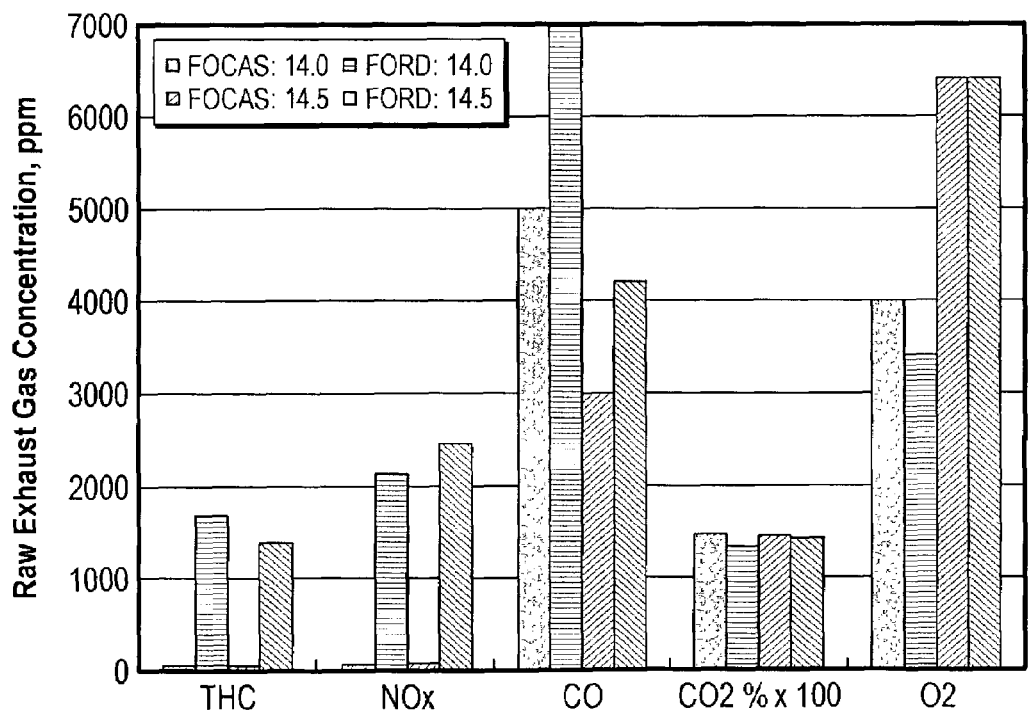
FIG. 9 is a graph showing measured, raw exhaust gas concentrations for the present system (50 SCFM) and a Ford 4.6L, V-8 engine (50 SCFM, 1500 rpm, 90 lb-ft, no EGR), both operating on the same batch of CA Phase II fuel, at a slightly lean and a slightly rich exhaust A/F.

Testing was done to compare the exhaust gas of a typical gasoline fueled engine to the burner system of the present application. FIG. 9 shows measured, raw exhaust gas concentrations for the present system (50 SCFM) and a Ford 4.6 L, V-8 engine (50 SCFM, 1500 rpm, 90 lb-ft, no EGR), both operating on the same batch of Calif. Phase II fuel, at a slightly lean and a slightly rich exhaust A/F. The A/F was calculated using the measured raw exhaust gas composition and fuel properties; a method well known to those versed in the art.

FIG. 9 shows that the exhaust of the present system contains much lower THC and $NO_x$ levels, compared to a Ford 4.6 L engine. The CO level is about half to three quarters of the engine level, and the $CO_2$ and $O_2$ are approximately the same (as these two elements are largely controlled by AFR, not combustion conditions). THC is low because the burner is highly efficient with steady, well vaporized fuel flow, and there are no quench regions resulting in partial burn, as in an engine. $NO_x$ is low because the burner operates at near atmospheric pressure, unlike an engine in which $NO_x$ is a result of the high pressure of combustion. Nevertheless, the exhaust gas of the present system can be considered sufficiently similar to engine exhaust gas because the exhaust gas is considered simply a "carrier gas" for the potential catalyst poisons.

EXAMPLE 4

In order to compare the results produced by the instant application with those which would be obtained with an actual internal combustion engine, the results were compared to those provided in Beck, D. C., Somers, J. W., and DiMaggio, C. L., "Axial Characterization of Catalytic Activity in Close-Coupled Lightoff and Underfloor Catalytic Converters", Applied Catalysis B: Environmental, Col. 11 (1977) pages 257–272, Elsevier Science B.V. ("Beck"). The Beck vehicle had a 3.8 liter V-6 engine with close coupled "light-off" catalytic converters in the exhaust from each cylinder bank of the engine, and the outlets from these were combined into a single pipe containing a single underfloor converter. The light-off catalyst contained only palladium at a loading of 75 g/cu.ft. This catalyst was similar to the catalyst used in the testing of the instant application, as described in the first table of Example 2.

Phosphorus tends to collect more at the upstream end of the catalyst. In Beck, the three inch long light-off catalysts were cut into three sections, each one inch thick, starting at the upstream face. As expected, the phosphorus contained in each section decreased with distance from the front face. A phosphorus analysis of each section showed that the upstream section contained 1.6 weight percent phosphorus, the middle section 0.9 percent, and the downstream section 0.25 percent phosphorus. The samples from the Beck catalysts were tested for conversion efficiency in a synthetic gas reactor system, similar to that employed to determine the conversion efficiencies of the instant application. Warmed-up performance of these samples was tested at stoichiometric air-fuel ratio and 600° C. for HC, CO, and $NO_x$ respectively. Beck presents conversion efficiencies from three samples with three different levels of phosphorus poisoning, comparable to the validation tests of the instant application with various levels of phosphorus. Furthermore, Beck states that "The absolute concentrations of phosphorus and zinc are consistent with those found in . . . other . . . converter systems which have been extensively aged," suggesting that the vehicle used in this study consumed oil at a relatively nominal rate. This nominal exposure for 56,000 miles is also comparable to the maximum validation test of the instant application of 100 mL/hr for 37.5 hours, which is equivalent to roughly 37,500 miles of nominal exposure. Thus, it appears that the conversion efficiency results of the instant application can be quantitatively compared to the conversion efficiency results of the Beck study, assuming the maximum phosphorus rates in that study and the validation tests of the instant application both represent nominal oil consumption for approximately 50,000 miles.

Comparing the conversion efficiencies of HC, CO and $NO_x$ with increasing phosphorus from the two studies, there is about a 10 percent drop in HC efficiency over the data range for both sets of data. For CO efficiency, the drop is less than 10 percentage points for both sets of data. For $NO_x$ efficiency, the overall trend of decreasing efficiency with increasing phosphorus is the same for both data sets, but the data set from the Beck study has a slightly greater decrease than the data of the instant application. The data derived from the instant application also show a lower $NO_x$ efficiency than the Beck data. Overall, the data sets look remarkably similar, thus demonstrating that the instant application can produce phosphorus poisoning data similar to that seen in the field.

EXAMPLE 5

The objective of this work was to develop a control method for the FOCAS™ burner system (adding subsystems if necessary) that would allow the burner to simulate exhaust temperature, flow, and AFR created by an engine during accelerated thermal aging. Next, the methodology was validated by determining if the burner system provides accelerated thermal aging comparable to an engine. The validation portion of the study examined the aging differences between six like catalysts, aged using the General Motors Rapid Aging Test version A (RAT-A) cycle. Three catalysts were aged using a gasoline-fueled engine, and the other three used the modified FOCAS™ burner system. Both systems were programmed to run to the engine test cycle specifications to provide identical inlet temperature, AFR profiles, and catalyst space velocity conditions. The catalyst performance at defined intervals and at the conclusion of the aging was measured and compared between the two systems. In addition, the variation and repeatability of the temperature and AFR control of each system were assessed and compared.

Figure 11:
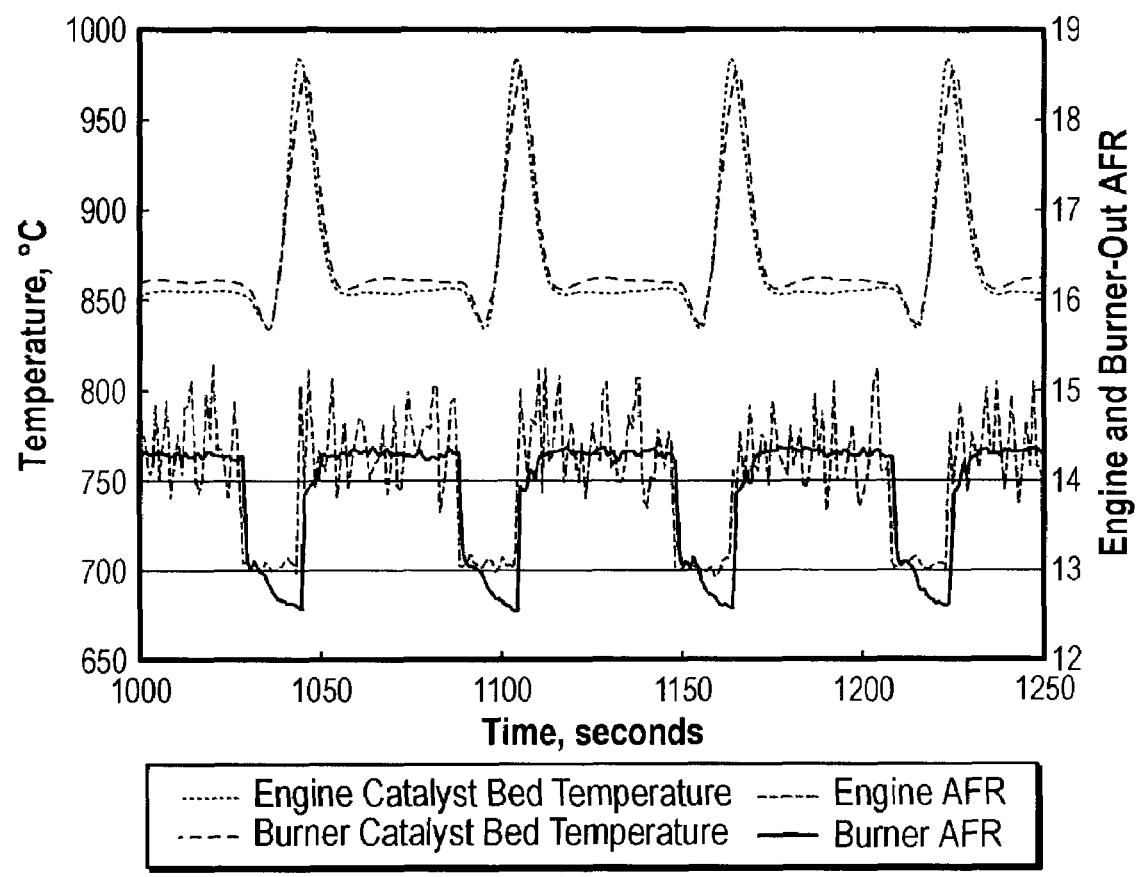
FIG. 11 shows a RAT-A simulation on FOCAS™ compared to an engine.

One industry-accepted engine-based catalyst accelerated aging cycle which was used as a reference point in this study is the General Motors Rapid Aging Test Version A (RAT-A) cycle. A simulation of the RAT-A cycle was run on the FOCAS™ burner system and compared to the cycle run on the engine. It was demonstrated that the burner can be used to generate a very similar thermal profile inside the catalyst when compared to the profile generated by the engine. The shape of the thermal excursion was reproduced, and the AFR into the catalyst could be controlled and reproduced. Two differences were noted between the two systems; there appeared to be some burning of the reactants in the exhaust pipe, prior to entering the catalyst in the burner system, and the FOCAS™ burner had much tighter AFR control than the engine. The burning of the reactants before the catalyst resulted in a slight shift forward of the location of the peak temperature during the thermal excursion. The thermal profiles generated by the engine and by the burner are shown in FIG. 11, along with the measured AFR for each system.

The similarity was then tested by using the FOCAS™ burner system to age catalysts. During the testing portion of the program, six catalysts were aged for 100 hours on the RAT-A cycle; three on an engine aging stand, and three on the FOCAS™ burner system. The catalyst performance at defined intervals and at the conclusion of the aging was measured and compared between the two systems. In addition, the variation and repeatability of the temperature and AFR control of each system were assessed and compared.

The performance evaluations consisted of comparing the regulated emissions across the Federal Test Procedure (FTP) and using an engine-based catalyst performance evaluation rig to measure the catalyst conversion efficiency as a function of exhaust air/fuel ratio (AFR) and catalyst light-off temperature. FTP emissions utilized a 1998 Honda Accord vehicle, while engine-based catalyst performance evaluations were performed on an engine stand.

Figure 12:
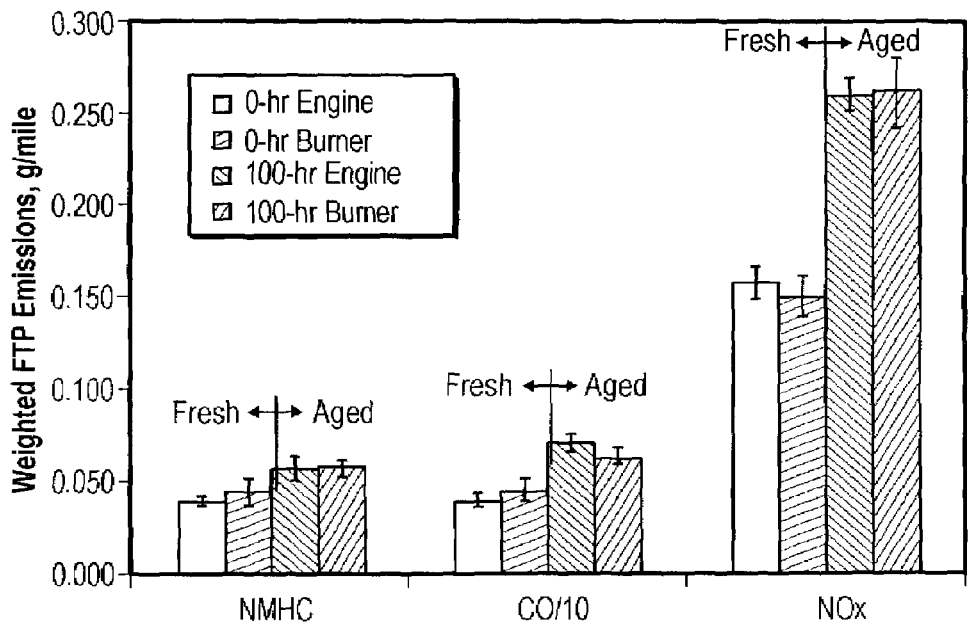
FIG. 12 shows a comparison of the FTP performance degradation for average engine and burner aged catalysts.
Figure 13:
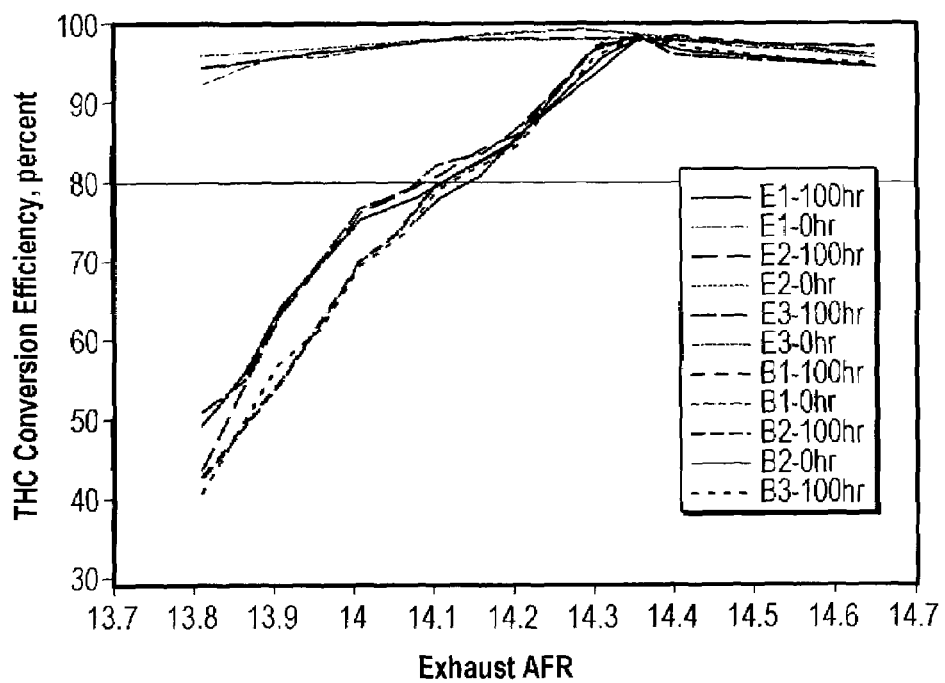
FIG. 13 shows THC conversion efficiency, as measured by an engine-based catalyst performance evaluation rig, for unaged and aged catalysts.

The FTP performance evaluations showed that the burner and the engine produced equivalent aging effects, resulting in deterioration factors for THC, CO, and $NO_x$ that were not statistically different between the two methodologies. FIG. 12 shows the average FTP performance for the engine- and burner-aged catalysts, before and after aging. The engine-based catalyst performance evaluations revealed that the two methodologies produced equivalent results near stoichiometric (where a gasoline engine is tuned to run). However, as the AFR deviated from stoichiometric to the rich side it was observed that burner aging resulted in a more severe aging effect for THC and CO (slight at AFR>14.1, more severe at AFR<14.05). Although the difference in this effect was small and shifted from the location of typical operation, it was noted as a difference. FIG. 13 shows the measured THC conversion efficiency as a function of AFR and catalyst age.

The final catalyst evaluations involved coring the catalysts, and analyzing the surface area and composition. The two analyses run were BET (Bruhauer-Emmett-Teller) for assessment of surface area and porosity, and PIXE (Proton-Induced X-Ray Emissions) for compositional analysis. The BET test provides information on the surface area of the substrate and washcoat. This analysis can be correlated to thermal degradation. PIXE provides information on the composition of the substrate, washcoat, and any deposits on the surface of the catalyst. PIXE analysis can provide information on the differences in the deposits on the catalysts between the engine and the burner (which provides oil-free aging). It was found that the catalysts were composed of very similar levels of washcoat, but that the FOCAS™ aged catalysts had an obvious absence of oil-derived deposits. However, the levels of oil deposits found on the engine-aged catalysts were small, and it is likely that they did not impact performance.

Overall, it was found that the FOCAS™ burner system provided a flexible means for simulating the engine aging cycle, and produced thermal aging results equivalent to the engine cycle. The post-mortem analysis shows that the FOCAS™ aging provides thermal aging in the absence of non-thermal aging (i.e. oil deposits), thereby creating a means for the definitive isolation of thermal and non-thermal aging effects. Some advantages that using a burner offers over an engine for aging include: very tight AFR control (±0.02 AFR), very broad range of stable AFR operation (8:1 to 25:1), few moving parts (a blower and a fuel metering valve), and minimal adjustments to achieve setpoints. Also, a burner can be run at very high temperatures without severely damaging the system components, making for a low cost, low risk simulation of very-high-temperature cycles.

EXAMPLE 6

Seven general design criteria/guidelines were used to design preferred fuel injector. These criteria were:

1) Pressure in the air channel could not exceed pressure in the fuel channel or fuel flow would be interrupted. Assuming the burner flow is steady-state (a reasonable assumption):

$$\text{For Air: } \frac{P_{1_A}}{A_{1_A}} \times A_{2_A} = P_{2_A} \quad \text{For Fuel: } \frac{P_{1_f}}{A_{1_f}} \times A_{2_f} = P_{2_f}$$

2) Desired fuel inlet pressure (based on fuel pump specifications) is 40 psig<$P_f$<60 psig.
3) The area of the fuel jets must provide adequate fuel flow for the required flow range, in the given operating pressure range.
4) The size of the fuel holes must be a standard drill bit size, and must be large enough to allow machining without excessive difficulty.
5) Fuel/Air spray should aim for outer air shroud convergence to keep the burner flame off the combustor wall as long as possible.
6) Direct point of fuel jet convergence behind air shroud. Adjustment of $P_A$ can be used to vary the position of the fuel spray relative to the air shroud.
7) Keep interaction point of the fuel and the air jet at the center of the combined outlet hole to prevent driving the fuel spray to the inner wall of the injector. This would lead to dripping, and coking of the face of the injector.
8) The degree of atomization and stability was determined visually, using the quartz combustor. The assessment was based on the blueness of the flame (orange flames indicated sooty conditions), the soot forming potential (assessed by examining the injector, combustor, heat exchanger and exhaust pipe), and the stability of the flame (assessed using a linear AFR sensor).

Since the burner is designed to operate predominantly at stoichiometric, the required fuel flow was calculated using the required total exhaust gas flow and the stoichiometric AFR of the fuel used for aging. The following analysis presents the calculation of the required fuel flow for the burner operating at stoichiometric, with a total exhaust flow of 70 SCFM.

$m_{exh}$=70 SCFM=2.3015 kg/min $m_{fuel}=m_{exh} \times AFR_{stoich}^{-1} \times 1$ lb/0.45359 kg×60 min/hr $m_{fuel}$=21.28 lb/hr at stoichiometric $m_{air}=m_{fuel} \times (AFR_{avg}/AFR_{stoich})$ $AFR_{avg}$=(16/60×13)+(44/60×14.4)=14.03 RAT-A cycle $m_{air}$=65.1 SCFM Therefore, the rate of energy consumption of the burner over the cycle is:

Q=$m_{fuel}$×Energy content of fuel

Q=$m_{fuel}$×18,400 BTU/lb=21.28 lb/hr×hr/3600 sec× 18,400 BTU/lb×1.055 KJ/BTU

Q=115 kW

Figure 20:
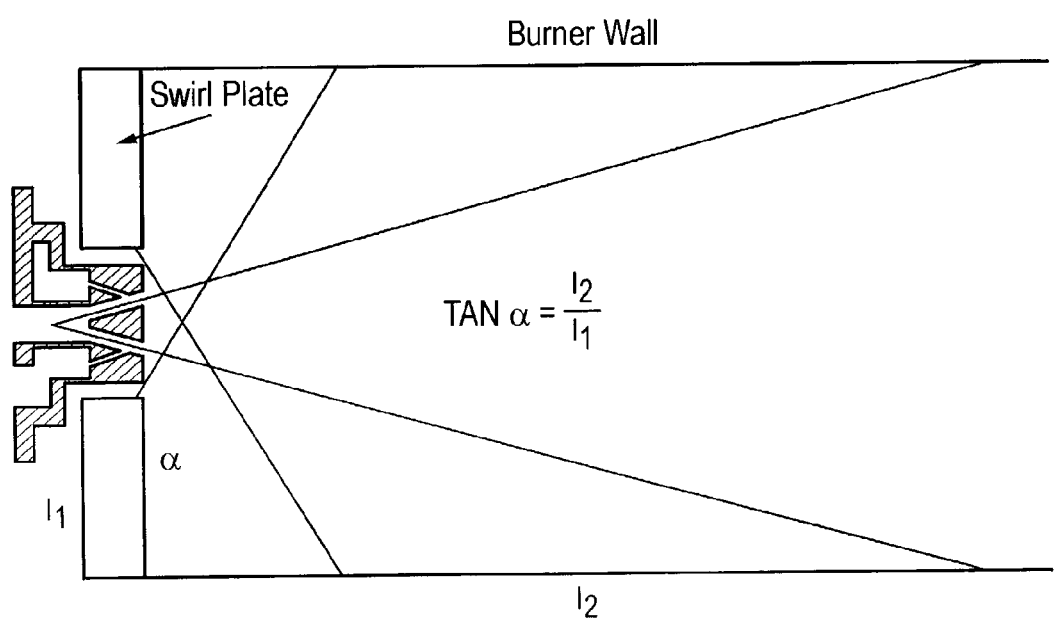
FIG. 20 illustrates a schematic of prediction for impact of fuel/air stream with burner wall.

Referring to FIG. 20, the distance $l_1$ is the radius of the combustor tube, and $l_2$ is the distance to impact with the inner wall of the combustion tube 210. The distance $l_2$ can be calculated using geometry, but then is corrected for interaction with the fuel jet (which tends to lengthen $l_2$) and the inner swirl jets 242 (which tend to shorten $l_2$). The inner swirl jets 242 have the greatest impact. The final angle for X,X' is a function of fuel shearing and atomization (which is improved with lower X,X') and preventing impact with the wall of the combustion tube 210 by directing the fuel spray into the area where the outer swirl jets 253 in FIG. 3 converge (about four to five inches from the face of the swirl plate). These outer swirl jets 253 help to keep the hottest part of the flame off the inner wall of the combustion tube 210, which enables the burner to run stoichiometric for extended periods of time. Table 1 shows calculated impact of the fuel spray with the wall of the combustion tube 210, with and without swirl jet interaction. From these data, two fuel injectors were built, E-62 and E-76 (where the number refers to the angle X,X' in degrees).

TABLE 1

| Air Injection Angle, X,X' | Calc. Impact Distance, No Interaction, in. | Observed Impact, in. | Calc. Impact Distance with Medium Interaction, in. |
|---|---|---|---|
| 60 | 2.75 | | 2.5 |
| 61 | 2.88 | | 2.57 |
| 62 | 3.03 | | 2.64 |
| 63 | 3.18 | | 2.71 |
| 64 | 3.34 | | 2.8 |
| 65 | 3.52 | | 2.89 |
| 66 | 3.71 | | 2.98 |
| 67 | 3.92 | | 3.08 |
| 68 | 4.14 | 3.25–3.5 | 3.2 |
| 69 | 4.38 | | 3.32 |
| 70 | 4.65 | | 3.45 |
| 71 | 4.95 | | 3.6 |
| 72 | 5.27 | | 3.76 |
| 73 | 5.63 | | 3.94 |
| 74 | 6.04 | | 4.14 |
| 75 | 6.5 | | 4.37 |
| 76 | 7.02 | | 4.64 |
| 77 | 7.62 | | 4.94 |
| 78 | 8.32 | 5 | 5.29 |
| 79 | 9.15 | | 5.7 |
| 80 | 10.13 | | 6.19 |

Experiments were performed to develop a control method for the FOCAS™ burner system (adding subsystems if necessary) that would allow the burner to simulate exhaust temperature, flow, and AFR created by an engine during accelerated thermal aging. The methodology was validated by determining if the burner system provided accelerated thermal aging comparable to an engine. The validation portion of the study examined aging differences between six like catalysts, aged using the General Motors Rapid Aging Test version A (RAT-A) cycle. Three catalysts were aged using a gasoline-fueled engine, and the other three used the modified FOCAS™ burner system. Both systems were programmed to run to the engine test cycle specifications to provide identical inlet temperature, AFR profiles, and catalyst space velocity conditions. The catalyst performance at defined intervals and at the conclusion of the aging was measured and compared between the two systems. In addition, the variation and repeatability of the temperature and AFR control of each system were assessed and compared.

The baseline performance of the systems was tested using a engine-based catalyst performance evaluation rig. Catalyst performance is measured as a function of exhaust air/fuel ratio and exhaust gas temperature. The catalysts were degreened by operating for four hours on the RAT-A engine aging cycle. Each catalyst's performance was then reevaluated. Each system was then installed on the vehicle and two Federal Test Procedures (FTP) evaluations were performed. The FTP is a chassis-based vehicle emissions test cycle, used for certifying vehicle emissions and fuel economy. The emissions from the FTP cycle are regulated by EPA according to vehicle type. Six catalysts with closest performance were selected and randomly assigned to be engine or burner aged. The seventh catalyst was the 'set-up' catalyst.

TEST EQUIPMENT AND PROCEDURES

A certification grade California Phase II gasoline obtained from Phillips 66 was used as the test fuel throughout all vehicle testing. The following Table gives the supplier analysis of this fuel.

| | | Specification | Supplier |
|---|---|---|---|
| Item | ASTM | Unleaded | Analyses |
| Octane, research | D2699 | 93 (min.) | 97.7 |
| Sensitivity | | 7.5 (min.) | 10.3 |
| Pb (organic), g/U.S. gal | D3237 | 0.050 | NR |
| Distillation Range: | | | |
| IBP° F. | D86 | 75–95 | 104 |
| 10% Point, ° F. | D86 | 130–150 | 143 |
| 50% Point, ° F. | D86 | 200–230 | 206 |
| 90% Point, ° F. | D86 | 290–310 | 292 |
| EP, ° F. | D86 | 390 (max.) | 375 |
| Sulfur, wt. % | D1266 | 0.10 (max.) | 31 |
| Phosphorus, g/U.S. gal. | D3231 | 0.005 (max.) | 0.001 |
| RVP, psi | D323 | 6.7–7.0 | 6.8 |
| Hydrocarbon Composition: | | | |
| Aromatics, % | D1319 | 23–25 (max.) | 23.5 |
| Olefins, % | D1319 | 4–6 (max.) | 5.95 |
| Saturates, % | D1319 | a | — | a Remainder
NR - Not reported

A pump grade California Phase II gasoline was used for aging and performance evaluations. The difference between the two fuels was that the pump grade had detergents that prevented engine deposits.

A. Chassis Dynamometer Testing

All emissions tests were conducted in accordance with the EPA Federal Test Procedure (FTP), which utilizes the Urban Dynamometer Driving Schedule (UDDS). The UDDS is the result of more than ten years of effort by various groups to translate the Los Angeles smog-producing driving conditions to chassis dynamometer operations, and is a nonrepetitive driving cycle covering 7.5 miles in 1372 seconds with an average speed of 19.7 mph. Its maximum speed is 56.7 mph.

Figure 14:
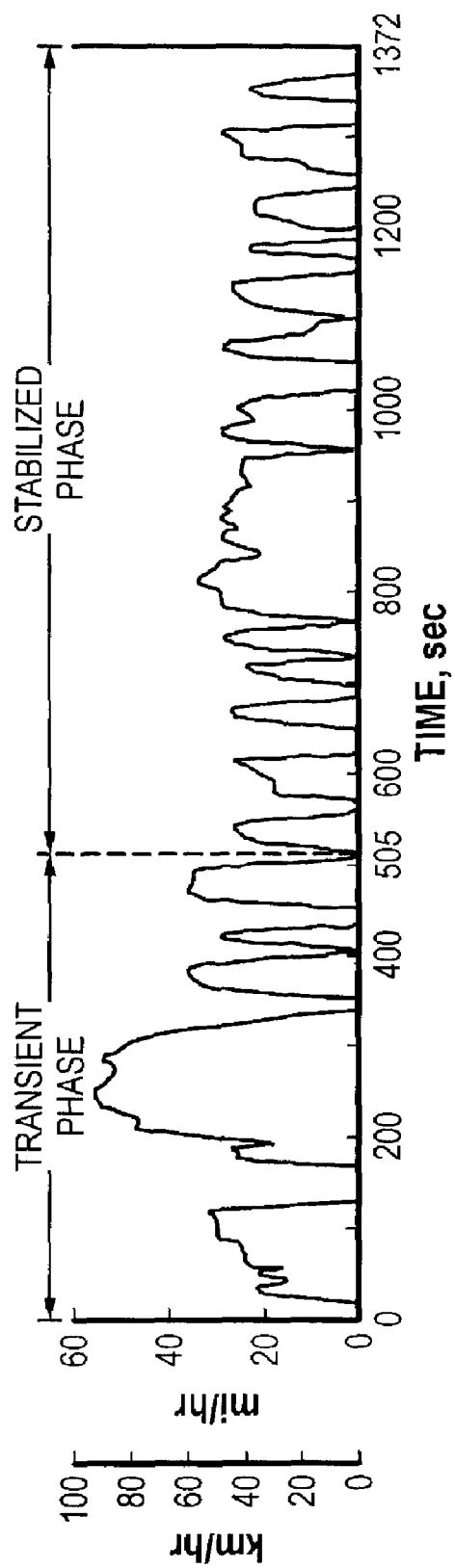
FIG. 14 is a speed versus time illustration of the 505 and the 867 phases of the FTP driving cycle.
Figure 15A:
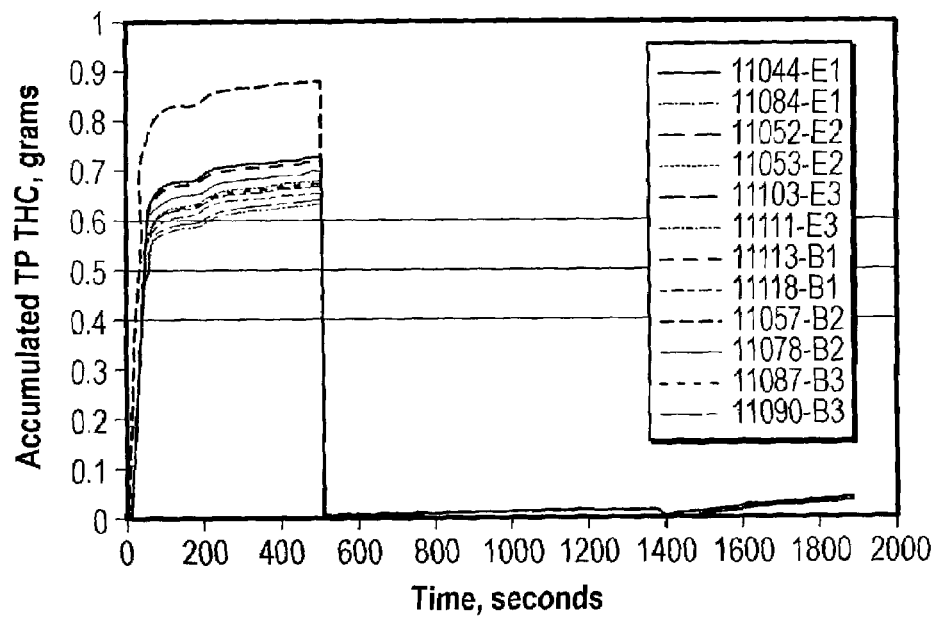
FIG. 15 illustrates modal THC emissions before and after aging.
Figure 15B:
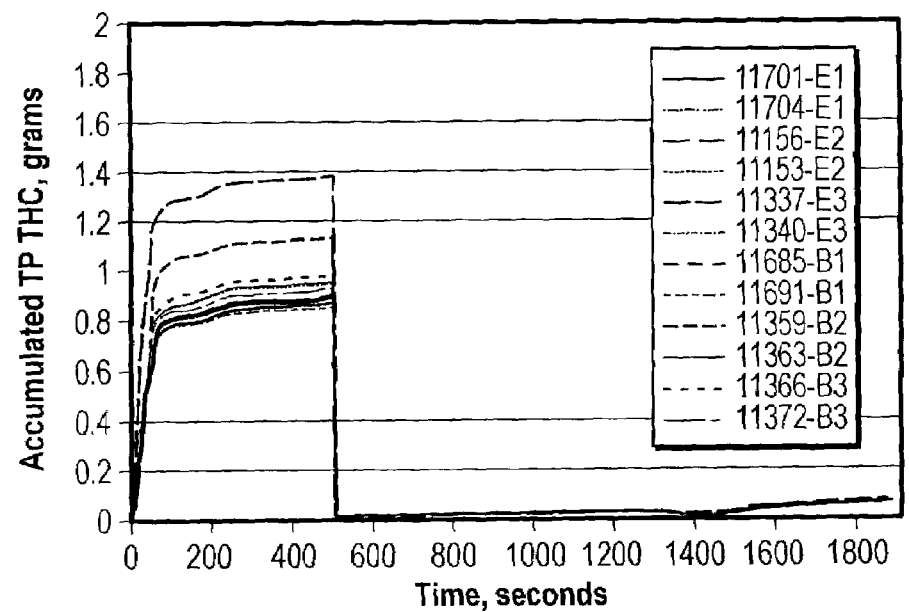
Figure 15C:
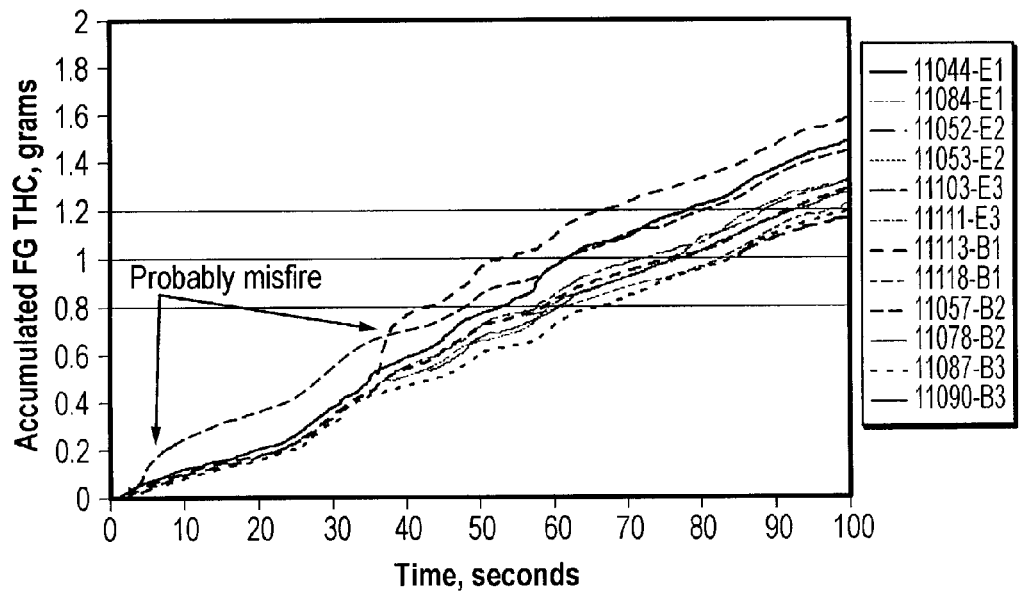
Figure 15D:
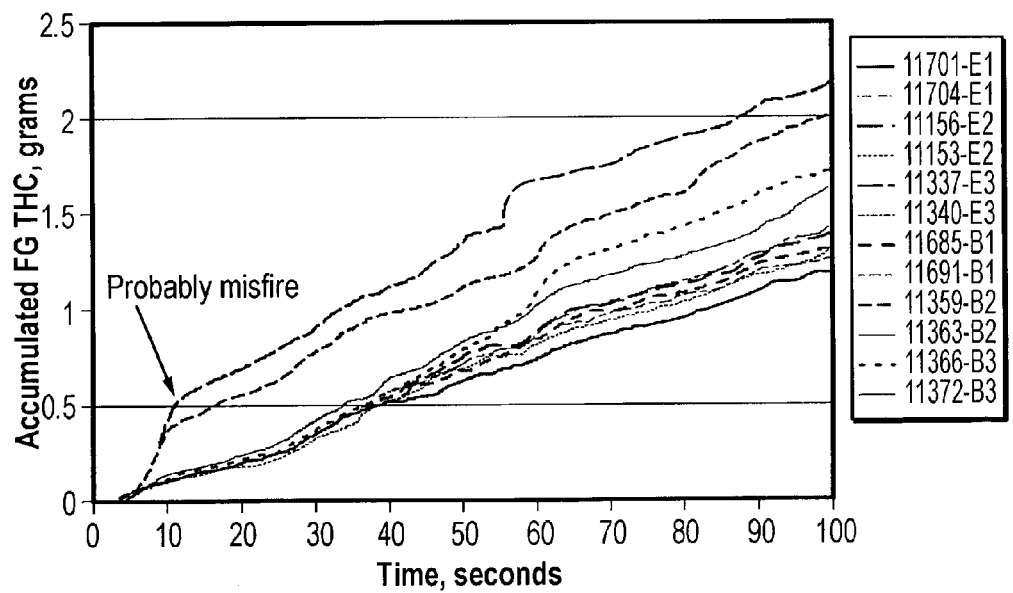

An FTP consisted of a cold-start, 505-second, cold transient phase (Bag 1), followed immediately by an 867-second stabilized phase (Bag 2). Following the stabilized phase, the vehicle was allowed to soak for 10 minutes with the engine turned off before proceeding with a hot-start, 505-second, hot transient phase (Bag 3) to complete the test. For a 3-bag FTP, the distance traveled was 11.1 miles at an average speed of 21.6 mph. The vehicle's exhaust was collected, diluted, and thoroughly mixed with filtered background air to a known constant volume flowrate using a positive displacement pump. This procedure is known as Constant Volume Sampling (CVS). A proportional sample of the dilute exhaust was collected in a sample bag for analysis at the end of the test. The emissions were mathematically weighted to represent the average of several 7.5 mile trips made from cold and hot starts. A speed versus time illustration of the 505 and 867 phases of the FTP driving cycle is given in FIG. 14. A summary of cycle duration, driving distance, and average speed is given in the following Table:

| Segment | Duration, seconds | Distance, miles | Average Speed, mph |
|---|---|---|---|
| Transient Phase | 505 | 3.60 | 25.7 |
| Stabilized Phase | 867 | 3.90 | 16.2 |
| UDDS Total | 1372 | 7.50 | 19.7 |

(FTP CYCLE IS UDDS + HOT-START TRANSIENT 505)

Exhaust emissions from the FTP cover the effects of vehicle and emission control system warm-up as the vehicle is operated over the cycle. The "stabilized" phase produces emissions from a fully warmed up or stabilized vehicle and emission control system. "Hot-start" or "hot transient" phase emissions result when the vehicle is started after the vehicle and emission control systems have stabilized during operation, and are then soaked (turned off) for 10 minutes.

Weighted total emissions from the FTP at 68° F. to 86° F. ambient temperature conditions are regulated by the EPA. The only regulated pollutant for the FTP at cold conditions (20° F.) is carbon monoxide (CO). Tier 1 cold-CO level for passenger cars is 10.0 g/mile. The California ULEV emissions standards for 1998 light-duty passenger cars, intermediate life—50,000 miles (the standards which the test vehicle was certified to) are:

| NMOG: | 0.04 g/mile |
|---|---|
| CO: | 1.7 g/mile |
| $NO_x$: | 0.2 g/mile |

The weighted total mass equivalent emissions for the EPA FTP-75 are calculated as required in the U.S. EPA regulations (40 CFR 86.144-90) using the following equation:

$$\text{Weight g/mile} = 0.43 \times \frac{\text{Phase 1 grams} + \text{Phase 2 grams}}{\text{Phase 1 miles} + \text{Phase 2 miles}} + 0.57 \times \frac{\text{Phase 3 grams} + \text{Phase 2 grams}}{\text{Phase 3 miles} + \text{Phase 2 miles}}$$

After each aging set was completed, the catalysts were installed on the test vehicle and retested over the FTP test cycle to obtain deterioration information. The before and after aging FTP results were then compared to quantify a deterioration factor for each catalyst. The FTP results, averaged by catalyst and aging condition, are given in Table 11.

TABLE 11

COLD-BAG AND WEIGHTED FTP RESULTS, BEFORE AND AFTER AGING

| Test ID Catalyst | Aging Start | THC | NMHC | CO | $NO_x$ | Fuel Economy, mpg |
|---|---|---|---|---|---|---|
| FTP Bag 1 | | | | | | |
| Engine Cat-E1 | 0-hr | 0.75 | 0.70 | 5.72 | 1.84 | 22.3 |
| Engine Cat-E2 | 0-hr | 0.76 | 0.71 | 6.36 | 1.58 | 22.4 |
| Engine Cat-E3 | 0-hr | 0.67 | 0.62 | 5.23 | 1.66 | 22.6 |
| FOCAS ™ Cat-B1 | 0-hr | 0.73 | 0.68 | 5.30 | 1.58 | 22.7 |
| FOCAS ™ Cat-B2 | 0-hr | 0.78 | 0.73 | 6.68 | 1.56 | 22.2 |
| FOCAS ™ Cat-B3 | 0-hr | 0.76 | 0.70 | 6.03 | 1.71 | 22.5 |
| Engine Cat-E1 | 100-hr | 0.94 | 0.87 | 8.49 | 2.47 | 23.2 |
| Engine Cat-E2 | 100-hr | 0.94 | 0.85 | 8.63 | 2.65 | 22.8 |
| Engine Cat-E3 | 100-hr | 0.99 | 0.91 | 8.70 | 2.56 | 22.9 |
| FOCAS ™ Cat-B1 | 100-hr | 0.95 | 0.89 | 7.93 | 2.62 | 22.6 |
| FOCAS ™ Cat-B2 | 100-hr | 1.01 | 0.94 | 8.10 | 2.44 | 22.3 |
| FOCAS ™ Cat-B3 | 100-hr | 1.05 | 0.98 | 8.87 | 2.63 | 22.1 |
| Weighted FTP Emissions Results, g/mi | | | | | | Weighted FE, mpg |
| Engine Cat-E1 | 0-hr | 0.050 | 0.044 | 0.387 | 0.168 | 23.2 |
| Engine Cat-E2 | 0-hr | 0.050 | 0.045 | 0.442 | 0.151 | 23.3 |
| Engine Cat-E3 | 0-hr | 0.045 | 0.040 | 0.381 | 0.154 | 23.4 |
| FOCAS ™ Cat-B1 | 0-hr | 0.048 | 0.042 | 0.409 | 0.151 | 23.5 |
| FOCAS ™ Cat-B2 | 0-hr | 0.052 | 0.046 | 0.503 | 0.149 | 23.2 |
| FOCAS ™ Cat-B3 | 0-hr | 0.050 | 0.044 | 0.461 | 0.146 | 23.5 |
| Engine Cat-E1 | 100-hr | 0.069 | 0.058 | 0.695 | 0.253 | 24.1 |
| Engine Cat-E2 | 100-hr | 0.067 | 0.055 | 0.738 | 0.257 | 23.8 |
| Engine Cat-E3 | 100-hr | 0.070 | 0.060 | 0.631 | 0.249 | 23.0 |
| FOCAS ™ Cat-B1 | 100-hr | 0.068 | 0.058 | 0.579 | 0.252 | 23.5 |
| FOCAS ™ Cat-B2 | 100-hr | 0.075 | 0.062 | 0.732 | 0.268 | 23.3 |
| FOCAS ™ Cat-B3 | 100-hr | 0.073 | 0.062 | 0.698 | 0.279 | 23.0 |

FIG. 15 shows the accumulated tailpipe mass hydrocarbon (THC) for all the FTP tests before and after aging. FIG. 15A is the degreened catalyst for which aged results are given in 15C. FIG. 15B is the degreened catalyst for which aged results are given in 15D. A closer examination of the feedgas THC during cold-start (also shown in FIG. 15) reveals that it is the engine-out variation that causes the tailpipe variation. The modal emissions were then used to calculate vehicle air-fuel ratio (AFR).

Figure 16:
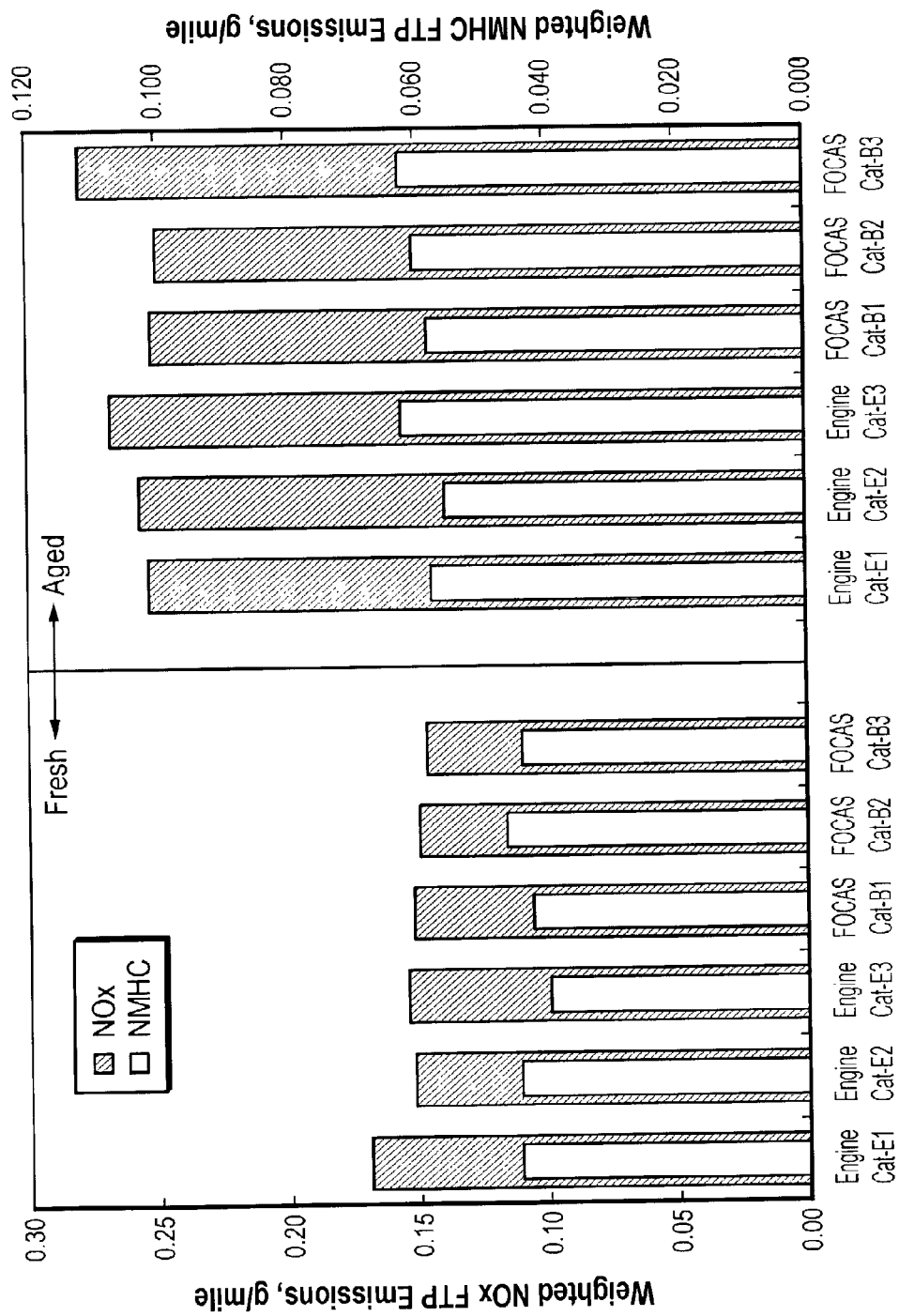
FIG. 16 illustrates average FTP emissions, grouped by catalyst and age.
Figure 17:
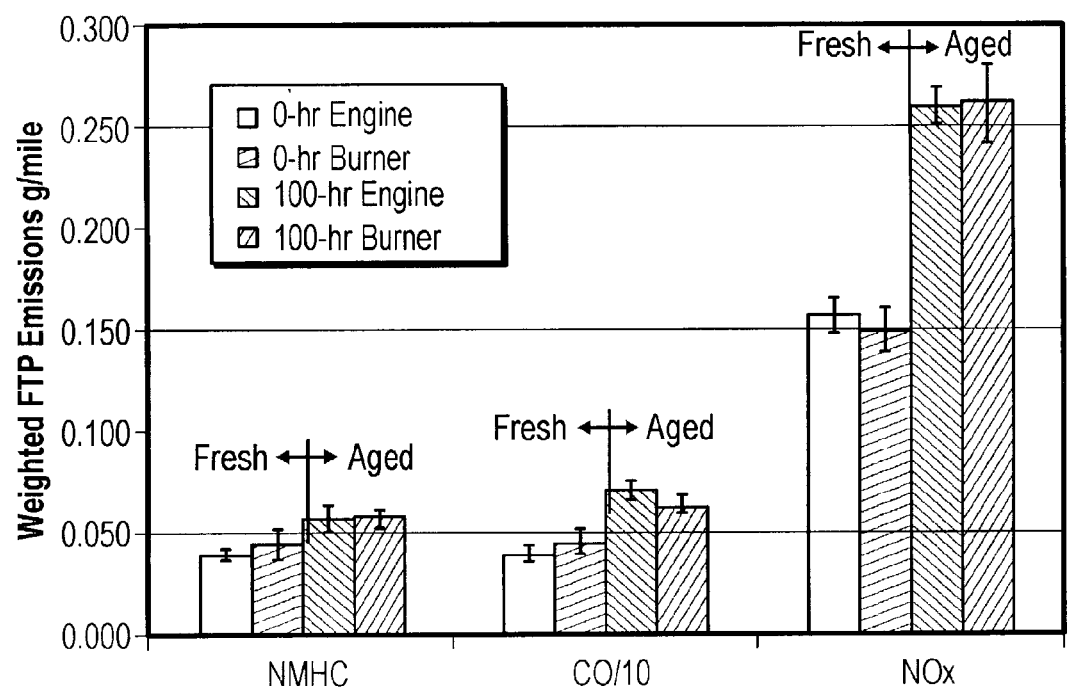
FIG. 17 illustrates a comparison of the FTP performance degradation for the average engine and burner aged catalysts.

FIG. 16 shows a comparison of the weighted FTP emissions for the converters before and after aging. FIG. 17 compares the average performance of the engine-aged catalysts to the burner-aged catalysts. There was some degradation in THC, but the largest impact was on $NO_x$ mass emission (largely due to the positioning of the catalyst on the vehicle). There also appeared to be very similar degradation impacts on both sets of catalysts. Table 12 gives the calculated deterioration factors for each of the regulated emissions by type of aging. The deterioration factor was calculated from the average performance of each catalyst, using the following equation:

$$1 + \left[ \frac{M_{aged} - M_{unaged}}{M_{unaged}} \right]$$

TABLE 12

PERFORMANCE DETERIORATION FACTOR BY CATALYST AND GROUP

| Catalyst Group | Deterioration Factor | | |
|---|---|---|---|
| | NMHC | CO | $NO_x$ |
| Catalyst E1 | 1.31 | 1.79 | 1.50 |
| Catalyst E2 | 1.24 | 1.67 | 1.70 |
| Catalyst E3 | 1.57 | 1.92 | 1.74 |
| Average Engine Aged | 1.37 | 1.80 | 1.65 |
| Standard Deviation of Degradation | 0.18 | 0.13 | 0.13 |
| Catalyst B1 | 1.38 | 1.42 | 1.67 |
| Catalyst B2 | 1.30 | 1.25 | 1.67 |
| Catalyst B3 | 1.43 | 1.51 | 1.92 |
| Average Burner Aged | 1.37 | 1.39 | 1.75 |
| Standard Deviation of Degradation | 0.06 | 0.13 | 0.14 |

Reviewing Table 12 reveals that both aging methods produced equivalent impact on NMHC emissions, but the burner-aged catalysts had less variation in calculated deterioration. There also appeared to be a difference in the $NO_x$ deterioration factors, but the difference was not statistically significant. Also, in examining the $NO_x$ performance of each catalyst, it can be seen that catalyst B3 appeared to have poorer $NO_x$ performance, and sustained the greatest deterioration for $NO_x$. This performance outlier will also appear in the AFR sweep data, and will be presented in the next section.

B. Accelerated Thermal Aging Cycle

The accelerated thermal aging procedure that was used in this work is the published: Sims, G., Sjohri, S., "Catalyst Performance Study Using Taguchi Methods," SAE 881589; Theis, J., "Catalytic Converter Diagnosis Using the Catalyst Exotherm," SAE 94058; Ball, D., Mohammed, A., Schmidt, W., "Application of Accelerated Rapid Aging Test (RAT) Schedules with Poisons: The Effects of Oil Derived Poisons, Thermal Degradation, and Catalyst Volume on FTP Emissions," SAE 972846, each of which is incorporated herein by reference. General Motors Rapid Aging Test version A (RAT-A) cycle. One hundred hours of aging on the GM RAT-A cycle has been correlated to 100,000 miles of on-road operation for some platforms, but, precise miles to hours correlation for experimental components and other platforms is unknown. However, 100 hours of aging on the GM RAT-A cycle does demonstrate a level of durability that is accepted by industry. The following Table outlines the GM RAT-A aging schedule.

The foregoing schedule describes exhaust and catalyst conditions, and does not specify how the engine is set to achieve those conditions; therefore, the same specifications that are used to set up the engine aging were used to set up the burner aging. During aging, exhaust gas AFR and temperature as well as catalyst temperatures were monitored at 1 Hz and stored to file for post processing.

C. Test Vehicle

The test vehicle for the program was a 1998 Honda Accord with 2.3 L 4 cylinder VTEC engine, certified to California ULEV standards. The following Table provides vehicle information, and emissions certification data:

| | |
|---|---|
| VIN | 1HGCG6672WA165200 |
| Engine Description | 2.3L SOHC I-4 16-valve VTEC |
| Engine No. | F23A4-1016788 |
| Engine Family | WHNXV02.3PL4 |
| Transmission | 4-speed automatic |
| Inertia Weight, lbs | 3375 |
| City Fuel Economy (cert) | 23 mpg |
| Highway Fuel Economy (cert) | 30 mpg |
| Emissions Certification Level | 1998 California ULEV |
| FTP Certification Emission levels at 50,000 miles, grams/mile | |
| NMOG | 0.0249 |
| $NO_x$ | 0.0594 |
| CO | 0.2919 |

E. Test Catalysts

The catalysts used were 1997 Honda Civic ULEV production catalysts. Past experience with these catalysts has indicated that they generate very repeatable results and appear to be produced to very tight specifications. The Civic ULEV catalysts are manifold mounted and are supplied attached to exhaust manifolds. After receiving the parts, the catalysts were removed from the original mounting and then canned in "take apart" canisters to allow for easy installation on the aging and performance test stands and selection of the position of the catalyst on the vehicle. The catalyst position was moved from manifold mount to underbody in order to reduce exhaust gas temperatures into the catalysts, which should delay cold-start light-off (initiation of activation). Because this program's objective was to carefully compare the effects of thermal deactivation between two aging methods, the delayed light-off should prove beneficial in discerning the variations in catalyst aging more accurately.

| Mode No. | Description | Parameter Specification | Mode Length, sec |
|---|---|---|---|
| 1 | Closed-loop, Stoichiometric AFR | Inlet Temperature = 800° C. | 40 |
| 2 | Open-loop, Fuel-Rich Operation, Power enrichment | AFR ~ 13:1 (3% CO) | 6 |
| 3 | Open-loop, Fuel-Rich Operation, with Air Injection | AFR ~ 13:1 (3% CO) O2 = 3% (target a 160°–200° exotherm - engine set first, burner set to match) | 10 |
| 4 | Closed-loop, Stoichiometric AFR with Air Injection | Stoichiometric Exhaust out of engine(burner) with continued air injection | 4 |

Exotherm in Step 3 is measured on catalyst centerline, 1 inch deep

F. Engine Aging Stand

Aging was performed using a Ford 7.5 L V-8 engine. Oil consumption was also monitored during aging.

G. FOCAS™ Rig

The burner of the FOCAS™ Rig is a flexible fuel device, and was set to run on gasoline. Air flow provided to the burner was preset by the operator and did not vary throughout the test. The computer controlled the burner AFR by modifying the fuel delivered to the air assisted injection system. The burner system created a very stable steady-state, constant pressure burn that, with gasoline, was capable of operating with a large turn-down ratio (range of AFR operation is 8:1 to 25:1). Continuous operation at stoichiometric could be conducted for at least two hundred hours, preferably for 1500 hours or more, with minimal maintenance. Burner operation could be adjusted to achieve flows ranging from 20 to 70 SCFM (operated at 50 SCFM for this work), and the rig has a preprogrammed, cold-start simulation mode to allow the effects of cold-start to easily be added to an aging cycle.

FIG. 9 shows measured, raw exhaust gas concentrations for the FOCAS™ system (50 SCFM) and a Ford 4.6 L, V-8 engine (50 SCFM, 1500 rpm, 90 lb-ft, no EGR), both operating on the same batch of Calif. Phase II fuel, at a slightly lean and a slightly rich steady-state exhaust A/F (measured using the Urban A/F method). The Urban AFR calculation method calculates exhaust AFR using the measured raw exhaust gas composition and fuel properties.

FIG. 9 shows that the FOCAS™ Rig exhaust contains much lower THC and $NO_x$ levels, compared to a Ford 4.6 L engine. The CO level is about half to three quarters of the engine level, and $CO_2$ and $O_2$ are approximately the same (as these two constituents are largely controlled by AFR, not combustion conditions). THC is low because the burner is highly efficient with steady, well vaporized fuel flow, and there are no quench regions resulting in partial burn, as in an engine. $NO_x$ is low because the burner operates at near atmospheric pressure, unlike an engine in which $NO_x$ is a result of the high pressure and corresponding high peak temperature of combustion.

The control system for the FOCAS™ Rig consists of a Lab VIEW-programmed PC equipped with a touch screen monitor and a multi-function DAQ card, connected to an SCXI chassis holding two SCXI 1120 multiplexing modules, one feed-through panel, and an SCXI 1160 "relay module" to monitor and record system information, and to control system electronics. Using the computer interface, the operator can switch power to the blowers and fuel pump, as well as control the air assisted fuel injectors, burner spark, oil injection, and auxiliary air, all with the touch of a finger.

System temperatures, mass air-flow for burner air, and the burner AFR were measured and converted to engineering units. The software uses measured data to calculate total exhaust flow and burner AFR, and to check conditions indicative of a system malfunction. The burner AFR can be controlled as either open or closed loop, maintaining the specified A/F. A/F control is achieved by varying the rate of fuel delivered to the burner (modifying the pulse duty cycle of a fixed frequency control waveform). Whenever necessary, open loop control was achieved by allowing an operator to enter a fixed fuel injector pulse duty cycle (pulse width). Closed loop control was achieved by measuring the actual burner A/F (using a UEGO sensor), comparing the measured value to the A/F setpoint, and then adjusting the fuel injector duty cycle to correct for the measured error. The front panel of the program was designed to allow users to input an aging cycle, and to run the test using a single screen. The controller contained an 'auto start' and 'auto shutdown' options to allow for ease of operation. After the burner fuel was activated, a set of safety checks automatically initialized and monitored the burner for malfunction. While a test was in progress, the program collects data at 4 Hz, stored data at 0.5 Hz, and displayed the catalyst inlet, bed, and outlet temperatures and measured A/F ratio at 1 Hz, allowing the operator to review the overall stability of the system.

Figure 18:
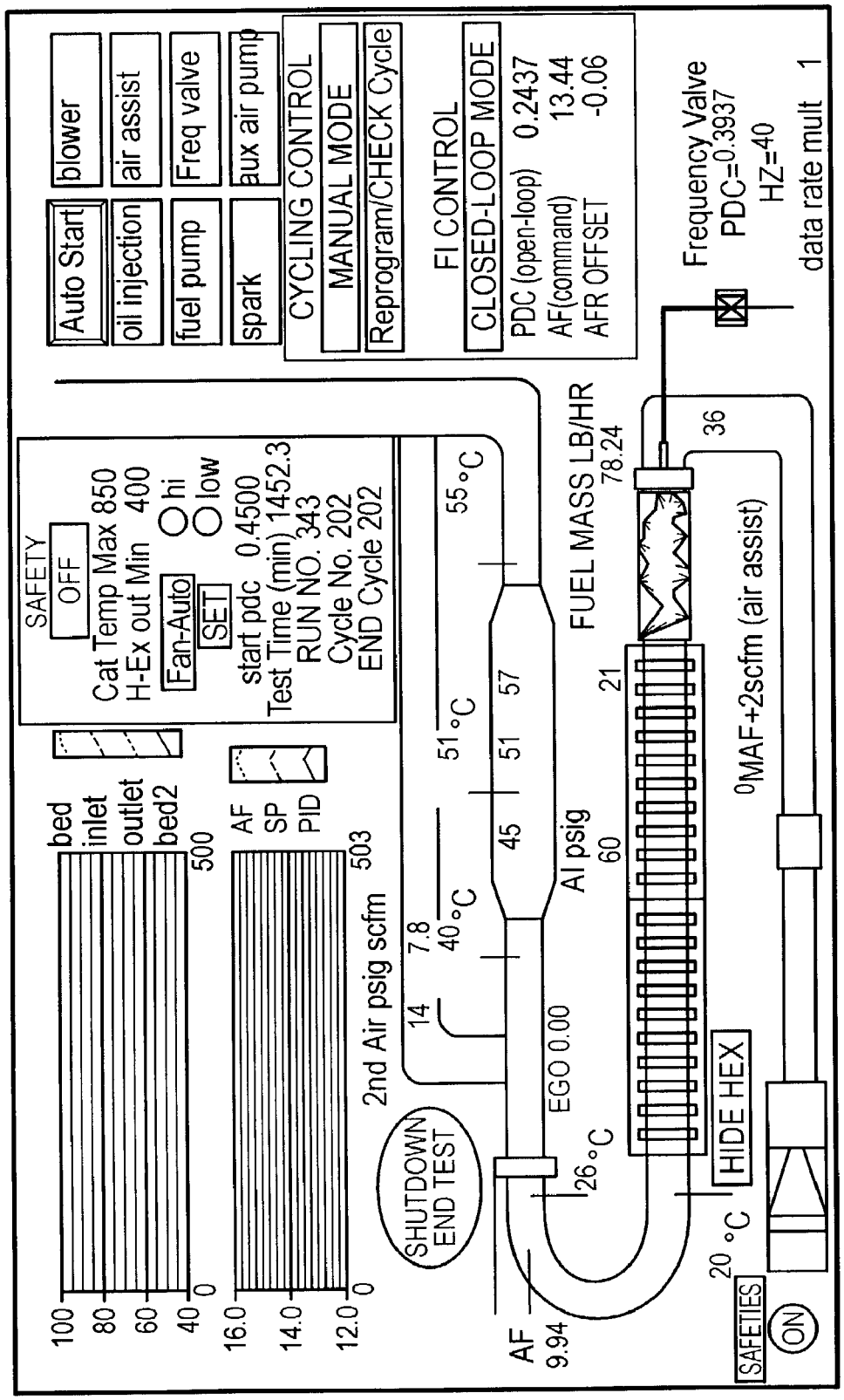
FIG. 18 illustrates the front panel control software for the burner system.

FIG. 18 shows the front panel of the control software. The front panel depicted the layout of the actual test system and the location and value of the measured data at each point in the system. Due to the potential danger of operating a gasoline-fueled burner unattended for long periods of time, the system used three built-in safety limits that checked for system malfunction. First, the heat exchanger outlet had to reach a temperature greater than 100° C. within four seconds after activation of fuel injection, and had to maintain a minimum safety setpoint level during operation, which indicated that the burner was properly ignited and remained lit. The third setpoint checked the catalyst bed temperature to verify that the catalyst was not at a temperature that could be detrimental to the experimental part. If any of the safety setpoints were compromised, the computer was programmed to turn off all test systems, divert the blower and activate a two minute $N_2$ purge into the burner head (to blow out the burner and suspend any unburned fuel in $N_2$, thereby preventing a large exothermic reaction in the test piece), and to display a bright red screen describing the condition at which the system was shut down, along with the date and time, and data which were recorded at 4 Hz for ten minutes after a safety had been compromised. In addition, the $N_2$ purge system was also activated and a safety shutdown was followed when an electrical power loss was detected, thereby making it safe to operate the rig during questionable weather conditions.

B. RAT-A Simulation on FOCAS™ Rig

The RAT-A cycle is characterized mainly by steady-state, stoichiometric operation and short thermal excursions (specifications given previously). The thermal excursions were created by operating rich, to generate about 3 percent carbon monoxide (CO), while injecting secondary air (about 3 percent oxygen, $O_2$) in front of the catalyst. The excess reductants and oxidants reacted in the catalyst, releasing the chemical energy in the form of heat. The catalyst inlet temperature and exhaust gas flow rate were also used to specify the test cycle setup. The flow was specified in scfm, 70 scfm was used in this work.

On the engine, the flow specification was set up by adjusting engine speed. The gas temperature at the inlet to the catalyst was achieved by adjusting engine load (throttle position) during the steady-state, stoichiometric portion of the cycle. The thermal excursion was created by adjusting engine operating AFR during the rich portion of the cycle, and adjusting air injection to achieve the 3 percent CO and $O_2$ specification.

On the burner, flow was modified by changing the setting of the burner bypass valve, and catalyst inlet gas temperature was adjusted by increasing or decreasing the number of heat exchanger units, the flow through the units, and air cooling of the exhaust section between the heat exchanger outlet and catalyst inlet. Coarse gas inlet temperature control was achieved with the heat exchanger, while fine control came from air cooling of the exhaust section.

FIG. 19 shows measured exhaust gas and catalyst bed temperatures during engine and burner aging. Also shown is the measured AFR at engine and burner outlet. The upper left corner shows the RAT-A cycle on the engine, and the upper right corner shows the RAT-A cycle on the FOCAS™. The bottom two graphs show the burner and the engine characteristics compared directly to each other. The outlet thermocouples are in slightly different locations, and should not be compared.

Figure 19A:
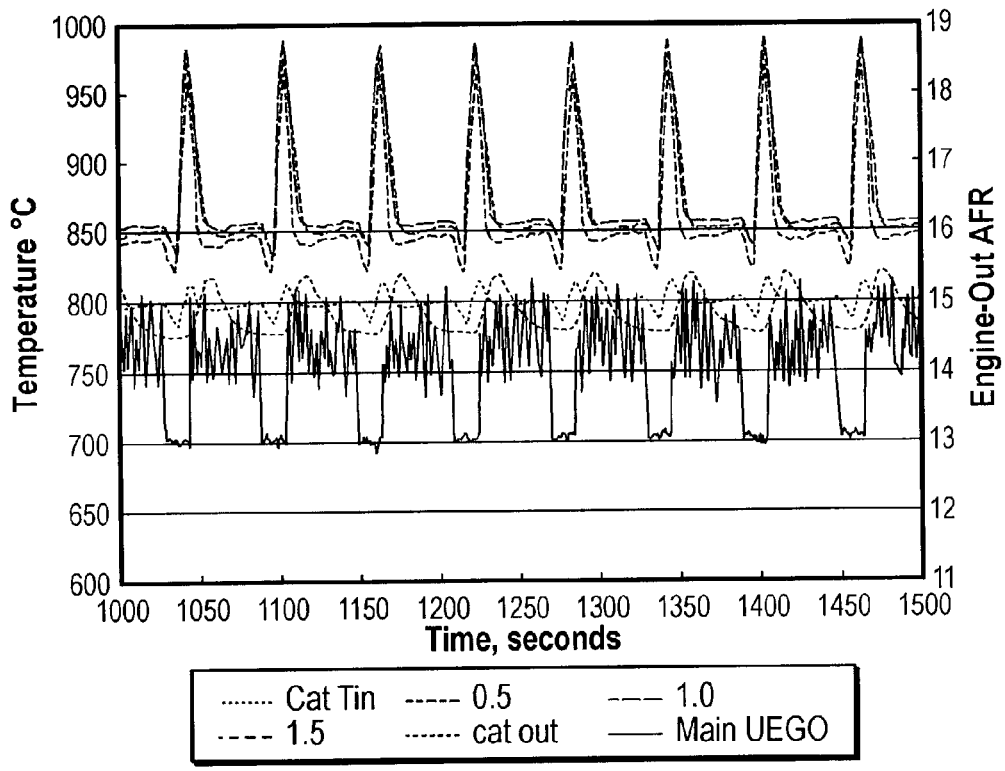
FIG. 19 illustrates the catalyst bed temperatures during RAT-A cycle operation on the engine stand and on the burner rig.
Figure 19B:
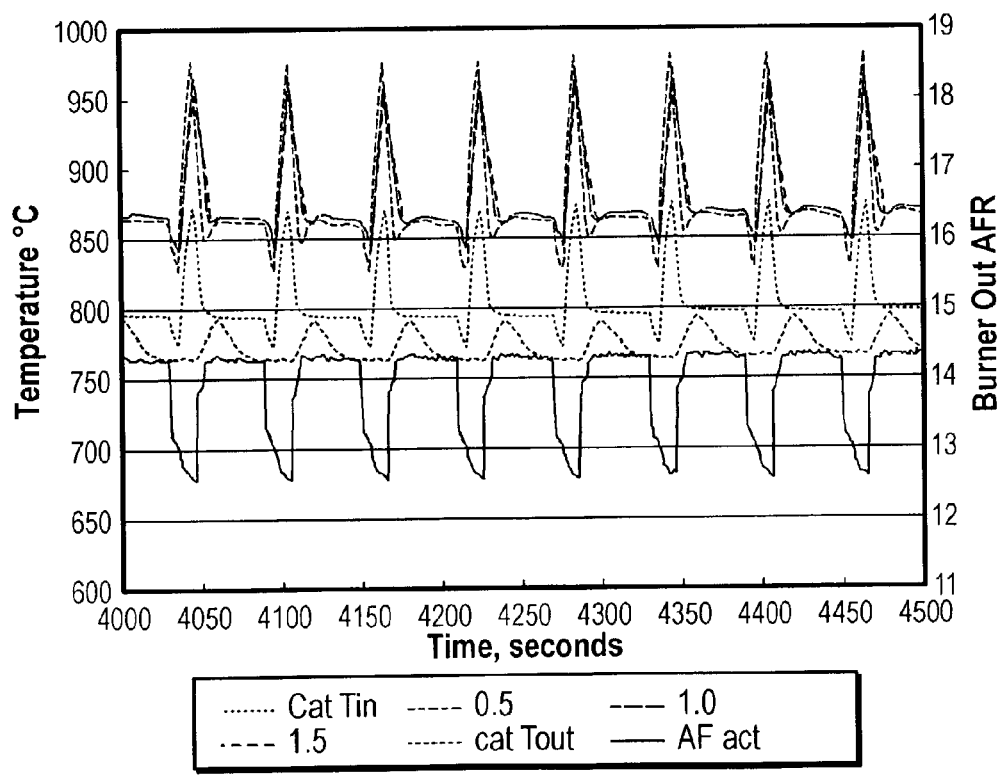
Figure 19C:
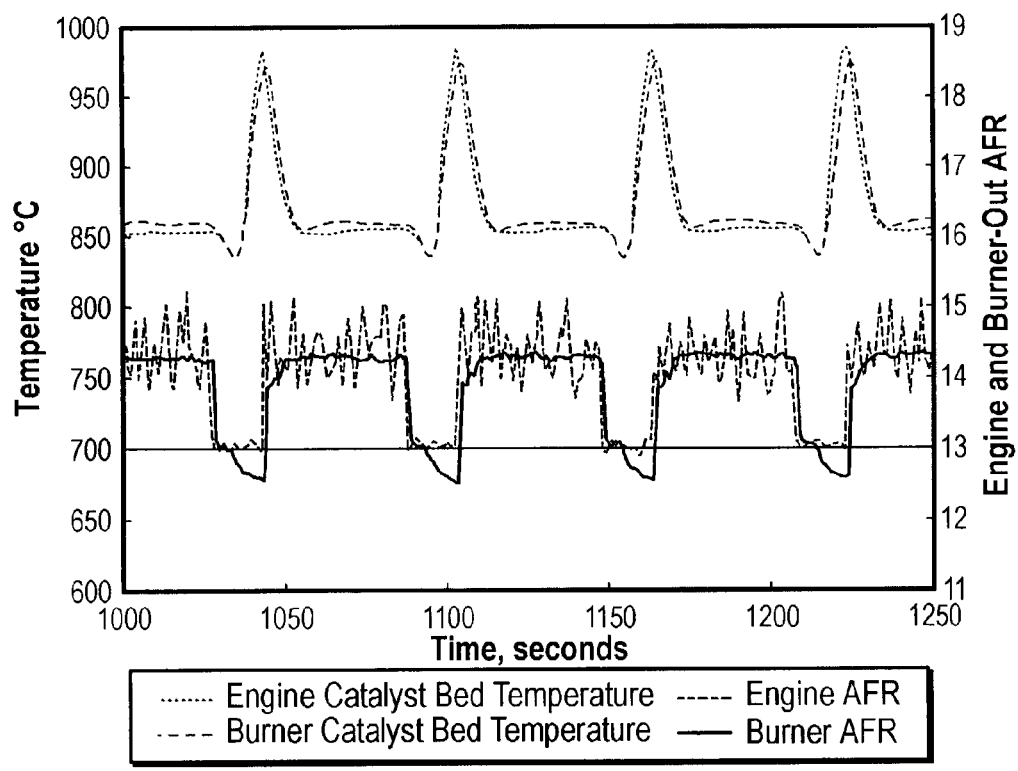
Figure 19D:
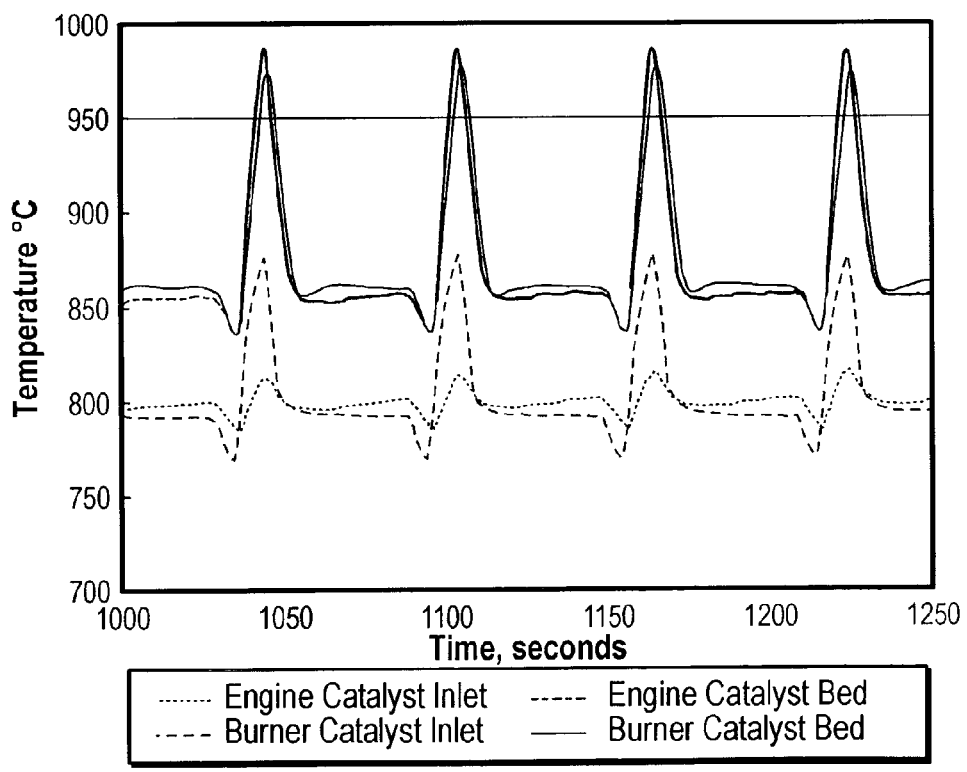

The bottom right graph shows a comparison of the catalyst inlet and bed temperatures during the cycle. The bed temperatures were very similar between the two aging systems. However, the effect of the fuel cut and the air injection produced different inlet temperature profiles between the two systems. The burner showed the drop in temperature (from to the rich excursion) more quickly, but then showed a higher temperature into the catalyst during the rich with air portion of the cycle. This was indicative that some of the reactants were burning in the pipe before entering the catalyst. This burning may be a result of differences in the way the air was injected between the two systems, and it results in one effect, the potential impact of which is not fully understood. The effect is that the peak temperature in the catalyst was observed at 0.5" in the burner catalyst, as opposed to 1.0" in the engine catalyst (compare FIGS. 19A and 19B). FIG. 19C shows the measured exhaust AFR and catalyst bed temperature (1.0" depth). Comparing the AFR control, it can be seen that the burner had much tighter AFR control than the engine. The other characteristic noted in the graph is that during the thermal excursion the burner went richer than the engine. This was necessary to overcome the burning in the pipe, and to maintain the thermal excursion in the catalyst. Overall, the difference in the ability to generate reactants and resulting catalyst bed temperature between the two systems was very small.

However, there was one control factor that began to appear as a problem for the burner system as the program progressed. The problem was slight variations in catalyst inlet temperature from day-to-day and day-to-night. The cause of the problem appeared to be variations in the air cooling of the section between the heat exchanger and catalyst inlet. The fine tuned catalyst inlet temperature was controlled by varying the amount of exhaust insulation, and the placement of the cooling fans at the beginning of each test. However, as the test progressed, it was found that variations in cooling tower water and the air conditions in the new cell created conditions that could vary substantially day-to-night, and day-to-day. This allowed the catalyst inlet temperature to vary by up to 20° C. For this reason, a closed-loop fan control was created and embedded in the FOCAS™ controller. FIG. 10 shows a schematic of the closed-loop fan control created for catalyst inlet temperature. The controller output varies the speed of the cooling fans from off, to low, to high.

EXAMPLE 6

Seven general design criteria/guidelines were used to design this preferred fuel injector. These criteria were:
1) Pressure in the air channel could not exceed pressure in the fuel channel or fuel flow would be interrupted. Assuming the burner flow is steady-state (a reasonable assumption):

$$\text{For Air: } \frac{P_{1_A}}{A_{1_A}} \times A_{2_A} = P_{2_A} \quad \text{For Fuel: } \frac{P_{1_f}}{A_{1_f}} \times A_{2_f} = P_{2_f}$$

2) Desired fuel inlet pressure (based on fuel pump specifications) is 40 psig<$P_f$<60 psig.

3) The area of the fuel jets must provide adequate fuel flow for the required flow range, in the given operating pressure range.
4) The size of the fuel holes must be a standard drill bit size, and must be large enough to allow machining without excessive difficulty.
5) Fuel/Air spray should aim for outer air shroud convergence to keep the burner flame off the combustor wall as long as possible.
6) Direct point of fuel jet convergence behind air shroud. Adjustment of $P_A$ can be used to vary the position of the fuel spray relative to the air shroud.
7) Keep interaction point of the fuel and the air jet at the center of the combined outlet hole to prevent driving the fuel spray to the inner wall of the injector. This would lead to dripping, and coking of the face of the injector.
8) The degree of atomization and stability will be determined visually using the quartz combustor. The assessment was based on the blueness of the flame (orange flames indicating sooty conditions), the soot forming potential (assessed by examining the injector, combustor, heat exchanger and exhaust pipe), and the stability of the flame (assessed using a linear AFR sensor).

Since the burner is designed to operate predominantly at stoichiometric, the required fuel flow can be calculated using the required total exhaust gas flow and the stoichiometric AFR of the fuel used for aging. The following analysis presents the calculation of the required fuel flow for the burner operating at stoichiometric, with a total exhaust flow of 70 SCFM.

$$m_{exh} = 70 \text{ SCFM} = 2.3015 \text{ kg/min}$$

$$m_{fuel} = m_{exh} \times \text{AFR}_{stoich}^{-1} \times 1 \text{ lb}/0.45359 \text{ kg} \times 60 \text{ min/hr}$$

$$m_{fuel} = 21.28 \text{ lb/hr at stoichiometric}$$

$$m_{air} = m_{fuel} \times (\text{AFR}_{avg}/\text{AFR}_{stoich})$$

$$\text{AFR}_{avg} = (16/60 \times 13) + (44/60 \times 14.4) = 14.03 \text{ RAT-A cycle}$$

$$m_{air} = 65.1 \text{ SCFM}$$

Therefore, the rate of energy consumption of the burner over the cycle is:

$$Q = m_{fuel} \times \text{Energy content of fuel}$$

$$Q = m_{fuel} \times 18,400 \text{ BTU/lb} = 21.28 \text{ lb/hr} \times \text{hr}/3600 \text{ sec} \times 18,400 \text{ BTU/lb} \times 1.055 \text{ KJ/BTU}$$

$$Q = 115 \text{ kW}$$

Referring to FIG. 20, the distance $l_1$ is the radius of the combustion tube 210, and $l_2$ is the distance to impact with the wall. The distance $l_2$ can be calculated using geometry, but then is corrected for interaction with the fuel jet (which tends to lengthen $l_2$) and the inner swirl jets 242 (which tend to shorten $l_2$). The inner swirl jets 242 have the greatest impact. The final angle for X,X' is a function of fuel shearing and atomization (which is improved with lower X,X') and preventing impact with the wall of the combustion tube 210 by directing the fuel spray into the area where the outer swirl jets 253 in FIG. 3 converge (about four to five inches from the face of the swirl plate). These outer swirl jets 253 help to keep the hottest part of the flame off the inner wall of the combustion tube 210, which enables the burner to run stoichiometric for extended periods of time. Table 1 shows calculated impact of the fuel spray with the inner wall of the combustion tube 210, with and without swirl jet interaction. From these data, two fuel injectors were built, E-62 and E-76 (where the number refers to the angle X,X' in degrees).

TABLE 1

| Air Injection Angle, X,X' | Calc. Impact Distance, No Interaction, in. | Observed Impact, in. | Calc. Impact Distance with Medium Interaction, in. |
|---|---|---|---|
| 60 | 2.75 | | 2.5 |
| 61 | 2.88 | | 2.57 |
| 62 | 3.03 | | 2.64 |
| 63 | 3.18 | | 2.71 |
| 64 | 3.34 | | 2.8 |
| 65 | 3.52 | | 2.89 |
| 66 | 3.71 | | 2.98 |
| 67 | 3.92 | | 3.08 |
| 68 | 4.14 | 3.25–3.5 | 3.2 |
| 69 | 4.38 | | 3.32 |
| 70 | 4.65 | | 3.45 |
| 71 | 4.95 | | 3.6 |
| 72 | 5.27 | | 3.76 |
| 73 | 5.63 | | 3.94 |
| 74 | 6.04 | | 4.14 |
| 75 | 6.5 | | 4.37 |
| 76 | 7.02 | | 4.64 |
| 77 | 7.62 | | 4.94 |
| 78 | 8.32 | 5 | 5.29 |
| 79 | 9.15 | | 5.7 |
| 80 | 10.13 | | 6.19 |

From these data, two fuel injectors were built, with an angle "α" in degrees of 62 and 76 (sometimes referred to hereafter as "E-62" and "E-76," respectively). After the injectors were built, they were tested in the FOCAS™ rig. The quality of the flame was assessed using three criteria: a visual measure of smoke in the exhaust, soot on the combustor, heat exchanger, and catalyst; the appearance of the flame (blueness and transparency); and the location of flame impact with the burner wall. Additionally, the stability of the flame was assessed visually and through measured AFR feedback using a UEGO sensor. The completeness of the burn was also quantified by measuring the exotherm in the catalyst at 70 scfm and stoichiometric. The exotherm in the catalyst was an indicator of the level of unburned fuel. For a gasoline engine at these conditions, the catalyst exotherm (using this test catalyst) was about 60° C. The final FOCAS™ injector gave about 50 to 60° C. exotherm. The burner conditions during the visual analysis were:

| | E-68-062 | E-76-062 |
|---|---|---|
| Fuel Injection Pressure: | 50 psig | 50 psig |
| Air Injection Pressure: | 100 psig | 55 psig |
| Burner Flow: | 70 scfm | 70 scfm |

The visual quality of both of these flames was very acceptable (no soot build-up, no smoke) and the catalyst bed temperatures were in an acceptable range. E-68-062 showed a very blue flame, indicative of excellent atomization; but the flame impinged on the wall very close to the swirl plate, and experience dictated that this type of impact would damage the burner wall. This led to using E-76-062, which did not have as high a flame quality for blueness and transparency, but extended the impact of the flame with the burner wall to an area that would not damage the combustor wall. Although some flame quality was sacrificed for combustor durability, E-76-062 showed a very high quality flame for blueness and transparency compared to commercially available injectors that were tested.

Figure 21:
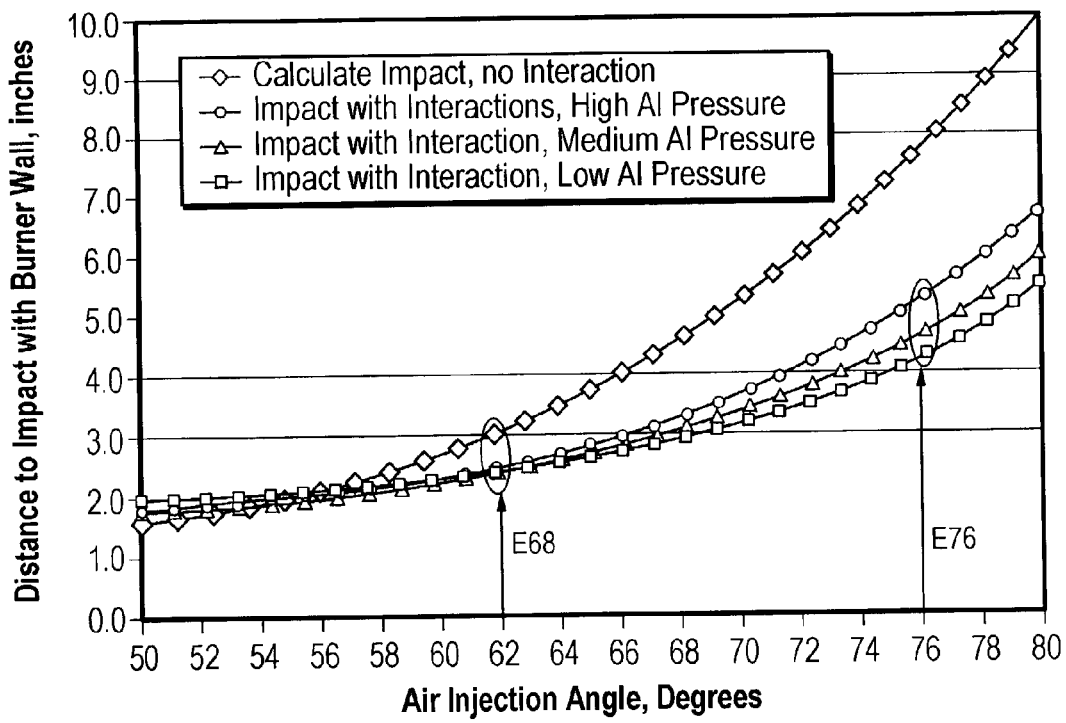
FIG. 21 illustrates a calculation of fuel spray impact on burner wall as a function of air assist angle of injection.
Figure 22:
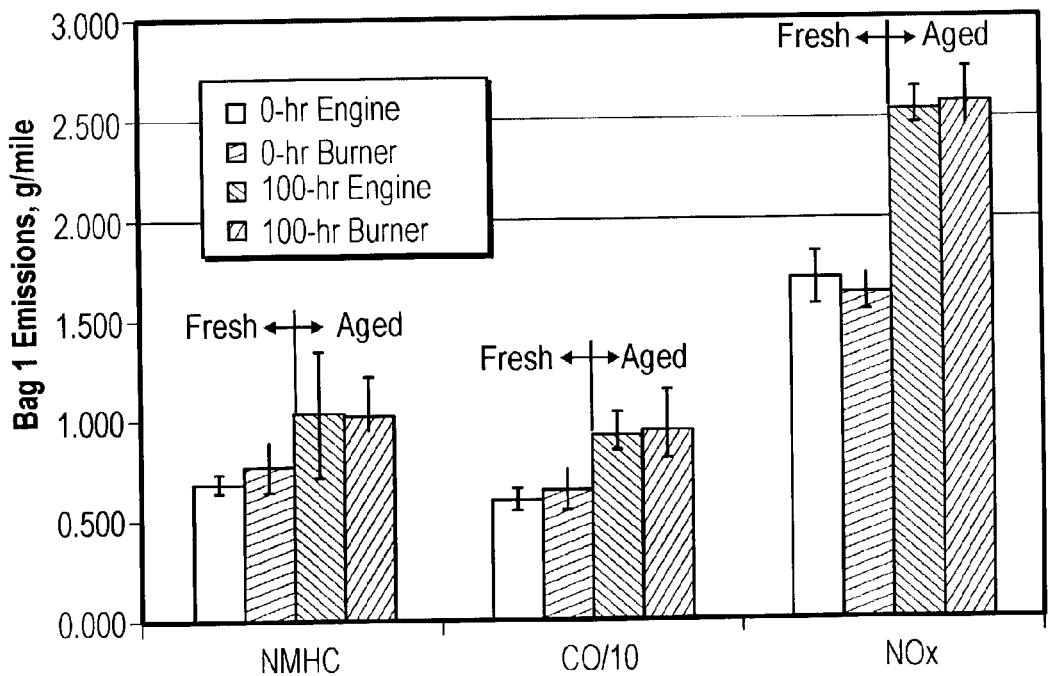
FIG. 22 illustrates cold-start, bag-1 results: burner and engine aged catalysts.
Figure 23:
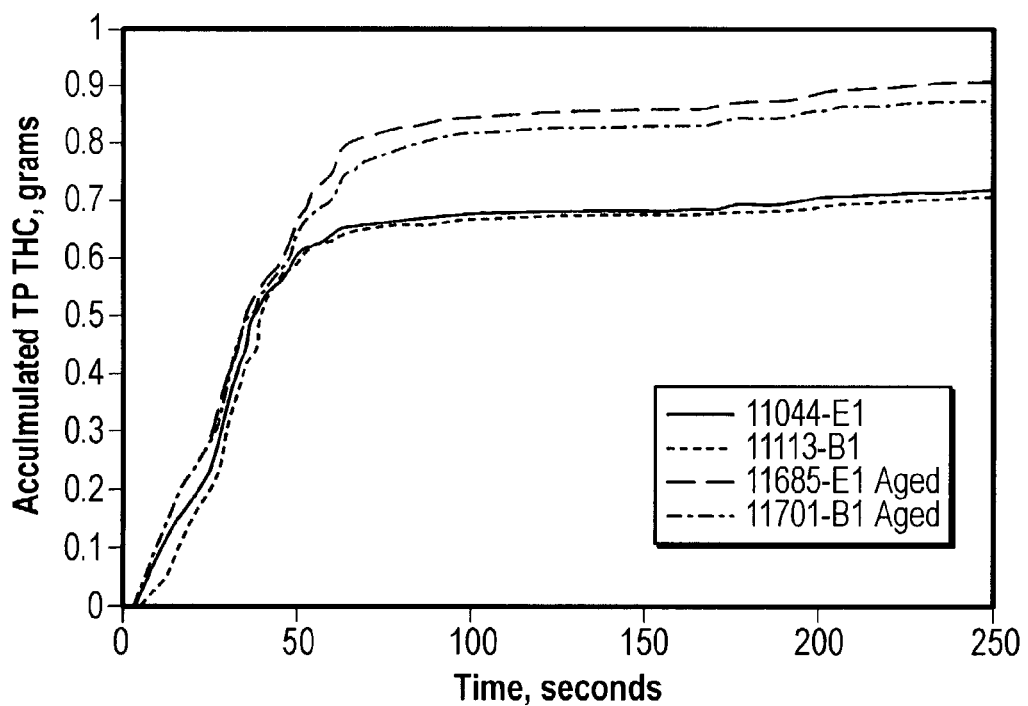
FIG. 23 illustrates accumulated THC mass during cold-start, before and after aging.
Figure 24:
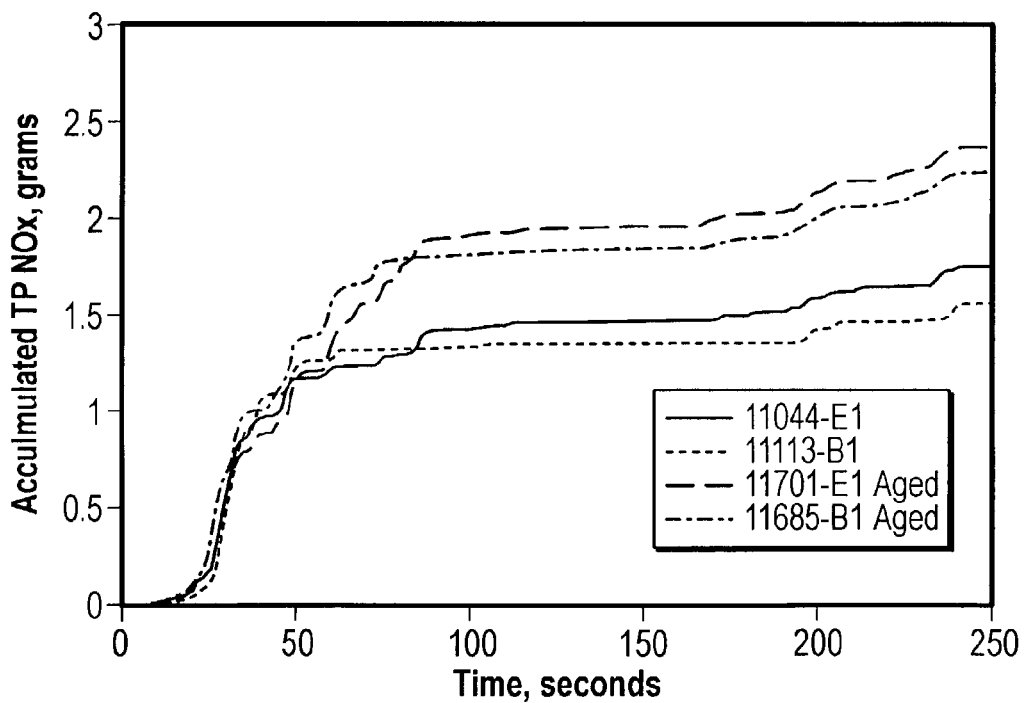
FIG. 24 illustrates accumulated $NO_x$ mass during cold-start, before and after aging.
Figure 25:
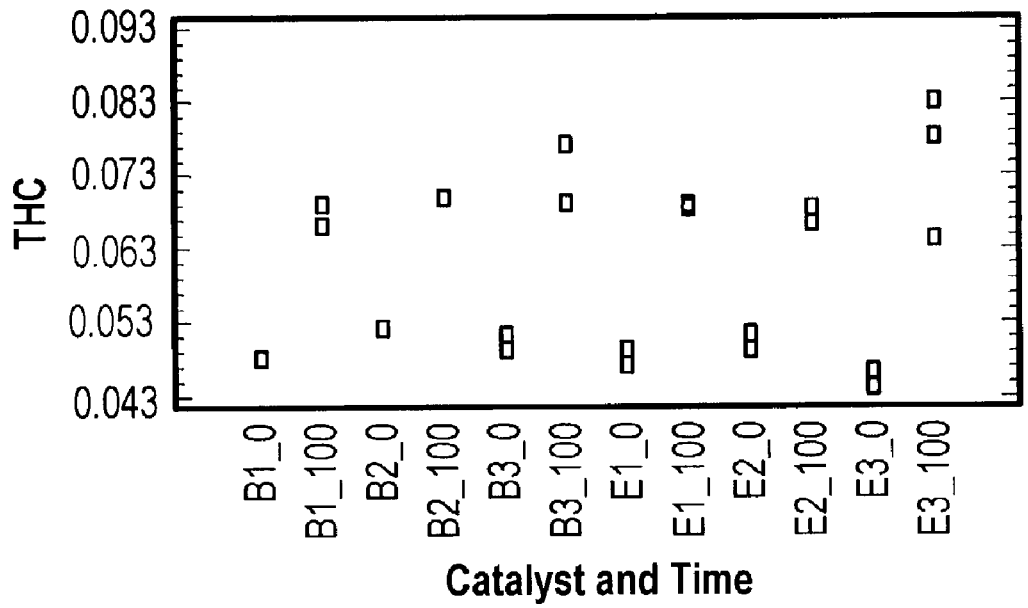
FIG. 25 illustrates THC emissions by aging type, catalyst, and aging hours.
Figure 26:
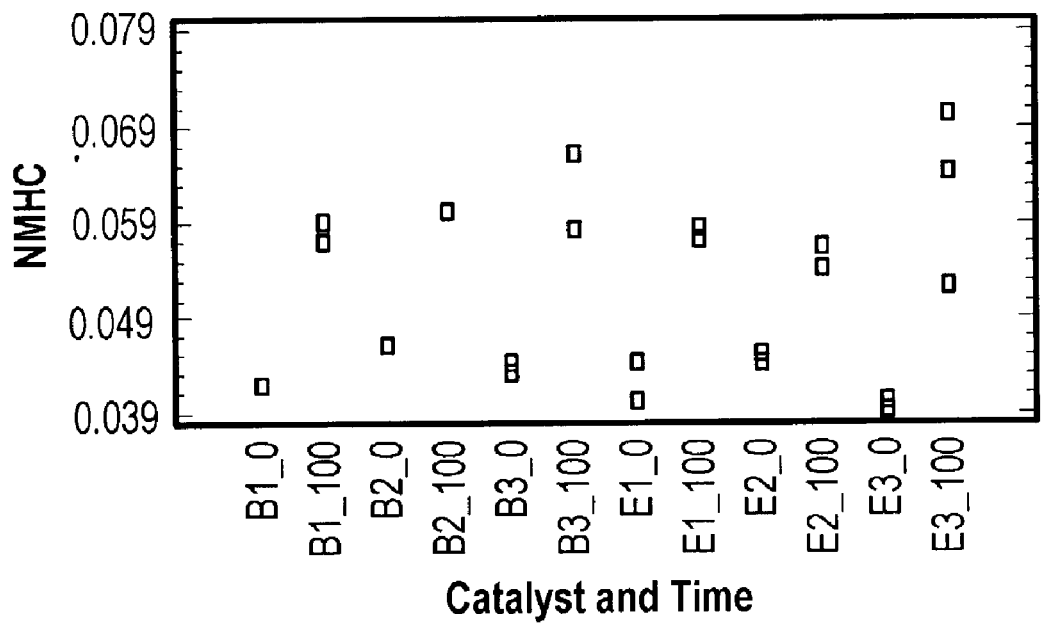
FIG. 26 illustrates NMHC emissions by aging type, catalyst, and aging hours.
Figure 27:
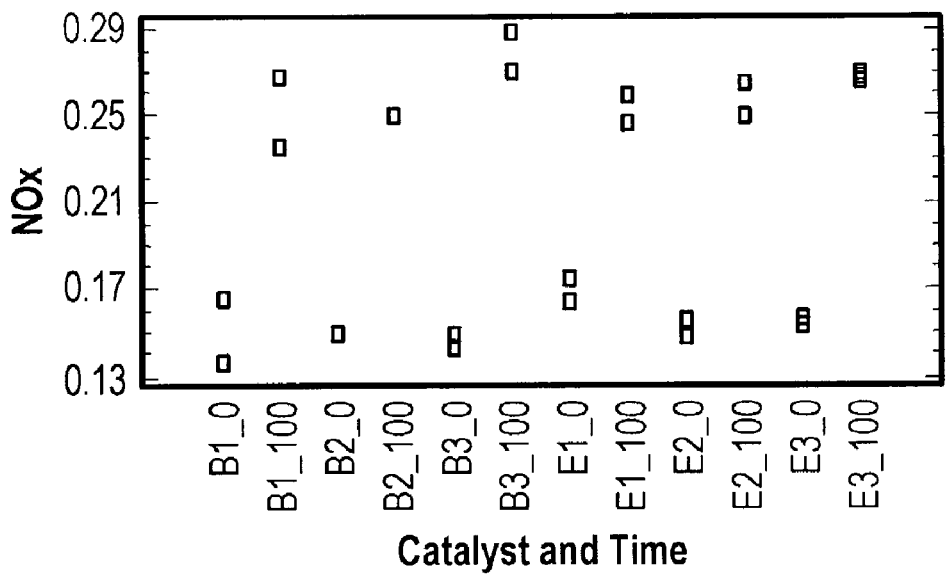
FIG. 27 illustrates $NO_x$ emissions by aging type, catalyst, and aging hours.
Figure 28:
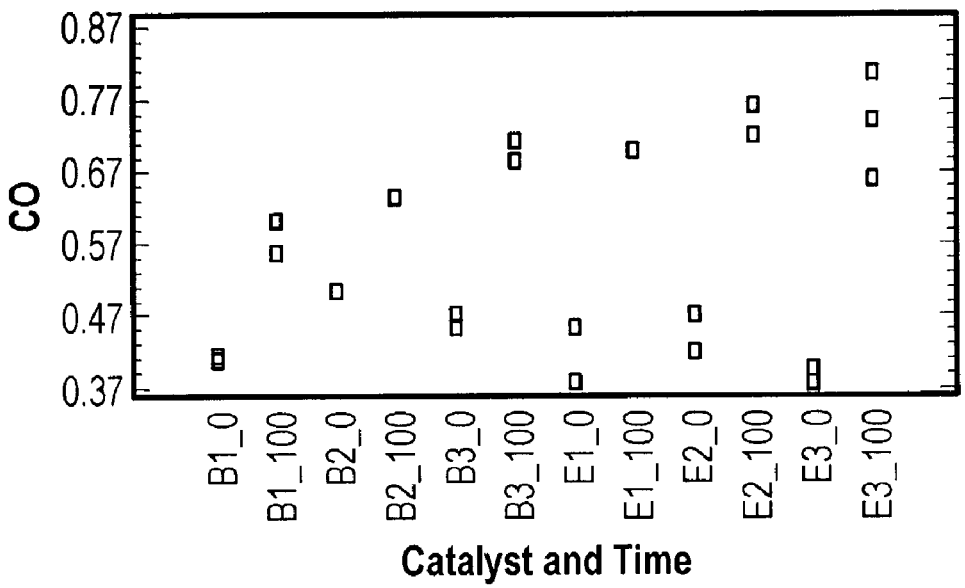
FIG. 28 illustrates CO emissions by aging type, catalyst, and aging hours.
Figure 29:
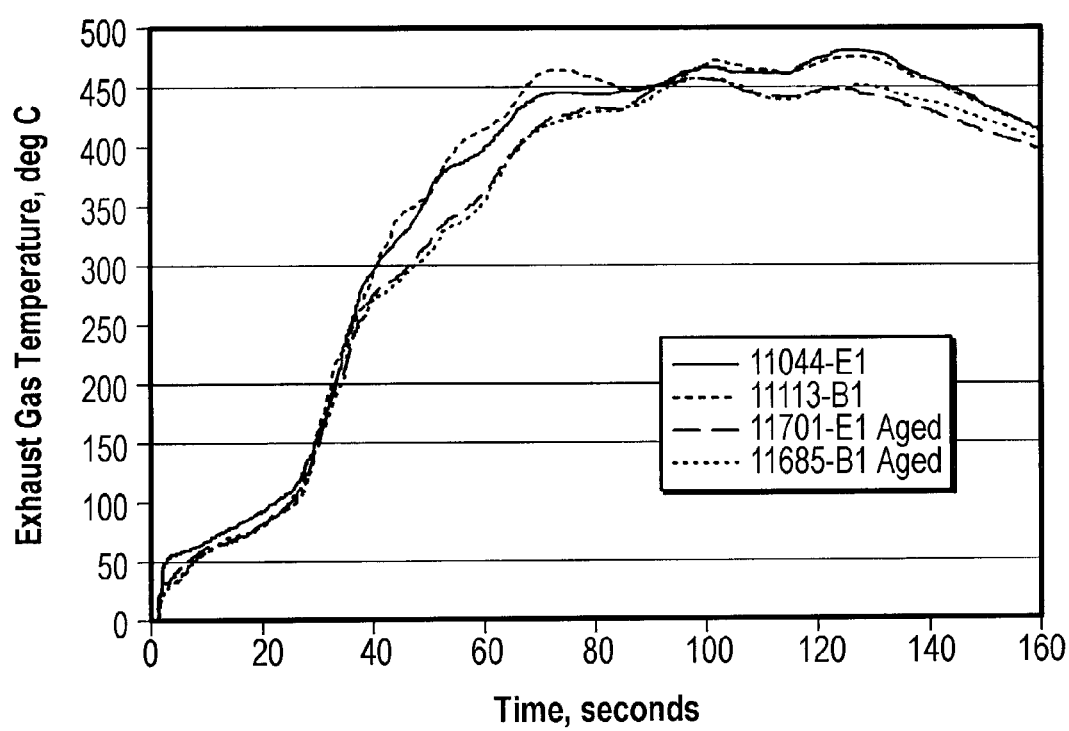
FIG. 29 shows the measured mass emission during the cold-start phase of the FTP.

FIG. 21 shows a graph of the calculated fuel spray impacts. Generally thermal aging damaged the catalyst washcoat in the front one inch of the catalyst, which impacted the light-off behavior of the catalyst. FIG. 22 shows the measured mass emission during the cold-start phase of the FTP. It can be seen that there are some differences in NMHC, CO and $NO_x$ mass emissions. FIG. 29 shows the measured catalyst bed temperature during cold-start. Examining FIG. 29 indicates that beginning during the first acceleration, and continuing from that point, there was a separation in the catalyst bed temperature between the aged and unaged catalysts. Both the engine- and the burner-aged catalysts showed comparable performance before and after aging. This difference in temperature is an indicator that the aged catalysts were operating with lower efficiency. FIG. 22 shows the accumulated modal mass emission of THC and $NO_x$ before and after aging. It can be seen in these figures, that there is indeed lower activity in the aged converters, and it appears that the engine- and burner-aged catalysts had very similar performance.

EXAMPLE 7

Statistical Analysis of FTP Performance Data

Six catalysts were examined in this study to determine differences in emissions based on the type of aging performed. Three catalysts were aged on an engine and three were aged on the FOCAS™. Each catalyst was aged 100 hrs. FTPs were run on all six catalysts in which $NO_x$, THC, NMHC, and CO measurements were taken before and after the aging process. Multiple FTPs were run on each catalyst. Table 13 lists the number of FTP runs made for each catalyst in this study.

TABLE 13

CATALYST FTP STATISTICAL DATA MATRIX

|  |  | Engine Aging | | | FOCAS™ Aging | | |
|---|---|---|---|---|---|---|---|
| Catalyst |  | 1 | 2 | 3 | 4 | 5 | 6 |
| Aging Hrs | 0 | 2 | 2 | 2 | 2 | 1 | 2 |
|  | 100 | 2 | 2 | 3 | 2 | 1 | 2 |

In order to compare the effect of aging type on emissions, a repeated measures analysis of variance statistical model was used. This model contained the following factors:

Aging Type (engine or FOCAS)
Catalyst nested within aging type (each catalyst was only aged by one method)
Aging Time (0 and 100 hrs)
Aging Type×Aging Time interaction Each of the four emissions was analyzed by this model individually. Table 14 lists the results of the repeated measures model. The hypothesis tested for each factor was whether the average emission for each level in that factor is significantly different. For example, the Aging Type factor compares the average $NO_x$ between the catalysts aged in the engine and the catalysts aged on the FOCAS™ over all the time periods. For each factor in the model, a p-value is listed which indicates the probability of accepting the hypothesis that there is no significant difference in the average emissions between the factor levels. All statistical comparisons were made at the 5 percent level of significance. Thus, p-values less than 0.05 indicate statistically significant differences in the average emissions for that factor.

TABLE 14

REPEATED MEASURES ANOVA MODEL RESULTS

| Factor | $NO_x$ | THC | NMHC | CO |
|---|---|---|---|---|
| Aging Type | 0.4023 | 0.5688 | 0.2221 | 0.5218 |
| Catalyst Nested in Aging Type | 0.5792 | 0.7303 | 0.8488 | 0.0596 |
| Aging Time | 0.0001 | 0.0001 | 0.0001 | 0.0001 |
| Aging Type × Time Interaction | 0.3022 | 0.5712 | 0.9922 | 0.0026 |

The conclusions based on the repeated measures ANOVA model were as follows:

There was no significant difference in the average emissions between the catalysts aged on the engine and the catalysts aged on the FOCAS over both time periods.
There was no significant difference in the average emissions among the three catalysts aged on the engine over both time periods.
There was no significant difference in the average emissions among the three catalysts aged on the FOCAS over both time periods.
There was a statistically significant difference in the average emissions between the catalysts at the zero hours and the catalysts at the 100 hours of aging.
There was no significant difference in the average emissions between the aging type and the aging time for the $NO_x$, THC, and NMHC emissions. However, there was a statistically significant difference in the average CO between the aging type and the aging time. In this case, the catalysts aged on the engine demonstrated a significantly greater increase in CO from zero hours to 100 hours than seen on the catalysts aged on the FOCAS™.

Plots of the THC, NMHC, $NO_x$, and CO emissions by catalyst and aging period are illustrated in FIG. 25–FIG. 28, respectively. On the x-axis tickmark labels, the first letter represents the aging type (B=FOCAS bench, E=engine), the second digit represents the catalyst number, and the last number represents the aging time (0 or 100 hours).

EXAMPLE 8

Postmortem Catalyst Evaluations

After all the performance analyses were completed, the catalysts were disassembled, the center (one-inch diameter, one-inch deep) of each catalyst was cored for surface area and composition analysis. The two analyses run were BET (Bruhauer-Emmett-Teller) for assessment of surface area and porosity, and PIXE (Proton-Induced X-Ray Emissions) for compositional analysis.

The BET test provided information on the surface area of the substrate and washcoat. This analysis was correlated to thermal degradation. PIXE provided information on the composition of the substrate, washcoat, and any deposits on the surface of the catalyst. PIXE analysis provided information on the differences in the deposits on the catalysts between the engine and the burner (which provided oil-free aging).

Table 15 gives the results of the PIXE analysis, for select elements.

TABLE 15

PIXE ANALYSES RESULTS FOR SELECT ELEMENTS

| | Mass Concentration, Wt % | | | | | |
|---|---|---|---|---|---|---|
| Element | E1 | E2 | E3 | B1 | B2 | B3 |
| P, ppm | <674 | <723 | <766 | <715 | <758 | NOT RUN |
| Zn, ppm | 326 | 279 | 316 | 13 | 13 | |
| Rh, ppm | 0.672 | 0.650 | 0.731 | 0.626 | 0.662 | |
| Pd, % | 0.187 | 0.208 | 0.219 | 0.183 | 0.201 | |
| Pt, % | 0.187 | 0.208 | 0.219 | 0.183 | 0.201 | |
| Ce, % | 2.883 | 3.028 | 3.314 | 2.954 | 3.282 | |

Table 15 highlights two basic categories of elements, components of oil, and elements found in the catalyst washcoat. The PIXE analysis showed that the washcoat materials (Rhodium, Palladium, Platinum, Cerium) were fairly consistent among the five catalysts tested. In looking at the Zinc (Zn) deposits between the groups it was seen that the engine catalysts had substantially more Zn. Phosphorus (P) appeared to be below the detection limits (about 700 ppm). However, P is added to oil as an anti-wear additive and generally comes in the form of ZDP; and field deposits on catalysts have shown Zn:P weight ratios of about 0.5–0.75. This would imply that there is probably some P on the engine catalysts, perhaps in the range of 400–600 ppm, which would be below the detection limit used in this analysis.

The final analysis run on the catalysts was a BET analysis for specific surface area. A catalyst in good condition has a high surface area. As the catalyst ages it loses surface area thermally through agglomeration (migration of the precious metal) and sintering (melting), and non-thermally through physical blockage of pores by deposits. Table 16 gives the BET surface area analysis results.

TABLE 16

BET SURFACE AREA ANALYSIS FOR AGED CATALYSTS

| Catalyst | Condition | BET Surface Area, m²/g |
| --- | --- | --- |
| E1 | 100 RAT-A - Engine Aged | 11.50 ± 0.22 |
| E2 | 100 RAT-A - Engine Aged | 11.46 ± 0.93 |
| E3 | 100 RAT-A - Engine Aged | 11.91 ± 0.13 |
| B1 | 100 RAT-A - Burner Aged | 12.84 ± 0.72 |
| B2 | 100 RAT-A - Burner Aged | 13.32 ± 0.34 |
| B3 | 100 RAT-A - Burner Aged | 12.47 ± 0.22 |

The BET analysis shows a difference in final specific surface area between the two aging methods, with the engine aged parts having a lower surface area compared to the burner-aged parts. The fresh catalyst specific surface area was probably about 18–25 m2/g (although a fresh catalyst was not analyzed as part of this program). This difference in the surface area between engine- and the burner-aged catalyst is not large, but may be attributable to one or more of the following: the small amounts of oil-related deposits observed in the engine aged catalysts; the increased mass due to the deposits (since the surface area is measured as m²/gram); and/or, the beginning of catalyst pore blockage, as occurs in non-thermal deactivation when deposits begin to coat the surface of the catalyst. It is generally accepted that oil deposits require a minimum mass before the deposits significantly affect catalyst performance.

The post-mortem analysis showed that the FOCAS™ aging provided thermal aging in the absence of non-thermal aging (i.e. oil deposits), thereby creating a means for the definitive isolation of thermal and non-thermal aging effects.

The simulated RAT-A cycle on the FOCAS™ burner system was compared to the cycle on the engine. It was demonstrated that the burner can be used to generate a very similar thermal profile inside the catalyst when compared to the profile generated by the engine. The shape of the thermal excursion was reproduced, and the AFR into the catalyst could be controlled and reproduced. One difference that was noted between the two systems was that there appeared to be some burning of the reactants in the exhaust pipe, prior to entering the catalyst, in the burner system. This resulted in a slight shift forward of the peak in the location of the peak temperature during the thermal excursion.

EXAMPLE 9

The methodology was tested by using the FOCAS™ burner system to simulate the General Motors Rapid Aging Test version A (RAT-A) cycle. During the testing portion of the program, six catalysts were aged for 100 hours on the RAT-A cycle; three on an engine aging stand, and three on the FOCAS™ burner system. The catalyst performance at defined intervals and at the conclusion of the aging was measured and compared between the two systems. In addition, the variation and repeatability of the temperature and AFR control of each system were assessed and compared.

The performance evaluations consisted of comparing the regulated emissions across the Federal Test Procedure (FTP) and using an engine-based catalyst performance evaluation rig to measure the catalyst conversion efficiency as a function of exhaust air/fuel ratio (AFR) and catalyst light-off temperature.

The FTP performance evaluations showed that the burner and the engine produced equivalent aging effects, resulting in deterioration factors for THC, CO, and $NO_x$ that were not statistically different between the two methodologies. There was no significant difference in the average emissions between the aging type and the aging time for the $NO_x$, THC, and NMHC emissions on the FTP test. However, there was a statistically significant difference in the average CO between the aging type and the aging time. In this case, the catalysts aged on the engine demonstrated a significantly larger increase in CO from zero hours to 100 hours than was seen on the catalysts aged on FOCAS™. The evaluations revealed that the two methodologies produced equivalent results near stoichiometric (where a gasoline engine is tuned to run). However, as the AFR deviated from stoichiometric to the rich side it was observed that burner aging had a slightly more severe aging effect on THC and CO.

The final catalyst evaluations involved coring the catalysts, and analyzing the surface area and composition. The two analyses run were BET for assessment of surface area and porosity, and PIXE for compositional analysis. The BET test provides information on the surface area of the substrate and washcoat. PIXE provides information on the composition of the substrate, washcoat, and any deposits on the surface of the catalyst. PIXE analysis can provide information on the differences in the deposits on the catalysts between the engine and the burner (which provides oil-free aging). It was found that the catalysts were composed of very similar levels of washcoat, but that the FOCAS™-aged catalysts had an obvious absence of oil derived deposits. However, the levels of oil deposits found on the engine aged catalysts were small, and it is likely that deposits did not impact catalyst performance in this study. However, as an engine ages, oil consumption will increase, adding a variable oil poisoning component to the catalyst aging. It is generally accepted that oil deposits require a minimum mass before the deposits significantly affect catalyst performance. The BET analysis showed a difference in final specific surface area between the two aging methods, with the engine aged parts having a lower surface area compared to the burner aged parts. The reduced surface area could be a result of the increased core mass due to the deposits (since the surface area is measured as m²/gram). The reduced surface area could also be the beginning of catalyst pore blockage, as occurs in non-thermal deactivation when deposits begin to coat the surface of the catalyst. It could also be a result of a combination of the two effects.

Overall, it was found that the FOCAS™ burner system provided a flexible means for simulating the engine aging cycle, and produced thermal aging results equivalent to the engine cycle. The post-mortem analysis showed that the FOCAS™ aging provides thermal aging in the absence of non-thermal aging (i.e. oil deposits), thereby creating a means for the definitive isolation of thermal and non-thermal aging effects. Some advantages that using a burner offers over an engine for aging include: very tight AFR control (±0.02 AFR), very broad range of stable AFR operation (8:1 to 25:1), few moving parts (a blower and a fuel metering valve), and minimal adjustments to achieve setpoints. Also, a burner can be run at very high temperatures without severely damaging the system components, making for a low cost, low risk simulation of very high temperature cycles.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A non-engine based exhaust component rapid aging system comprising
   a combustor in fluid communication with an air supplier, a fuel supplier, and a catalytic converter, said combustor being adapted to provide substantially continuous and effective stoichiometric combustion of a fuel feedstream to produce an exhaust product,
   said combustor comprising a swirl plate comprising a substantially central bore comprising an air assisted fuel spray nozzle,
   said swirl plate comprising:
   an inner set of turbulent jets;
   first and second outer sets of turbulent jets located radially outward from said inner set of turbulent jets, each of said inner set of turbulent jets and first and second outer sets of turbulent jets being adapted to direct air inward, toward said bore; and
   an inner set of swirl jets; and,
   an outer set of swirl jets located radially outward from said inner set of swirl jets, said inner set of swirl jets and said outer set of swirl jets being adapted to direct air outward toward said inner wall of said combustor tube.

2. The non-engine based exhaust component rapid aging system of claim 1 wherein
   said combustor comprises a fuel injection side and a burner side and, upon activation, produces a flame at said burner side, said first and second outer set of turbulent jets being adapted to prevent said flame from remaining in constant contact with said inner wall of said combustor tube;
   said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray nozzle while shearing fuel droplets as they enter said flame; and,
   said inner swirl jets being adapted to direct air against said inner wall of said combustor tube downstream of said swirl plate at a location intersecting a spray of fuel from said air assisted fuel spray nozzle.

3. The non-engine based exhaust component rapid aging system of claim 1 wherein said inner set of turbulent jets and said first and second outer set of turbulent jets each comprise four individual jets spaced apart at approximately 90° relative to one another along a circle located concentrically outward from said bore.

4. The non-engine based exhaust component rapid aging system of claim 1 wherein said swirl plate has a plate surface, and said second set of swirl jets comprises an outer set of swirl jets and an inner set of swirl jets having an angle relative to said plate surface of about 25°.

5. The non-engine based exhaust component rapid aging system of claim 4 wherein said swirl plate has a longitudinal is, and said turbulent jets are at an angle with respect to said longitudinal is of about 43.5°.

6. The non-engine based exhaust component rapid aging system of claim 1 wherein said swirl plate has a longitudinal is, and said turbulent jets are at an angle with respect to said longitudinal is of about 43.5°.

7. The non-engine based exhaust component rapid aging system of claim 1 wherein the swirl plate produces a feedstream flowpath comprising at least a first collapse, a first expansion, and a second collapse, the system further comprising at least one igniter along the inner wall of the combustor tube, the at least one igniter being located at the first expansion.

8. The non-engine based exhaust component rapid aging system of claim 7 wherein
   said combustor comprises a fuel injection side and a burner side and, upon activation, produces a flame at said burner side, said first and second outer set of turbulent jets being adapted to prevent said flame from remaining in constant contact with said inner wall of said combustor tube;
   said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray nozzle while shearing fuel droplets as they enter said flame; and,
   said inner swirl jets being adapted to direct air against said inner wall of said combustor tube downstream of said swirl plate at a location intersecting a spray of fuel from said air assisted fuel spray nozzle.

9. The non-engine based exhaust component rapid aging system of claim 7 wherein said swirl plate has a plate surface, and said second set of swirl jets comprises an outer set of swirl jets and an inner set of swirl jets having an angle relative to said plate surface of about 25°.

10. The non-engine based exhaust component rapid aging system of claim 9 wherein said swirl plate has a longitudinal is, and said turbulent jets are at an angle with respect to said longitudinal is of about 43.5°.

11. The non-engine based exhaust component rapid aging system of claim 7 wherein the feedstream flowpath further comprises a second expansion and a third collapse and the combustor further comprises at least a second igniter located at the second expansion.

12. The non-engine based exhaust component rapid aging system of claim 11 wherein
   said combustor comprises a fuel injection side and a burner side and, upon activation, produces a flame at said burner side, said first and second outer set of turbulent jets being adapted to prevent said flame from remaining in constant contact with said inner wall of said combustor tube;
   said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray nozzle while shearing fuel droplets as they enter said flame; and,
   said inner swirl jets being adapted to direct air against said inner wall of said combustor tube downstream of said swirl plate at a location intersecting a spray of fuel from said air assisted fuel spray nozzle.

13. The non-engine based exhaust component rapid aging system of claim 11 wherein said swirl plate has a plate surface, and said second set of swirl jets comprises an outer set of swirl jets and an inner set of swirl jets having an angle relative to said plate surface of about 25°.

14. The non-engine based exhaust component rapid aging system of claim 13 wherein said swirl plate has a longitudinal is, and said turbulent jets are at an angle with respect to said longitudinal is of about 43.5°.

15. The non-engine based exhaust component rapid aging system of claim 11 wherein said combustor produces a flame, and said swirl plate has a thickness sufficient to fix a feedstream flowpath and to create an air shroud adjacent to the air assisted fuel spray nozzle effective to prevent the flame from attaching to the air assisted fuel spray nozzle.

16. The non-engine based exhaust component rapid aging system of claim 15 wherein said swirl plate has a plate surface, and said second set of swirl jets comprises an outer set of swirl jets and an inner set of swirl jets having an angle relative to said plate surface of about 25°.

17. The non-engine based exhaust component rapid aging system of claim 16 wherein said swirl plate has a longitudinal is, and said turbulent jets are at an angle with respect to said longitudinal is of about 43.5°.

18. The non-engine based exhaust component rapid aging system of claim 7 wherein said combustor produces a flame, and said swirl plate has a thickness sufficient to fix a feedstream flowpath and to create an air shroud adjacent to the air assisted fuel spray nozzle effective to prevent the flame from attaching to the air assisted fuel spray nozzle.

19. The non-engine based exhaust component rapid aging system of claim 18 wherein
said combustor comprises a fuel injection side and a burner side and, upon activation, produces a flame at said burner side, said first and second outer set of turbulent jets being adapted to prevent said flame from remaining in constant contact with said inner wall of said combustor tube;
said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray nozzle while shearing fuel droplets as they enter said flame; and,
said inner swirl jets being adapted to direct air against said inner wall of said combustor tube downstream of said swirl plate at a location intersecting a spray of fuel from said air assisted fuel spray nozzle.

20. The non-engine based exhaust component rapid aging system of claim 18 wherein said inner set of turbulent jets and said first and second outer set of turbulent jets each comprise four individual jets spaced apart at approximately 90° relative to one another along a circle located concentrically outward from said bore.

21. The non-engine based exhaust component rapid aging system of claim 18 wherein said swirl plate has a plate surface, and said second set of swirl jets comprises an outer set of swirl jets and an inner set of swirl jets having an angle relative to said plate surface of about 25°.

22. The non-engine based exhaust component rapid aging system of claim 21 wherein said swirl plate has a longitudinal is, and said turbulent jets are at an angle with respect to said longitudinal is of about 43.5°.

23. The non-engine based exhaust component rapid aging system of claim 18 wherein the swirl plate is about ½ inch thick or more.

24. The non-engine based exhaust component rapid aging system of claim 1 wherein said combustor produces a flame, and said swirl plate has a thickness sufficient to fix a feedstream flowpath and to create an air shroud adjacent to the air assisted fuel spray nozzle effective to prevent the flame from attaching to the air assisted fuel spray nozzle.

25. The non-engine based exhaust component rapid aging system of claim 24 wherein
said combustor comprises a fuel injection side and a burner side and, upon activation, produces a flame at said burner side, said first and second outer set of turbulent jets being adapted to prevent said flame from remaining in constant contact with said inner wall of said combustor tube;
said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray nozzle while shearing fuel droplets as they enter said flame; and,
said inner swirl jets being adapted to direct air against said inner wall of said combustor tube downstream of said swirl plate at a location intersecting a spray of fuel from said air assisted fuel spray nozzle.

26. The non-engine based exhaust component rapid aging system of claim 24 wherein said swirl plate has a plate surface, and said second set of swirl jets comprises an outer set of swirl jets and an inner set of swirl jets having an angle relative to said plate surface of about 25°.

27. The non-engine based exhaust component rapid aging system of claim 26 wherein said swirl plate has a longitudinal is, and said turbulent jets are at an angle with respect to said longitudinal is of about 43.5°.

28. The non-engine based exhaust component rapid aging system of claim 1 wherein the swirl plate is about ½ inch thick or more.

29. The non-engine based exhaust component rapid aging system of claim 28 wherein
said combustor comprises a fuel injection side and a burner side and, upon activation, produces a flame at said burner side, said first and second outer set of turbulent jets being adapted to prevent said flame from remaining in constant contact with said inner wall of said combustor tube;
said inner set of turbulent jets are adapted to produce a first area on said fuel injection side having a pressure sufficiently low to assist in drawing fuel into said combustion tube, said inner set of turbulent jets also producing a second area on said burner side having a pressure sufficiently high to prevent said flame from attaching to said air assisted fuel spray while shearing fuel droplets as they enter said flame; and,
said inner swirl jets being adapted to direct air against said inner wall of said combustor tube downstream of said swirl plate at a location intersecting a spray of fuel from said air assisted fuel spray nozzle.

30. The non-engine based exhaust component rapid aging system of claim 29 wherein said swirl plate has a plate surface, and said second set of swirl jets comprises an outer set of swirl jets and an inner set of swirl jets having an angle relative to said plate surface of about 25°.

31. The non-engine based exhaust component rapid aging system of claim 30 wherein said swirl plate has a longitudinal is, and said turbulent jets are at an angle with respect to said longitudinal is of about 43.5°.

32. The non-engine based exhaust component rapid aging system of claim 28 wherein said swirl plate has a plate surface, and said second set of swirl jets comprises an outer set of swirl jets and an inner set of swirl jets having an angle relative to said plate surface of about 25°.

33. The non-engine based exhaust component rapid aging system of claim 32 wherein said swirl plate has a longitudinal is, and said turbulent jets are at an angle with respect to said longitudinal is of about 43.5°.

34. A non-engine based exhaust component rapid aging system for aging a catalytic converter comprising:
- a non-engine based burner adapted to provide substantially continuous and effective stoichiometric combustion of a feedstream to produce an exhaust product;
- a fuel injector system in fluid communication with said burner;
- a catalytic converter in fluid communication with said exhaust product;
- wherein said burner comprises:
  - a plenum chamber;
  - a combustion tube defining a bore; and,
  - a swirl plate separating said plenum chamber and said combustion tube, said swirl plate comprising an air assisted fuel spray nozzle assembly in fluid communication with an air supply and a fuel supply, said air assisted fuel spray nozzle being adapted to provide atomized fuel to said burner, said swirl plate being adapted to produce a pattern of collapsed conical and swirl flow in said combustion tube that defines one or more flowpath along said bore;
- wherein said bore comprises an inner diameter, and a pattern produced by said one or more flowpath collapses and expands at intervals that are substantially equal to said inner diameter of said burner.

35. The non-engine based exhaust component rapid aging system of claim 34 further comprising a lubricant injection system in fluid communication with said catalytic converter.

36. The non-engine based exhaust component rapid aging system of claim 35 further comprising a data acquisition system adapted to provide substantially continuous fuel metering control.

37. The non-engine based exhaust component rapid aging system of claim 36 wherein said data acquisition system is further adapted to provide substantially continuous catalyst safety monitoring.

38. The non-engine based exhaust component rapid aging system of claim 35 further comprising at least one igniter in fluid communication with said one or more flowpath.

39. The non-engine based exhaust component rapid aging system of claim 35 wherein said lubricant injection system is adapted to provide an atomized spray of lubricant comprising droplets having a diameter sufficiently small for said droplets to vaporize upon exposure to said burner.

40. The non-engine based exhaust component rapid aging system of claim 39 wherein said diameter of said droplets is about 80 microns or less.

41. The non-engine based exhaust component rapid aging system of claim 39 wherein said diameter of said droplets is about 20 microns or less.

42. The non-engine based exhaust component rapid aging system of claim 34 further comprising a data acquisition system adapted to provide substantially continuous fuel metering control.

43. The non-engine based exhaust component rapid aging system of claim 42 wherein said data acquisition system is further adapted to provide substantially continuous catalyst safety monitoring.

44. The non-engine based exhaust component rapid aging system of claim 42 further comprising at least one igniter in fluid communication with said one or more flowpath.

45. The non-engine based exhaust component rapid aging system of claim 42 wherein said swirl plate defines three or more flowpaths.

46. The non-engine based exhaust component rapid aging system of claim 34 wherein said inner diameter of said burner is about 4 inches, and said pattern collapses and expands at intervals of about 4 inches.

47. The non-engine based exhaust component rapid aging system of claim 34 further comprising at least one igniter in fluid communication with said one or more flowpath.

48. The non-engine based exhaust component rapid aging system of claim 34 wherein said swirl plate defines three or more flowpaths.

49. The non-engine based exhaust component rapid aging system of claim 35 wherein said swirl plate defines three or more flowpaths.

* * * * *